July 14, 1936.  M. H. BALLARD ET AL  2,047,185
MACHINE FOR PRESSING SOLES ON SHOES
Filed Oct. 4, 1932  18 Sheets-Sheet 1

July 14, 1936.  M. H. BALLARD ET AL  2,047,185
MACHINE FOR PRESSING SOLES ON SHOES
Filed Oct. 4, 1932  18 Sheets-Sheet 2

July 14, 1936.  M. H. BALLARD ET AL  2,047,185
MACHINE FOR PRESSING SOLES ON SHOES
Filed Oct. 4, 1932   18 Sheets-Sheet 4
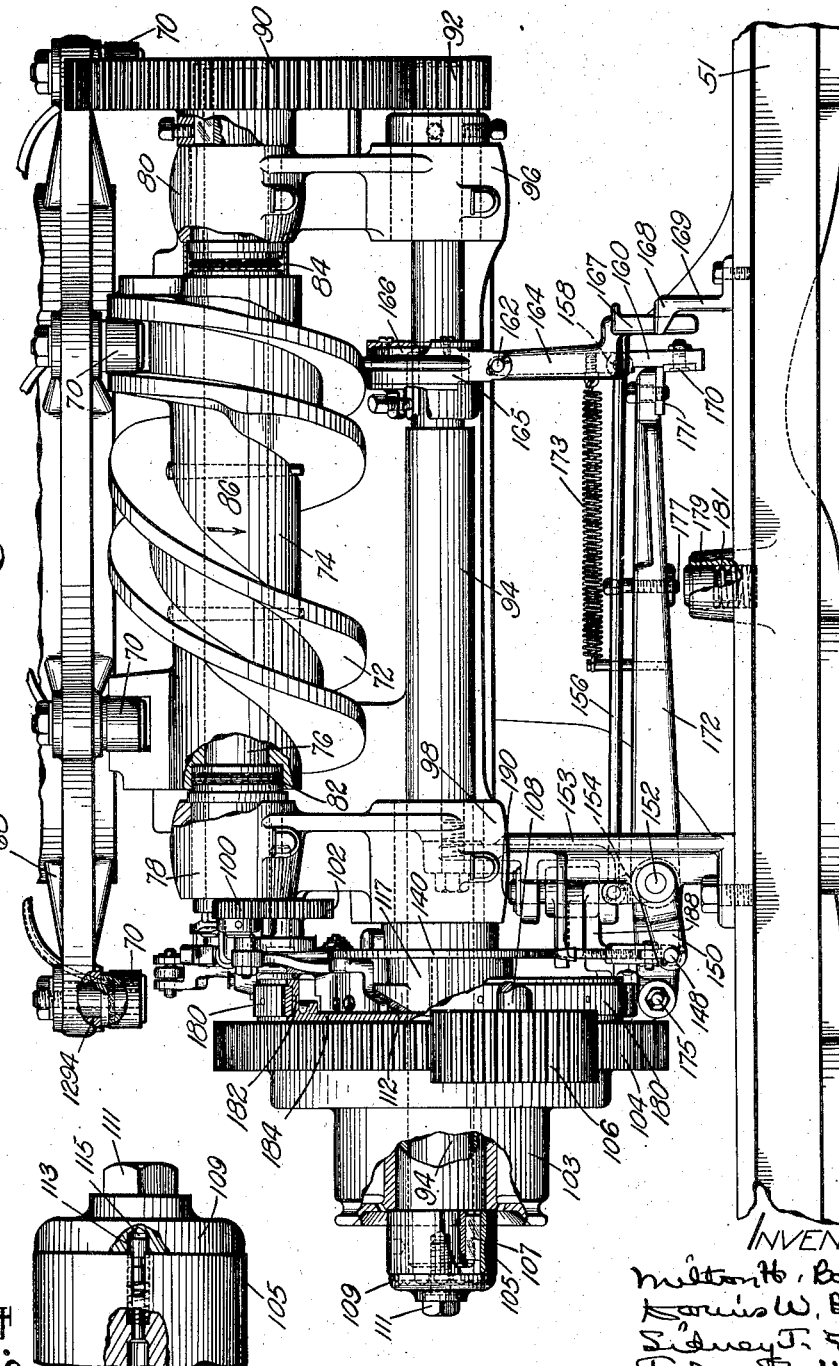
Fig. 4
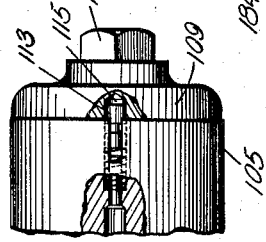
Fig. 4ª

July 14, 1936.   M. H. BALLARD ET AL   2,047,185
MACHINE FOR PRESSING SOLES ON SHOES
Filed Oct. 4, 1932   18 Sheets-Sheet 5
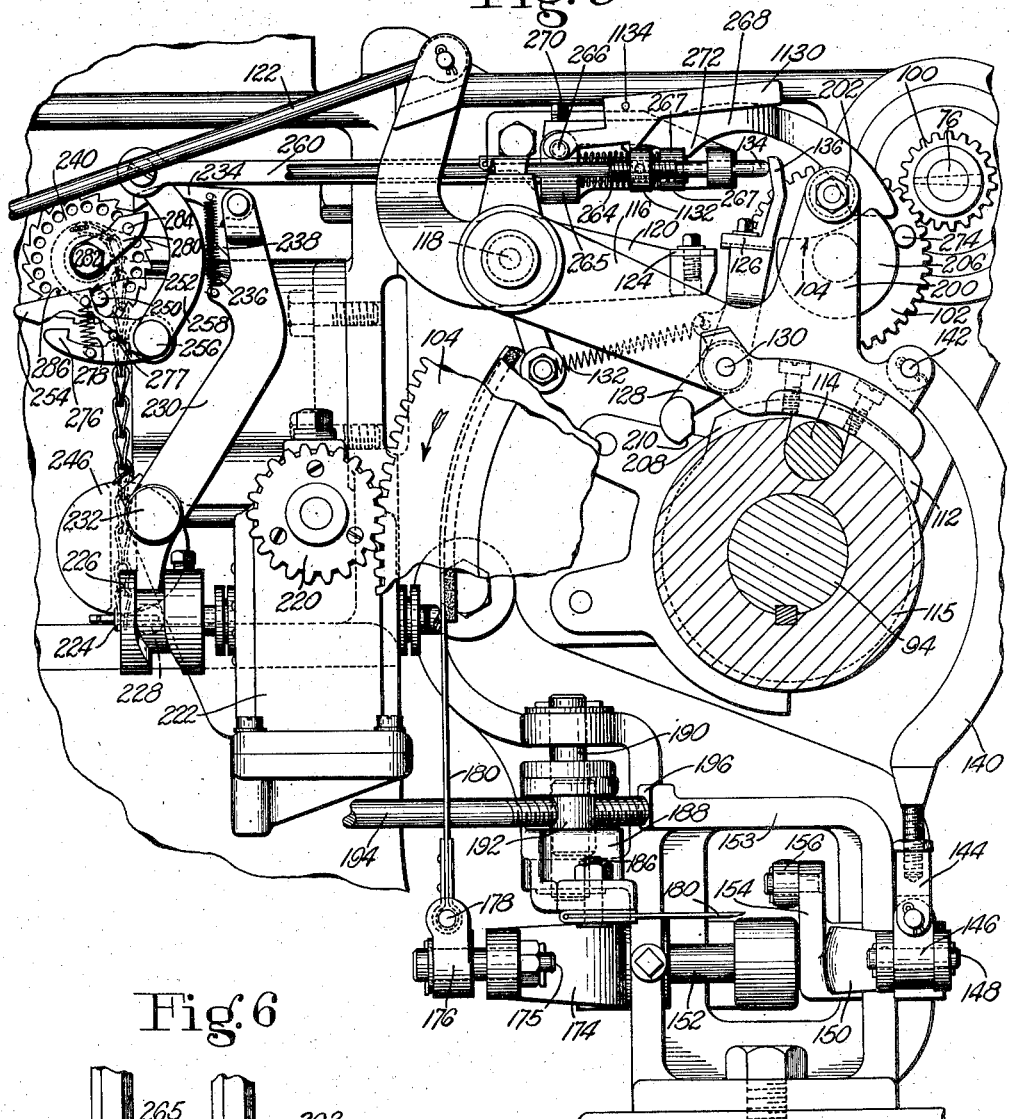
Fig. 5
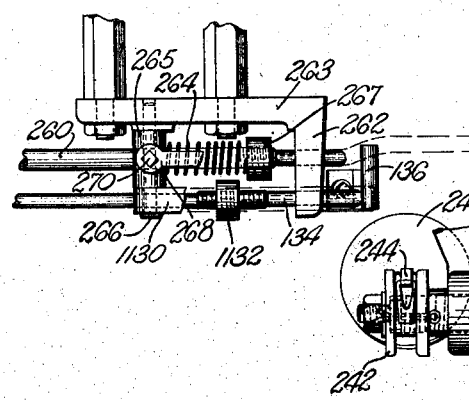
Fig. 6
Fig. 7

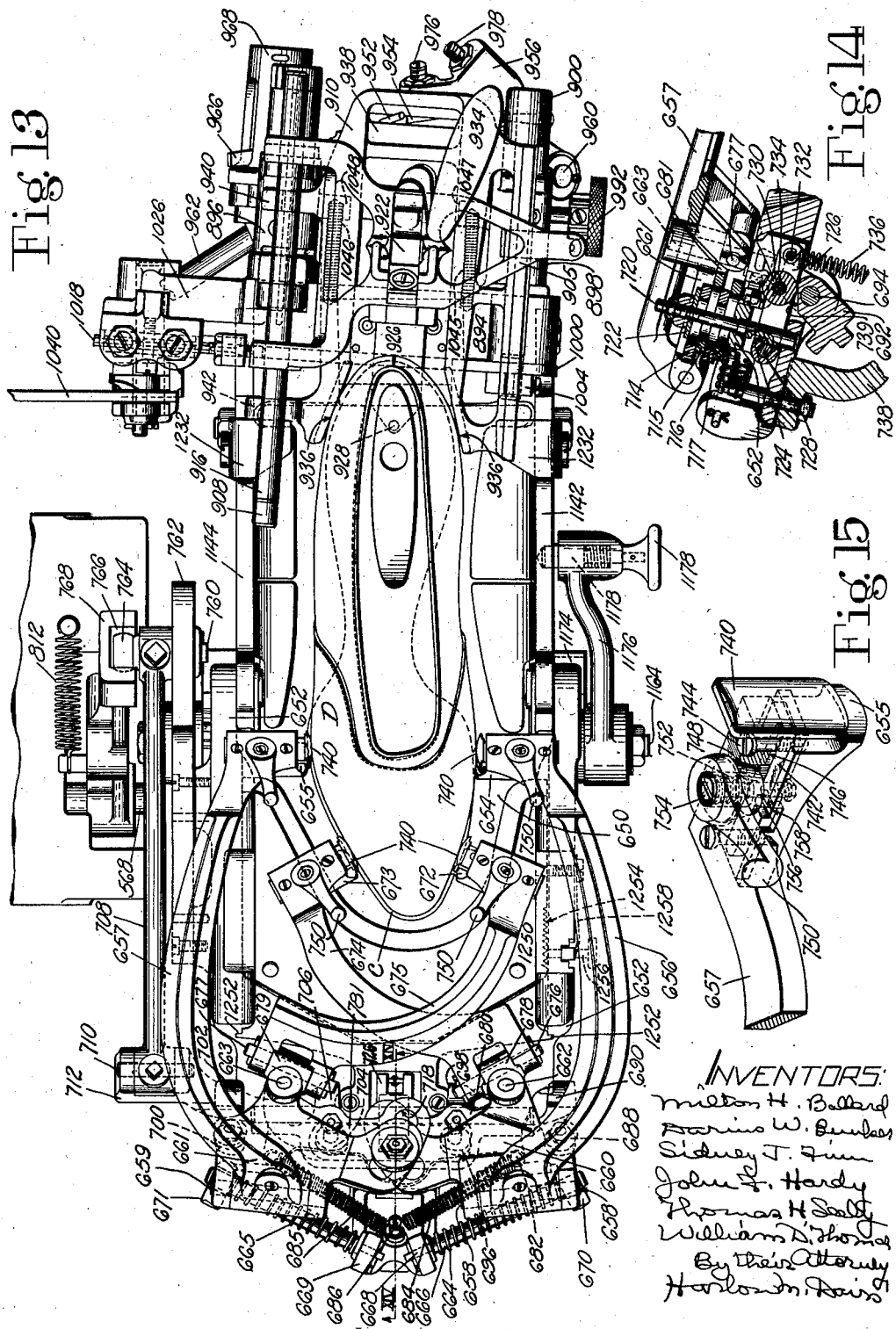

July 14, 1936. M. H. BALLARD ET AL 2,047,185
MACHINE FOR PRESSING SOLES ON SHOES
Filed Oct. 4, 1932 18 Sheets-Sheet 10

INVENTORS

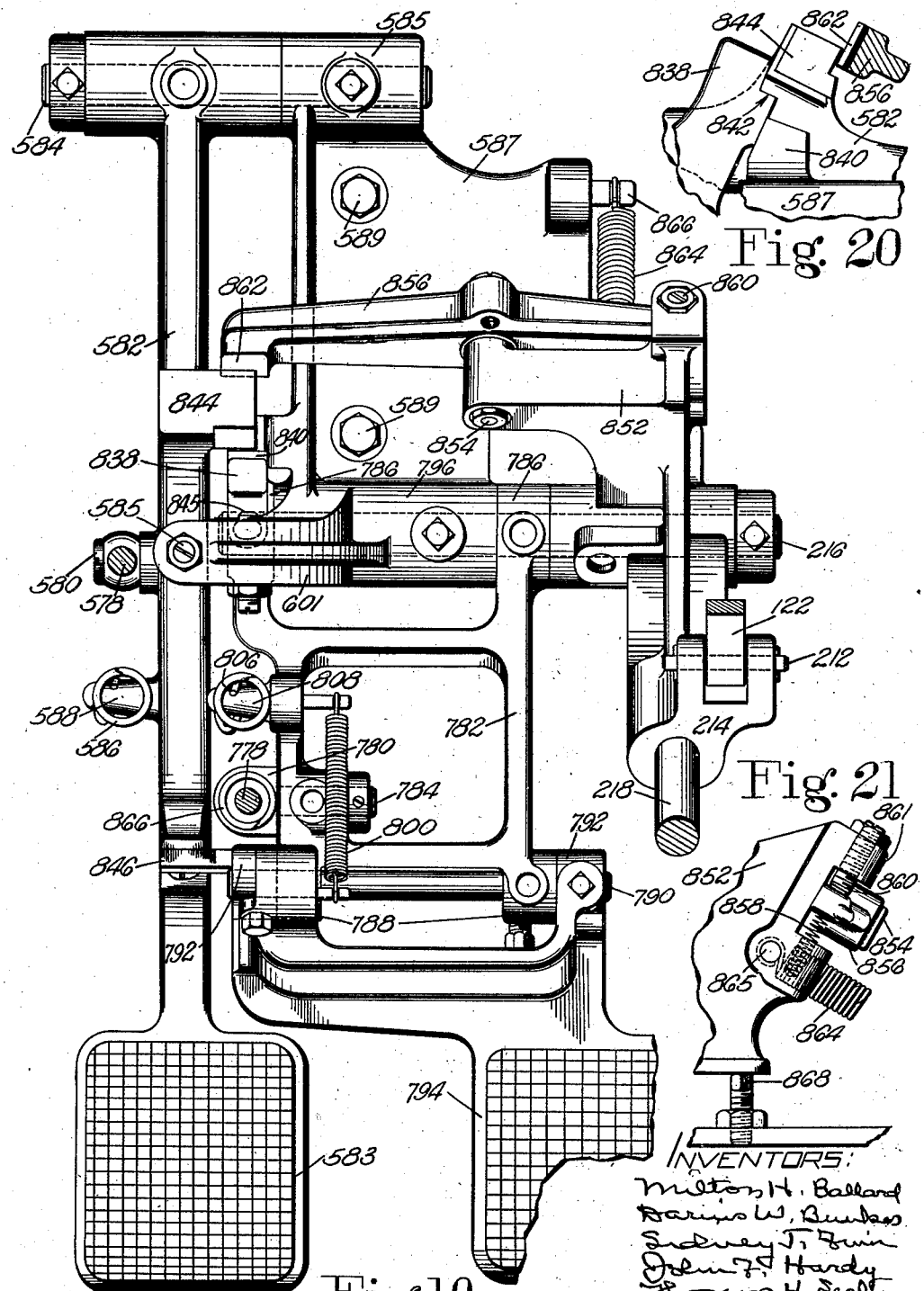

July 14, 1936.  M. H. BALLARD ET AL  2,047,185
MACHINE FOR PRESSING SOLES ON SHOES
Filed Oct. 4, 1932   18 Sheets-Sheet 13
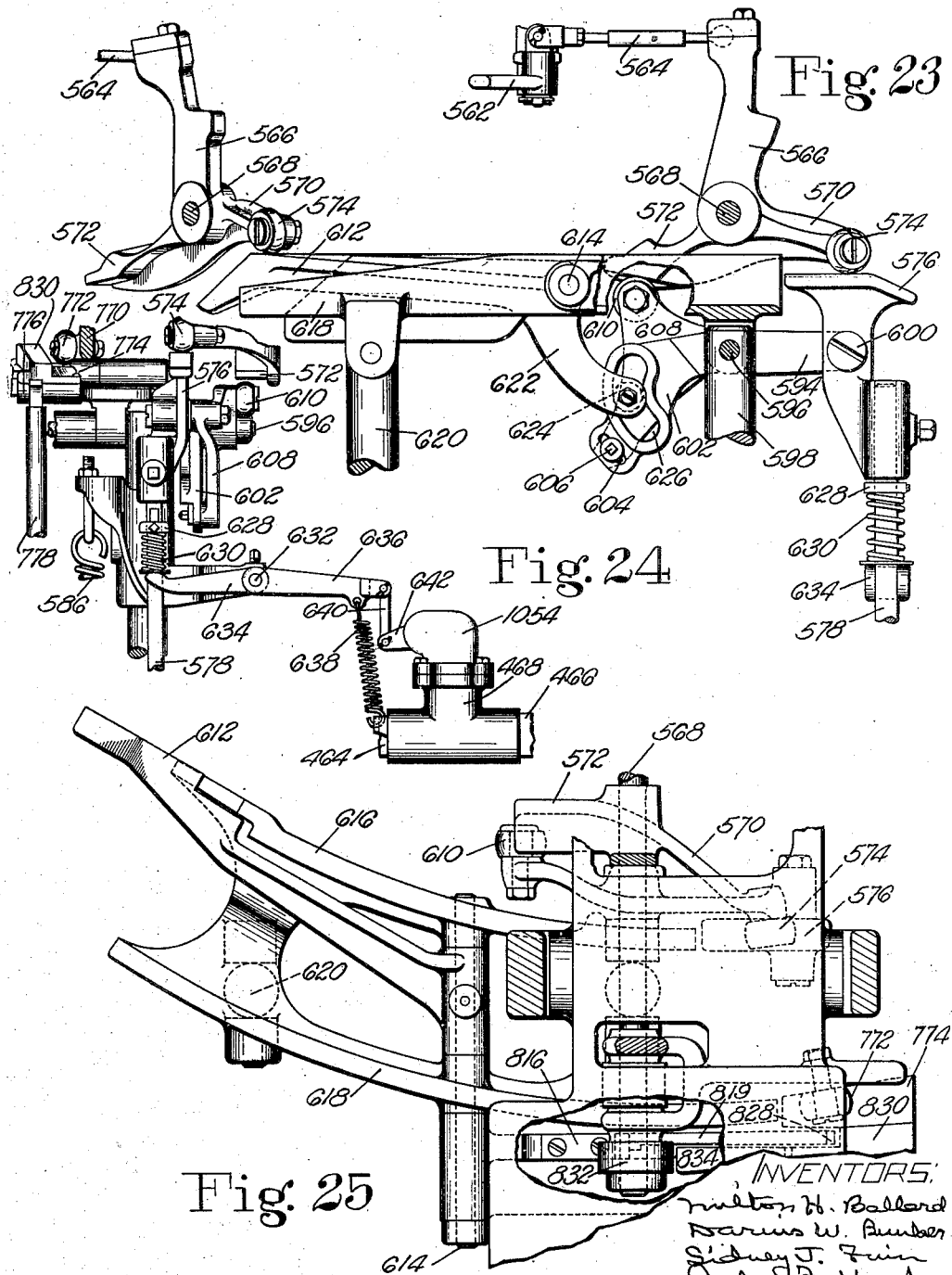

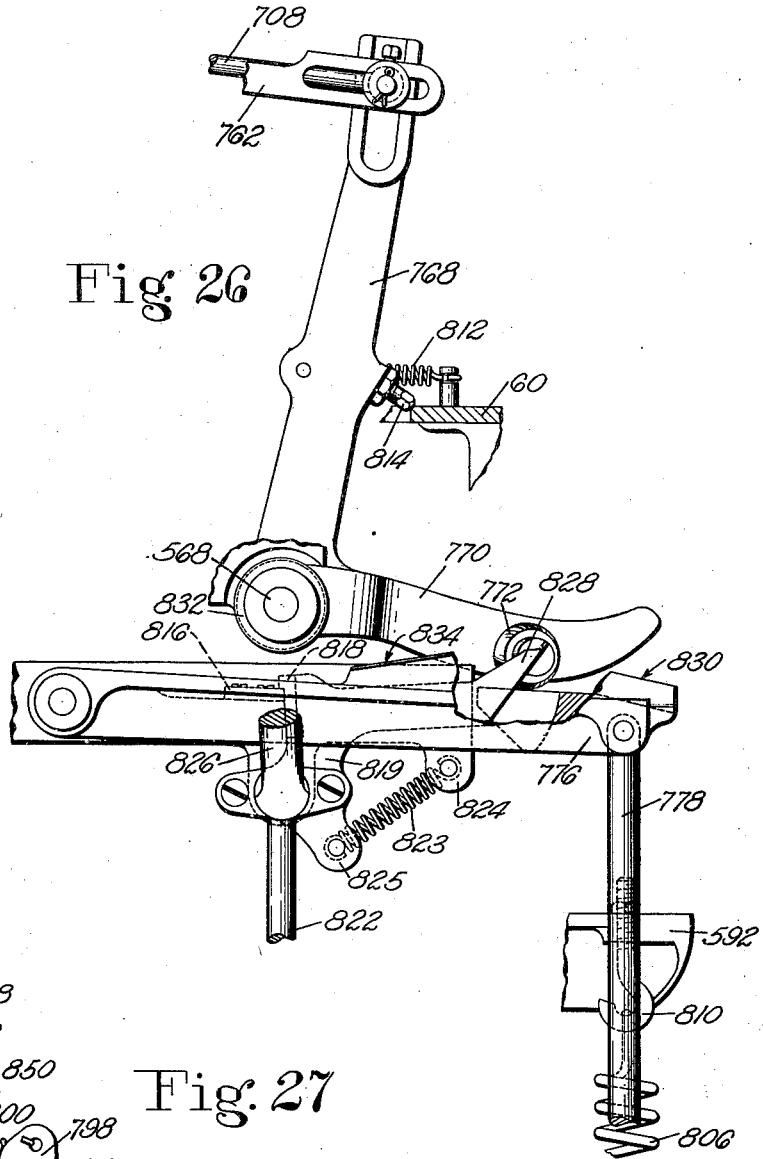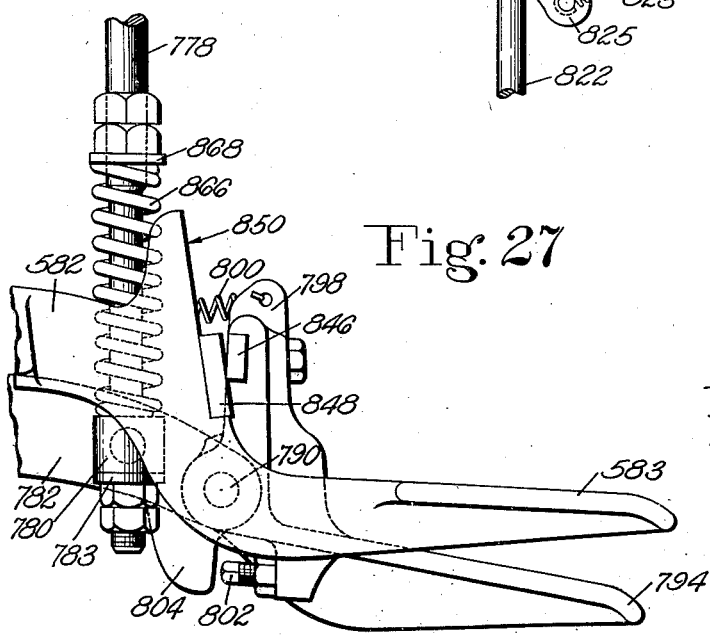

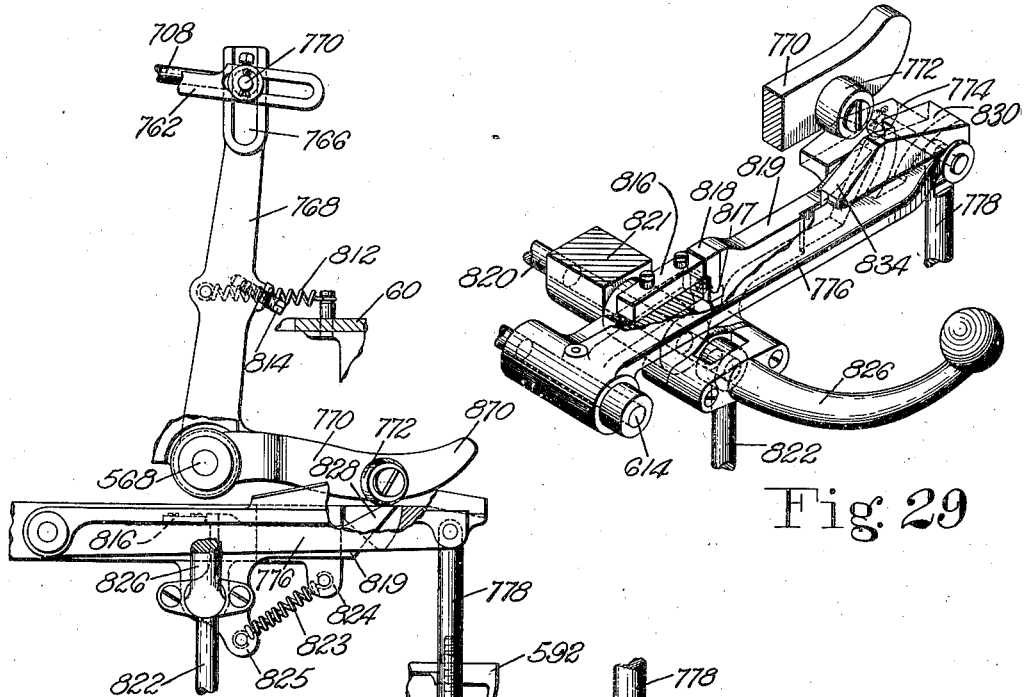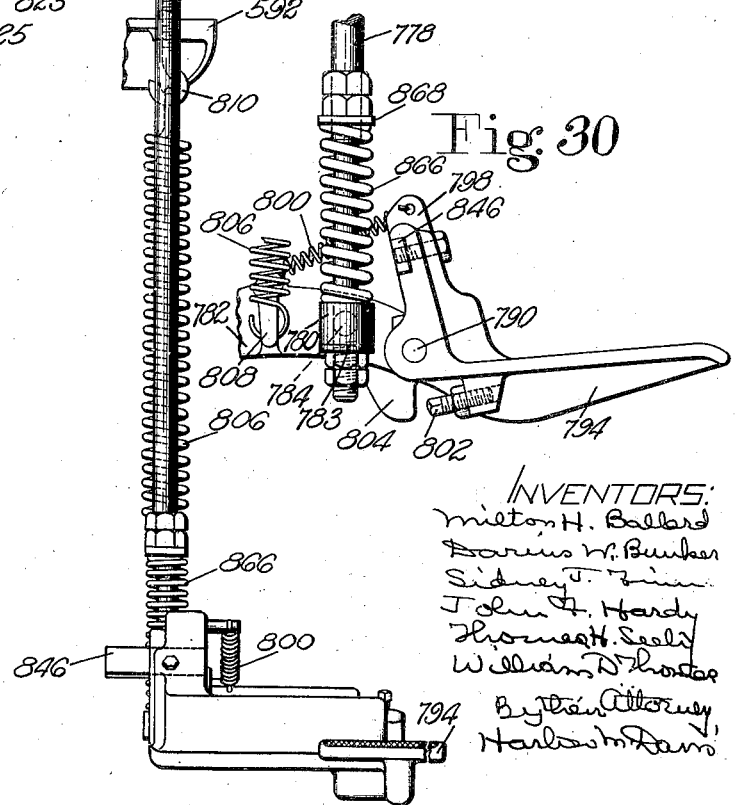

July 14, 1936.   M. H. BALLARD ET AL   2,047,185
MACHINE FOR PRESSING SOLES ON SHOES
Filed Oct. 4, 1932   18 Sheets-Sheet 16

INVENTORS

July 14, 1936.  M. H. BALLARD ET AL  2,047,185
MACHINE FOR PRESSING SOLES ON SHOES
Filed Oct. 4, 1932   18 Sheets-Sheet 17

INVENTORS:
Milton H. Ballard
Darius W. Bunker
Sidney J. Finn
John F. Hardy
Thomas H. Seely
William D. Thomas
By their Attorney
Harlow M. Davis July 14, 1936.   M. H. BALLARD ET AL   2,047,185
MACHINE FOR PRESSING SOLES ON SHOES
Filed Oct. 4, 1932   18 Sheets-Sheet 18
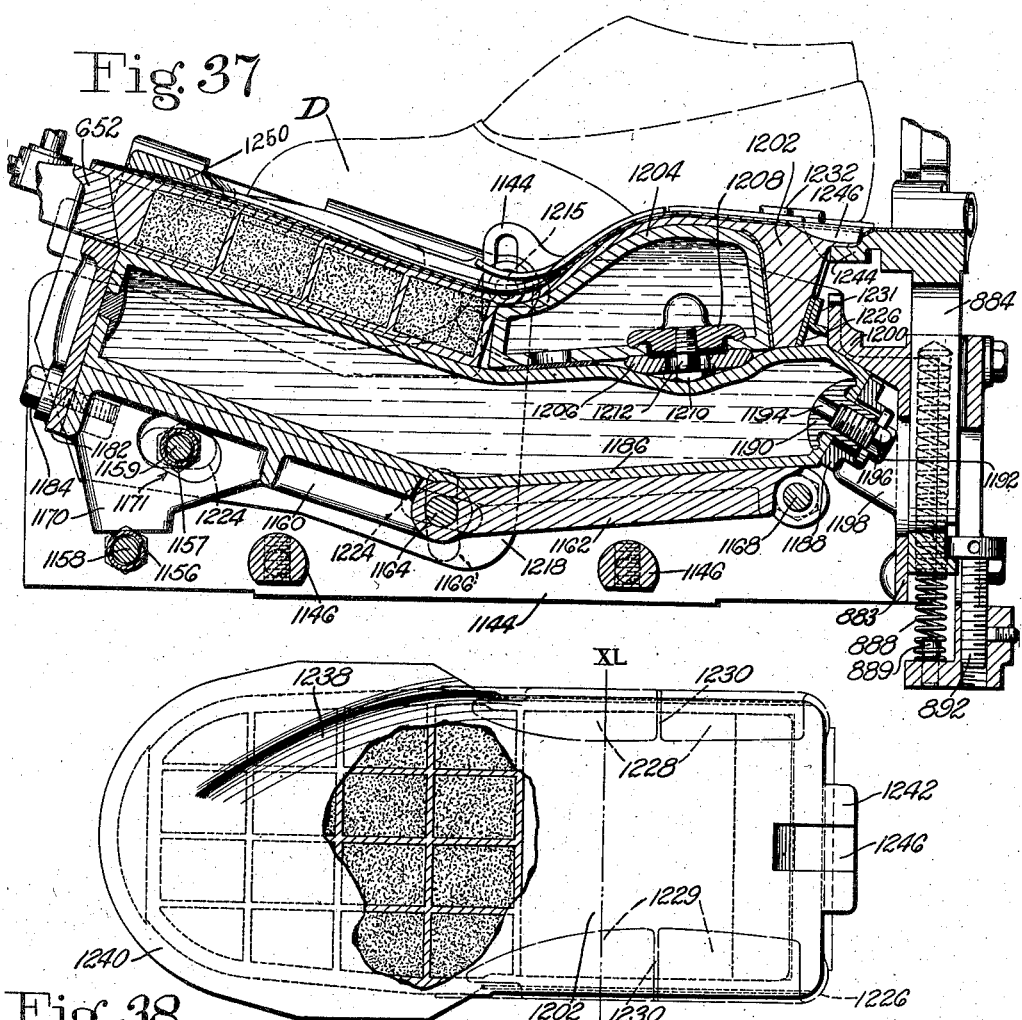
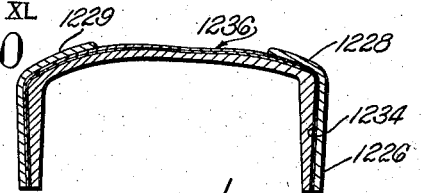
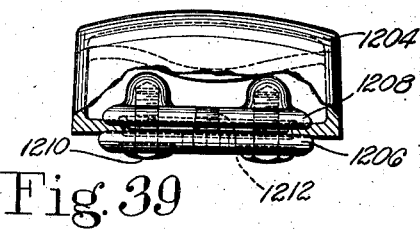

Patented July 14, 1936

2,047,185

UNITED STATES PATENT OFFICE 2,047,185

MACHINE FOR PRESSING SOLES ON SHOES

Milton H. Ballard, Beverly, and Darius W. Bunker, Quincy, and Sidney J. Finn and John F. Hardy, Beverly, Thomas H. Seely, Melrose, and William D. Thomas, Lynnfield, Mass., assignors to United Shoe Machinery Corporation, Paterson, N. J., a corporation of New Jersey Application October 4, 1932, Serial No. 636,202
In Great Britain September 13, 1932

172 Claims. (Cl. 12—37)

This invention relates to machines for use in the manufacture of shoes and is illustrated herein as embodied in a machine for use in the cement attachment of soles to shoes.

In the attaching of soles to compo shoes, it is the usual practice to roughen the marginal face of the sole, apply cement thereto and allow it to dry. The overlasted margin of the upper is also roughened, similar cement applied thereto, and allowed to dry. Before relatively locating the shoe and the sole and placing them under pressure, a softener is applied to the cement on the sole and the shoe bottom, or to the cement on one of those parts, preferably on the sole, which softener activates the cement and causes the shoe and sole to adhere permanently to each other after the application of pressure for a suitable time, formerly from twenty to thirty minutes.

Recent developments in the art, such, for example, as that disclosed in Letters Patent of the United States No. 1,959,321, granted May 15, 1934, upon an application of Walter H. Wedger, have produced softeners by the use of which the time during which the shoe need remain under pressure has been greatly shortened, so that the number of devices in use at one time for maintaining the shoes and soles under pressure may be greatly reduced.

The general object of this invention is to provide an improved machine for pressing together shoes and soles which will be thoroughly effective in obtaining contact under reasonable pressure between the shoes and soles at all portions that are to be united, for general use in cement-attaching or pressing soles to shoes. The illustrated machine is capable of large production and is particularly convenient under conditions such that the pressure need not be maintained for a great length of time.

Other objects are to provide an improved machine by which adequate pressure properly distributed between the forepart and the rear part of the shoe will be applied to press the shoe and sole together, to insure that adequate pressure will be applied to each shoe before it leaves the operator, to insure that the machine will not be operated at a rate higher than has been decided upon as affording a sufficient time for the setting of quick setting cement, to insure that a predetermined pressure will be applied to each shoe, and to insure that the machine controls will be operated only in the order in which they are intended to be operated in so far as that order is important.

Further objects of the invention are to provide improved means for relatively locating a shoe and sole prior to the application of pressure, to render the introduction of a shoe and sole into the machine and the removal of the shoe from the machine easy and convenient, and to provide improved sole-pressing pads the longitudinal curvature of profile of which may readily be varied to meet different conditions of work presented by the different shoes to which soles are to be attached.

With these and other objects in view the illustrated machine comprises a plurality of shoe and sole receiving pads mounted on a carrier which, as illustrated, has the form of a turret or table arranged for rotation about a vertical axis. The pads are preferably mounted side toward the operator, that is, with their longer axes tangential to the path of rotation of the pads, the number of pads illustrated being eight. Shoe engaging means, illustrated as a toe rest and heel rest, are provided for each pad and, as shown, are supported on the side of the pad which is remote from the operator. Such arrangement of the shoe engaging means provides convenient access to the pad. After the shoe engaging means have been moved over the pad they may be, and as illustrated are, given movement toward the pad to apply pressure to the shoe against the pad. For this purpose a lever extending transversely of the shoe and pivoted between its ends is provided for the toe rest and a similar lever for the heel rest. These levers are mounted for movement with the rests radially of the turret into and out of position over the pads and, as illustrated, move about an axis below the sole pad and on that side of the pad which is remote from the operator. As illustrated, pressure is applied to the toe and heel rests by lifting the inner ends of the levers by means of a plunger which, as illustrated, is fluid operated. A connection between the plunger and the levers is provided which, during the initial movement of the plunger, distributes the pressure between the levers, resistance of the shoe effecting a locking of the distributing means and the plunger so that during the later part of the movement of the plunger the toe and heel rests are moved bodily and equally to sink the shoe into the pad, thus insuring that the total pressure applied to the forepart of the shoe, which has a larger area, will be greater than that applied to the rear part of the shoe, which has a smaller area. Thus the final pressure per unit of area on the forepart and on the heel part is substantially uniform.

The application of fluid pressure to the plunger is, in the illustrated machine, controlled by a three-position valve having an inlet, an outlet, and a neutral or pressure-retaining position. Mechanism like that above referred to is provided for each of the pads. Each three-position valve is connected to a system through which fluid is circulated by a continuously running pump, and in this system is a pressure-inducing valve closing of which will cause fluid to pass to any one of the three-position valves which is open. Operator-controlled means is provided at the operating station for moving each three-position valve to inlet position and thereafter closing the pressure-inducing valve in the circulating system, thereby causing pressure to be applied to that plunger whose three-position valve has been moved to inlet position. The operator-controlled means for setting the three-position valve at inlet position at one station, for example the operating station, has connections also for moving to exhaust position the three-position valve belonging to another pad, for example the one at the left of the operator and next to be brought to the operating station. Thus, a shoe which is in the eighth position of the turret may be relieved from pressure substantially simultaneously with the application of pressure to a shoe at the first or operating station, both actions taking place without movement of the turret. The organization is such that when shoes are to be removed from the machine without substituting others in their places, the operator-controlled means may be operated to relieve successively the shoe engaging means as they are brought into the eighth position without operating the pressure-applying means at the operating station, a stop being provided for limiting movement of the operator-controlled means so that it cannot be moved far enough to close the pressure-inducing valve in the circulating system.

Novel mechanism is provided for imparting intermittent partial rotations to the turret and for holding the turret locked in its positions of rest. In the illustrated construction, an eight-armed spider is attached to the turret, each arm of the spider carrying a roll. In positions of rest of the turret, two adjacent rolls engage opposite ends of a spiral cam path passing around the cylindrical surface of a cylinder mounted for rotation on its axis and connected by a clutch to a source of power by which it is given two rotations and stopped. The lead or pitch of the spiral groove increases from each end toward the center so that the turret is started slowly and stopped slowly without shock and moves more rapidly during the intermediate portion of each movement. In positions of rest the turret is locked by two rolls carried by adjacent arms of the spider, one at each end of the spiral groove.

Each pad comprises a box in which is a yielding and resilient member long enough to accommodate at least the forepart and shank portions of the largest shoe to be operated on. In order to adapt the pad for operation on shoes having a widely varying angle between the plane of the forepart and the shank, that is shoes which are to have heels of widely varying heights, the pad box is provided with pad supporting mechanism which is adjustable about a transverse axis located substantially at the ball or break line. In the illustrated construction, the ends of the pad support rest on fixed supports and its intermediate portion is adjustable up and down to enable the pad to conform to the longitudinal contour of the bottom of various styles of lasts.

For relatively locating the shoe and sole with respect to each other, novel positioning mechanism is provided. A sole having the cement on its margin activated with solvent and having a hole punched at the transverse center of its heel-seat portion is placed on the pad by the operator with its ball line substantially over the transverse axis about which the pad is adjustable. At the rear end of each pad of the illustrated machine is mounted a tongue carrying a pin, the tongue being mounted for movement bodily longitudinally and laterally of the pad and for swinging movement toward and from the pad. The operator moves the tongue over the rear end of the sole and engages the pin with the hole in the sole. Forepart engaging feelers are then allowed to move toward the sides of the sole and engage the sole at each side at points approximately at the ends of the tip line and at the ends of the ball line. The feelers thus find the sole in the position in which it was placed by the operator. The feelers are carried by arms pivoted to the box, the arrangement being such that the relative location longitudinally of the sole of the tip line engaging feelers and the ball line engaging feelers will vary automatically in accordance with the width of the shoe and the feelers of the two sets will, of course, be more widely separated for a large shoe than for a small shoe. As illustrated, the feelers are locked in sole-engaging position and carry gages for locating a shoe with respect to the sole. After a shoe has been placed on the sole and is located at its forepart by the shoe gages carried by the feelers, the shoe engaging devices, comprising the toe rest and the heel rest, are swung over the shoe. This movement is utilized relatively to located the rear ends of the sole and shoe. A longitudinally and laterally movable shoe finding and locating member is moved forward, by movement of the shoe engaging devices over the shoe, and acts to find the rear end of the shoe whatever its lateral or longitudinal position with respect to the pad member. Automatic means operated by further movement of the shoe engaging means locks the shoe locating member and then shifts the sole engaging pin laterally into position under the shoe to aline the sole with the shoe. Varying conditions are taken care of by provision for lateral adjustment of the pin relatively to the final position of the shoe positioning member.

These and other features of the invention, including various constructions, combinations and arrangements of parts, will appear more fully from the following detailed description when read in connection with the accompanying drawings and will be pointed out in the appended claims.

In the drawings,

Fig. 4 is a rear elevation of the lower portion of the machine showing particularly the turret rotating mechanism;

Fig. 4a is a detail, partly in section, of parts shown in Fig. 4;

Fig. 5 is an enlarged view of a portion of the machine in side elevation, partly in section, showing the clutch and clutch controlling mechanism;

Figs. 6 and 7 are detail plan views of parts shown in Fig. 5;

Fig. 13 is a plan view of one of the pad boxes and the mechanism associated therewith for relatively locating a shoe and sole;

Fig. 14 is a sectional view on the line XIV—XIV of Fig. 13;

Fig. 15 is a perspective view, partly in section, showing a detail of one of the sole feelers and shoe gages shown in Fig. 13;

Fig. 19 is a plan view of the treadle mechanism;

Fig. 20 and 21 are details of parts shown in Fig. 19;

Fig. 23 is a front elevation, partly in section, of the pressure controlling mechanism;

Fig. 24 is a side elevation of parts shown in Fig. 23;

Fig. 25 is a plan view of parts shown in Fig. 23;

Fig. 26 is a detail view in front elevation, partly in section, of the mechanism for controlling the forepart feelers and gages, the parts being in the positions they assume when the feelers are in operative position;

Fig. 27 is a detail in side elevation of the treadle mechanism;

Fig. 28 is a view similar to Fig. 26 but including the treadle and showing the parts in the positions they assume when the feelers are in inoperative position;

Fig. 29 is a perspective view of parts shown in Fig. 28;

Fig. 30 is a detail in side elevation of one of the treadles;

Fig. 37 is a longitudinal sectional view of the pad box and pad showing a shoe thereon in dotted lines;

Fig. 38 is a plan view, partly in section, of the upper part of the pad shown in Fig. 37;

Fig. 39 is an end elevation, partly in section of the shank pad shown in Fig. 37; and Fig. 40 is a transverse section on the line XL—XL of Fig. 38.

Figure 1:
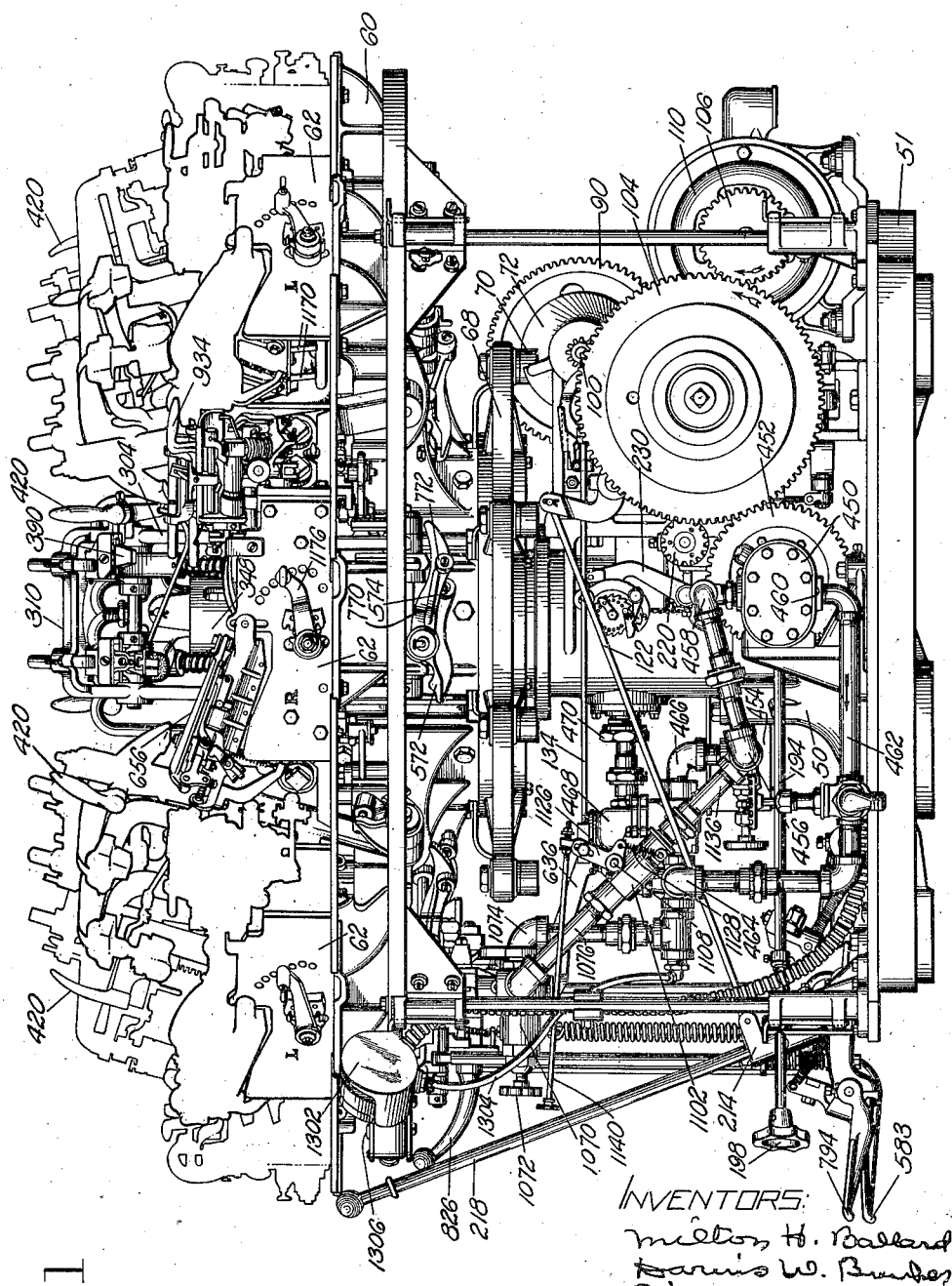
Fig. 1 is a side elevation of a machine embodying the present invention.
Figure 3:
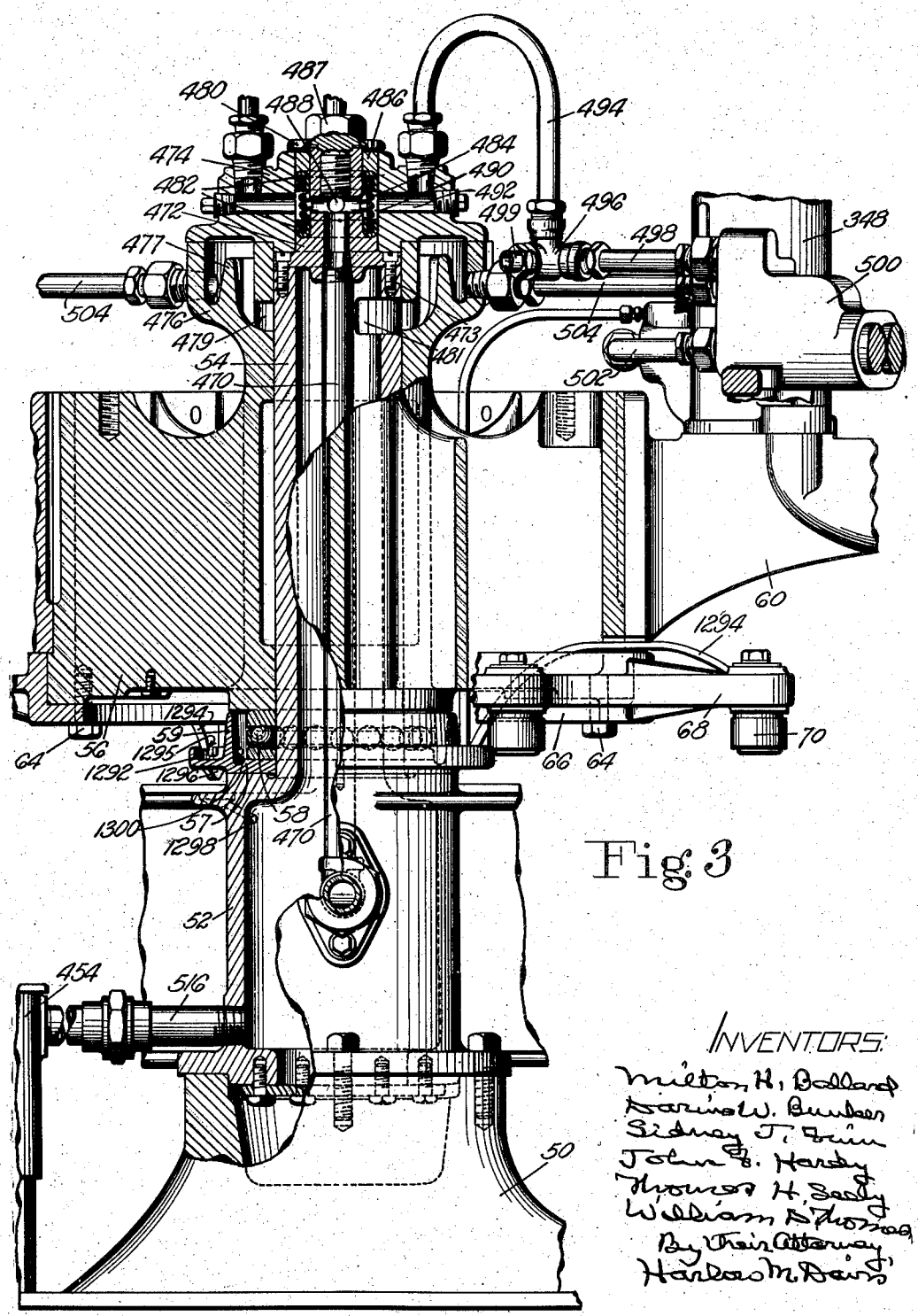
Fig. 3 is a vertical section, partly in elevation, of the central turret portion of the machine.

The illustrated machine for relatively locating a shoe and sole and then applying pressure to the shoe to effect attachment of the shoe and sole by cement comprises a base 50 mounted on a base plate 51 (Figs. 1 and 3). To the base 50 is attached an upright hollow column 52 having a reduced upper portion 54. Mounted for rotation on the reduced upper portion 54 is a turret head 56 (Fig. 3), and between the turret head and the larger lower portion of the column a suitable ball bearing 58 is provided which rests on a washer-like member 57 having an upstanding flange 59. The turret head 56 is provided with eight vertical surfaces to each of which a bracket 60 is secured and on each of these brackets a pad box 62 is mounted.

To the lower face of the turret head is secured by cap screws 64 a spider 66 which has eight outwardly projecting arms 68 on each of which is mounted a roll 70. Referring to Fig. 4, it will be seen that two of the rolls 70 engage at the same time the opposite ends of a spiral cam track 72 passing twice around the surface of a cylinder 74 pinned to a shaft 76. The shaft 76 is mounted for rotation in bearings 78, 80, suitably supported on the base 50. Suitable ball thrust bearings 82, 84 are provided between the ends of the cylinder 74 and the bearings 78, 80. In Fig. 4 the cylinder 74 is represented in its position of rest, its direction of rotation being indicated by an arrow 86. The roll 70 at the left-hand end of the cylinder is therefore at the entering end of the cam track 72, and the roll 70 at the right-hand end of the cylinder is at the leaving end of the cam track. Thus, in the stopped position of the cylinder there are two rolls 70 in engagement with the cam track which, of course, cause the turret head 56 to be held in a fixed and predetermined position. It will be noted that the end portions of the spiral cam track 72 have less lead or pitch than the central portion. When the cylinder is turned in the direction of the arrow, therefore, the roll 70 at the right of Fig. 4 immediately leaves the cam track, and the roll 70 at the left which is in a part of the cam track which has a small pitch will start moving slowly toward the right, thus rotating the turret head 56 and, as it reaches the intermediate portion of the cam track, it will be moved more rapidly because of the greater pitch of that portion of the cam track, and when this roll reaches the opposite end portion of the cam track the motion of the turret will be gradually reduced. When the cylinder 74 has been given two rotations and brought to rest, another roll 70 of the spider will have just engaged in the entering end of the cam path and the turret will be again locked against rotation. The turret is thus rotated without jar or shock, its inertia being gradually overcome and its momentum gradually reduced. It is also "indexed" or held in a predetermined position between periods of rotation without special indexing mechanism.

On the right-hand end of the shaft 76 is a gear 90 which meshes with a pinion 92 on a shaft 94 mounted parallel with the shaft 76 in bearings 96, 98, the ratio between the pinion 92 and the gear 90 being 7 to 1. On the left-hand end of the shaft 76 (Fig. 5) is a pinion 100 meshing with a gear 102, the ratio being 2 to 1. On the left-hand end of the shaft 94 (Fig. 4) is loosely mounted a gear 104 with which a pinion 106 meshes. The gear 104 has a hub portion 103 which is held on the shaft 94 by a sleeve 105 keyed to the shaft at 107. A cap 109 is held against the outer end of the sleeve by a screw 111 the head of which engages a socket in the cap 109 so that the screw turns with the cap. By turning the cap the hub 103 may be pushed to the right or the shaft 94 drawn to the left to take up wear and to adjust the parts. A spring bolt 113 (Fig. 4a) mounted in the sleeve and arranged to enter any one of a series of holes 115 bored in the cap 109 holds the cap and sleeve fixedly in adjusted position until the bolt 113 is pushed back manually to release the cap.

The pinion 106 may be connected to the armature shaft 108 of an electric motor 110 (Fig. 1) or may be connected to any usual source of power. When the electric motor is in operation, the gear 104 will be driven continuously, and between the gear 104 and the shaft 94 a suitable clutch is provided which, as illustrated, is similar in construction to that disclosed in United States Letters Patent No. 1,011,903, granted December 19, 1911, on application of Arthur Bates. This type of clutch is set by lifting a wedge-shaped member 112 (Fig. 5) out of engagement with a plunger 114 arranged for movement parallel to the shaft 94 in a sleeve 117 keyed to the shaft 94, such movement causing engagement of the clutching surfaces until the wedge-shaped member 112 has again been dropped into the path of the plunger 114 and has caused it to be withdrawn. The wedge-shaped member 112 is carried by an arm 116 mounted to swing on a shaft 118. On the same shaft 118 is mounted a lever 120 having one of its arms upwardly bent and connected with a rod 122 upon which a pull may be exerted to set the clutch. The other arm of the lever carries a latch plate 124 adapted to cooperate with a plate 126 fixed to the upper end of a lever 128 pivoted at 130 to the arm 116 and urged toward the end of the lever 120 by a tension spring 132 connected at one end to the lever 128 above its pivot and at the other end to a projection on the arm 116. In the position shown in Fig. 5, the plate 126 is held out of position over the plate 124 by engagement of the end of a horizontal rod 134 with an upstanding projection 136 on the plate 126. The rod 134 is withdrawn to the left by operation of the pressure-guarantee valve, to be later described, and when the rod 134 is so withdrawn it will be seen that the spring 132 will rock the lever 128 to dispose the plate 126 over the plate 124, thus locking the arm 116 to the lever 120 so that a pull on the rod 122 will lift the arm 116 and remove the wedge member 112 from the plunger 114 to set the clutch.

Upward swinging movement of the end of the arm 116 which carries the wedge member 112 is utilized to release a brake applied to the shaft 94, by rotation of which the turret is turned. A curved link 140 is pivoted at 142 to the arm 116 and the lower end of the link has threaded engagement with a bifurcated block 144 which embraces an ear formed on a sleeve 146, which sleeve is pivoted by a pin 148 between bifurcations of an arm 150 (Fig. 4) of an angle lever fulcrumed at 152 to a portion 153 of the frame and having a shorter arm 154 to which a rod 156 is pivoted. The other end of the rod 156 is pivoted at 158 to a swinging arm 160 pivoted at 162 to an eccentric rod 164 formed integrally with an eccentric strap 165 surrounding an eccentric 166 fixed to the shaft 94. The lower end of the rod 164 has an offset portion 167 having vertical straight sides and guided for up-and-down movement between lugs 168 formed on a bracket 169 secured to the base plate 51. The lower end of the arm 160 carries a detent block 170 which at times engages under a latch plate 171 secured to the long arm of a lever 172 fulcrumed at 152. The arm 160 is normally urged toward the left by a tension spring 173 connected between the arm and a pin on the lever 172. The left-hand arm 174 (Fig. 5) of the lever 172 carries a pin 175 on which a block 176 is pivoted. The block 176 has spaced ears to receive a pin 178 which passes through ears and through a loop secured to one end of a brake band 180. The band passes around a circular brake flange 182 (Fig. 4) formed on a disk 184 which is secured to or forms part of the sleeve 117 secured to the shaft 94, in which sleeve the operating plunger 114 of the clutch is located. The brake band 180, after passing nearly completely around the flange 182, has its other end secured by a bolt 186 (Fig. 5) to a lever 188 the other end of which is pivoted at 190 to the stationary frame 153. Between its ends the lever 188 has mounted therein a cylindrical member 192 through which is a threaded hole. The rear end portion of a rod 194 is threaded through the hole in the cylindrical member 192 and engages a face 196 on the frame 153. The rod 194 extends to the front of the machine (Fig. 1) and is provided with a handwheel 198 by which it may be turned to tighten the band 180. When the arm 116 is lifted as described to set the clutch, the link 140 is lifted to impart clockwise motion to the angle lever 150, 154, thus pushing the rod 156 toward the right and swinging the arm 160 far enough to disengage the detent block 170 from the latch plate 171, thus unlocking the lever 172 and permitting it to drop. To diminish the shock of the dropping of the arm 172, the arm is provided with a screw 177 which engages a plunger 179 upheld by a spring 181. Dropping of the arm 172 of course raises the arm 174 and relieves the tension of the brake band 180.

To maintain the clutch in set position during a sufficient number of rotations of the shaft 94 to effect two rotations of the shaft 74 and thus impart to the turret one eighth of a revolution, the arm 116 which carries the wedge 112 is provided with an upstanding portion 200 (Fig. 5) carrying a roll 202 normally disposed in a notched portion 204 of a disk 206 secured to the gear 102. When the arm 116 is lifted to set the clutch, the roll 202 is lifted out of the notch 204 and, as the gear 102 is rotated from the pinion 100, the edge of the disk 206 engages the roll 202 and holds the arm 116 from dropping back into position to open the clutch. After the pinion 100 has made nearly two revolutions and has thus imparted nearly a single rotation to the gear 102 and to the disk 206, the roll 202 enters the notch 204, allowing the arm 116 to drop and the wedge member 112 to disengage the clutch. At the same time the link 140 is allowed to drop, thus moving the angle lever 150, 154 in a counterclockwise direction and permitting the spring 173 to draw the detent block 170 toward the latch plate 171, so that, as the eccentric 166 rotates, the detent 170 will engage below the latch plate 171 and lift it, thus tightening the band 180 upon the brake flange 182 and stopping the shaft 94.

In case the brake band 180 is allowed to become too loose so that the shaft 94 is not stopped as soon as it should be, a projecting rib 208 (Fig. 5) is provided on the sleeve 117, which, in case the sleeve moves too far in a counterclockwise direction, engages a surface 210 formed on the lower arm of the lever 128 and holds the plate 126 out of position to be engaged by the plate 124 so that the clutch cannot be tripped by its normal tripping means until the tension of the brake band has been readjusted by turning the rod 194.

To enable the operator standing at the front of the machine, that is, at the left in Fig. 1, conveniently to trip the clutch, the rod 122 connected to the clutch lever 120 extends to the front of the machine where it is pivoted at 212 to a member 214 which is pivoted at its lower end to a fixed shaft 216 (Fig. 19) and is provided with a socket removably to receive a hand lever 218. Movement of the hand lever toward the left in Fig. 1 will trip the clutch unless that is prevented by one or more of the clutch controlling devices, to be described, with which the machine is provided.

In the illustrated machine it is intended that the clutch shall be tripped about every ten seconds and it is desirable to prevent a fast operator from operating the machine at a higher rate than this, since in that case the shoes would be removed before they had been subjected to sole attaching pressure for a minimum setting time of say seventy seconds. Accordingly, a timing device is provided which is set in operation when the clutch is tripped and prevents setting of the clutch again until a predetermined time, for example ten seconds, has elapsed. The timing device comprises a pinion 220 (Fig. 5) meshing with the constantly running gear 104 and connected through a speed-reducing mechanism 222 to a shaft 224, the speed reduction being such that the shaft 224 is rotated about once per second. Upon the shaft 224 is a path cam 226 the path of which is engaged by a roll 228 on the lower end of a lever 230 fulcrumed at 232. The upper end of the lever 230 is provided with a pawl 234 normally held depressed by a tension spring 236 against a stop 238 on the lever 230. As the lever 230 is oscillated back and forth by each rotation of the cam 226, the pawl 234 engages the teeth of a ratchet wheel 240 fixed to a shaft on which is a drum 242. A chain 244 provided with a weight 246 is wound upon the drum in a direction to tend to turn the ratchet wheel in a clockwise direction as viewed in Fig. 5. The ratchet wheel 240 is provided with a pin 250 which normally engages a face 252 formed on one arm 254 of a bell-crank lever pivoted at 256, the other arm 258 of which is connected to a rod 260 (Fig. 6) mounted for longitudinal movement in a bearing 262 formed in a bracket 263 secured to the frame, the rod 260 being parallel to the similarly arranged rod 134 and normally urged to the right by a spring 264 surrounding the rod 260 and abutting at one end on a sleeve 265 pivoted at 266 to the bracket 263 and at the other end on a collar 267 adjustably fixed on the rod 260. In the position shown, the rod 260 is withdrawn from engagement with the projection 136 and is so held by a latch member 268 secured at 270 to the sleeve 265 and having a latch projection 272 to engage the collar 267 and hold the rod in retracted position against the tension of the spring 264. The latch member has a curved extension lying in the path of a pin 274 on the gear 102 which, as described, rotates once during each partial rotation of the turret.

A retaining pawl 276 is pivoted at 256 and urged toward the ratchet wheel 240 by a tension spring 278 connected between the pawl and the arm 254, the arm 254 having a pin 277 to engage the pawl 276 and limit relative movement of the pawl and the arm under tension of the spring 278, so that when the angle lever 254, 258 is in the position shown in Fig. 5, the pawl 276 will be inoperative to engage the ratchet wheel. Hence the movements of the ratchet 234 will be ineffective to rotate the ratchet wheel but will merely oscillate it through a small arc, the ratchet wheel being returned by the action of the weight 246. On the front face of the ratchet wheel is a finger 280 which is held by a screw 282 at the center of the ratchet wheel and carries a pin 284 adapted to engage any one of a series of holes formed near the periphery of the ratchet wheel. An inclined face 286 on the arm 254 lies in the path of rotation of the finger 280. Supposing now the clutch to be tripped, early in the rotation of the gear 102 the pin 274 will engage the latch member 268 and lift it sufficiently to release the collar 267, thus permitting the spring 264 to react, move the rod 260 to the right, and rock the angle lever 254, 258 clockwise to bring the retaining pawl 276 into operative relation to the ratchet wheel 240, whereupon the oscillations of the pawl 234 will become effective to rotate the ratchet wheel since backward movement of the ratchet wheel will be prevented by the pawl 276. The step-by-step movements of the ratchet wheel will continue for a predetermined time, depending on the setting of the finger 280, until the finger comes into engagement with the surface 286 formed on the arm 254 and moves the arm to retract the rod 260 so that the clutch can be tripped so far as the rod 260 is concerned. Meantime, the pin 274 on the gear 102 will have passed by the end of the latch 268 will have dropped into position to engage the collar 266 and hold the rod in retracted position. When the arm 254 is rocked by the finger 280, the retaining pawl 276 is moved by the pin 277 out of engagement with the ratchet so that the weight 246 will rotate the ratchet wheel in a clockwise direction until the pin 250 engages the face 252 of the arm 254; at least this will occur when, in its next operation, the pawl 234 is withdrawn from engagement with the ratchet wheel.

Figure 11:
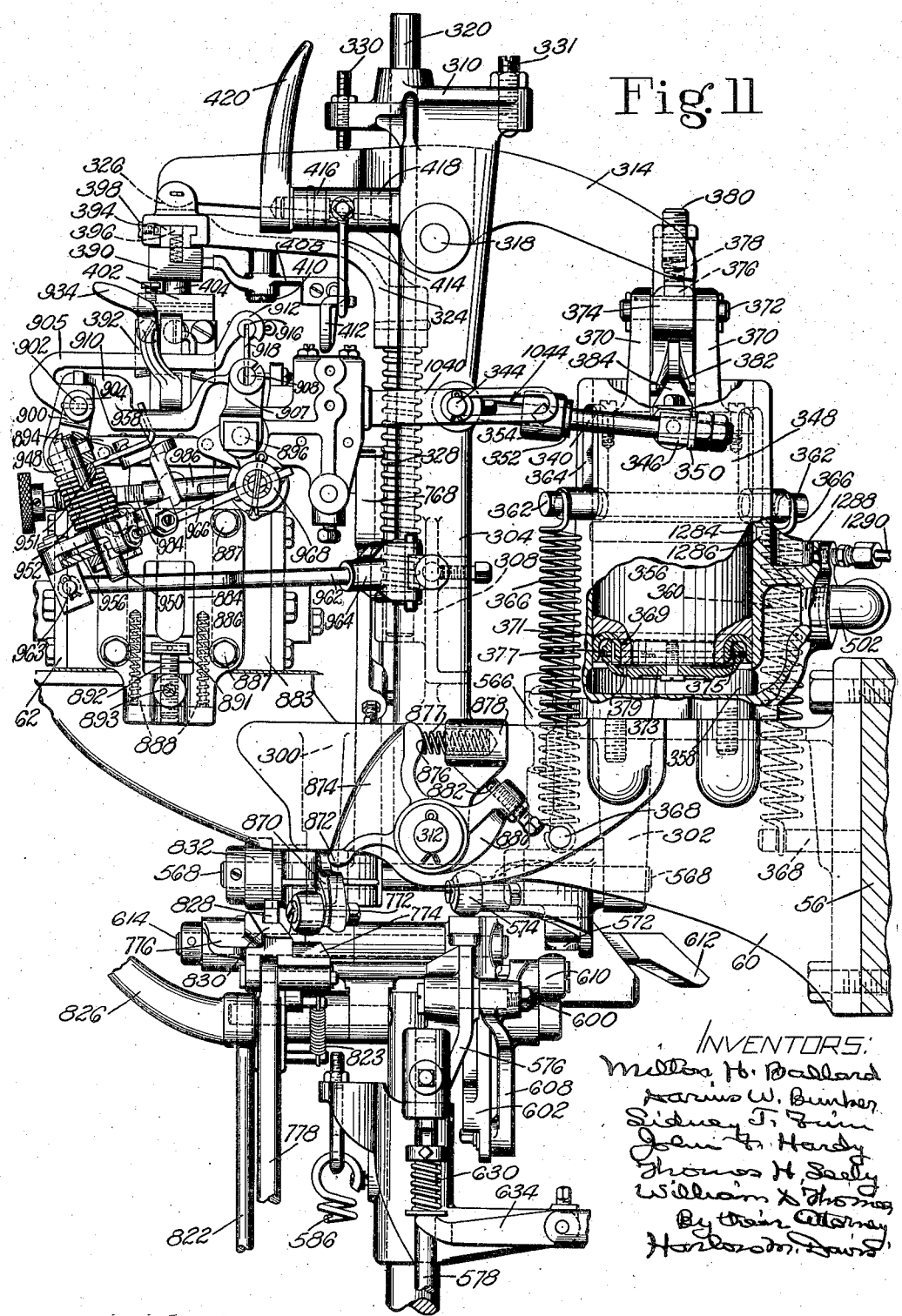
Fig. 11 is a side elevation, partly in section, showing one of the arms of the turret carrying one of the pad boxes with its mechanism for relatively locating the rear end of the shoe and sole and its pressure applying mechanism while associated with the control mechanism located at the operating station.
Figure 12:
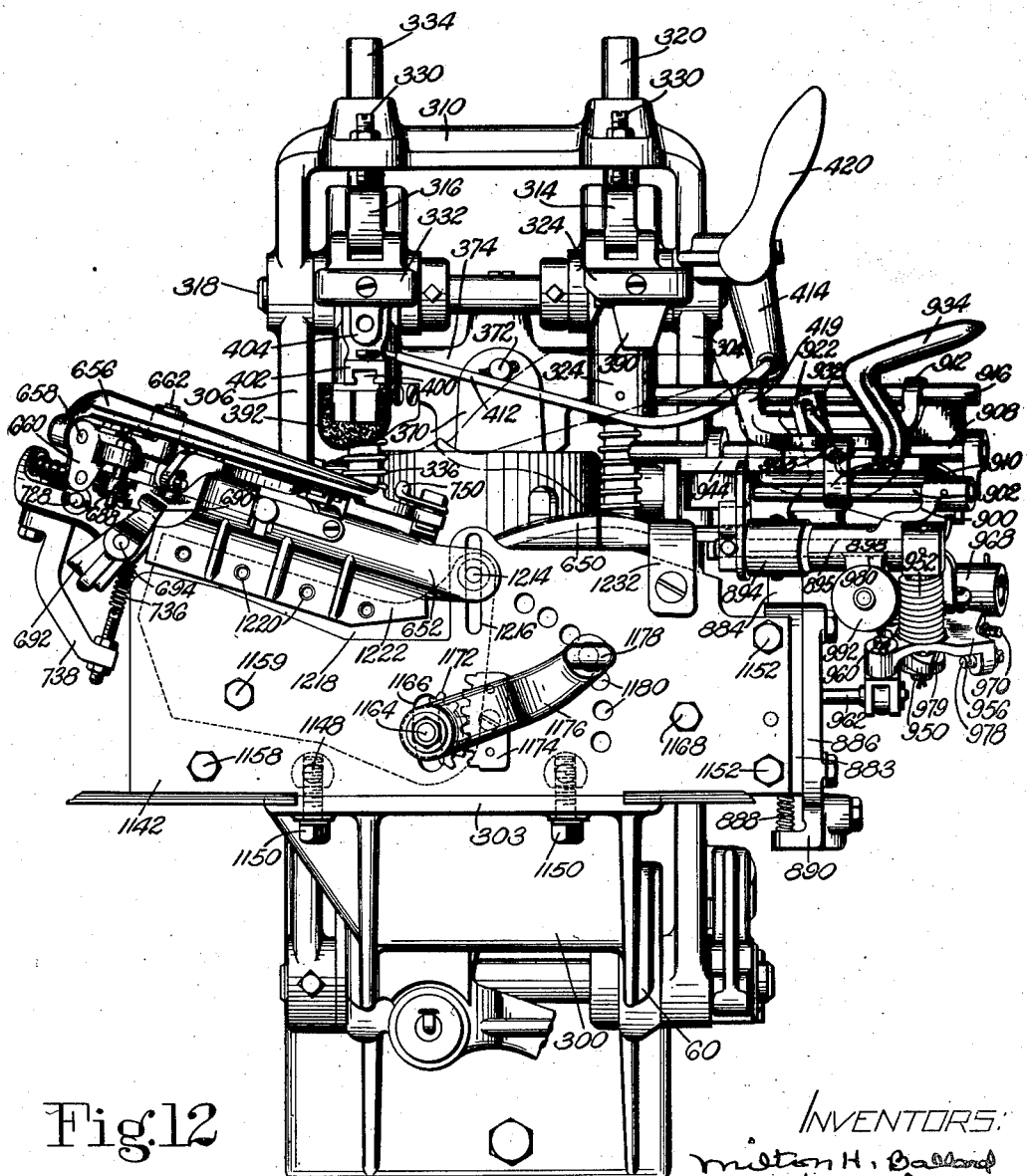
Fig. 12 is a front elevation of one of the pad boxes and the mechanism associated therewith for relatively locating the shoe and sole and applying pressure thereto.

Each of the eight brackets 60 secured to the turret 56 carries one of the pad boxes 62 and shoe-engaging and pressure-applying devices, as shown in Figs. 11 and 12, which devices will now be described. Each of the brackets 60 has two vertical side walls extending substantially radially of the turret, which walls are connected by two transverse webs 300, 302 and by a horizontal web 303 which forms a base to which the pad box 62 is secured. The pad box 62 is arranged side on to the edge of the turret and to the operator, that is, with its long axis tangential to the path of rotation of the turret, and on the side of the box remote from the operator are two uprights 304, 306 which are connected by a transverse web 308 and by a cross-head 310. The uprights 304, 306 are pivoted to the side walls of the bracket 60 below the bottom of the pad box 62 by a shaft 312 which extends transversely of the bracket 60 between the webs 300, 302. Between the uprights 304, 306 near their upper ends are pivoted on a shaft 318 two levers 314, 316 which extend substantially radially of the turret and transversely of the pad box 62. Passing through an opening formed in the lever 314 is a rod 320 which is guided in the cross-head 310 and in the web 308 for right line movement parallel to the upright 304. To the rod 320 is pinned a member 324 which extends outwardly and beneath the outer end of the lever 314 and is formed on its outer end with two ears which embrace the end of the lever 314 and are slotted to receive a pin passing loosely through them and the lever. The under side of the outer end of the lever 314 is formed with a convex surface 326 adapted to bear on a flat surface formed on the upper side of the member 324. The member 324 is held up against the lever 314 by a compression spring 328 arranged on the rod 320 between the web 308 and the member 324. Upward movement of the front arms of each of the levers 314 and 316 is limited by an adjustable stop screw 330 threaded in a lug projecting from the cross-head 310 and reverse movement of each lever is limited by a similar stop screw 331. Beneath the lever 316 (Fig. 12) a member 332 similar to the member 324 is similarly mounted on a rod 334 and is upheld by a compression spring 336. It will be observed that the mechanism described is capable of swinging radially and inwardly of the turret about the shaft 312 from the position shown in Fig. 11, in which the outer ends of the levers 314, 316 are disposed over the pad box into an inclined positon in which the forward ends of the levers 314, 316 are withdrawn from over the pad box, thus giving the operator free access thereto. To limit this inward and outward swinging movement of the uprights 304, 306, rods 340, 342 (Fig. 2) are pivoted to the uprights 304, 306, respectively, by pins 344. Each of the rods 340, 342 extends through an ear 346 pivoted to the side of a fixed cylinder 348. The inner ends of the rods are each provided with a leather washer 350 and nuts to limit the outward swinging movement of the uprights, and with a leather washer 352 and an adjustable collar 354, which, by engagement with the ears 346, limit the inward swinging movement of the uprights.

The cylinder 348 (Fig. 11) is secured to the bracket 60 and is provided with a piston 356 beneath which is a chamber 358 into which fluid under pressure may be introduced through a port 360 to move the piston upwardly. To retract the piston, pins 362 at opposite sides of the piston extend through slots 364 in the opposite sides of the cylinder. A tension spring 366 is secured to each of the pins 362 and has its lower end hooked over a pin 368 on the bracket 60.

Around the periphery of the lower end of the piston 356 is formed a groove having a rounded bottom, no outer wall, and a high inner wall 369. In this groove is a packing ring 371 U-shaped in cross-section and formed of material unaffected by oil. The ring 371 is held in place by a cap 373 fastened to the end of the piston and having a flange 375 which extends to the bottom of the U-shaped packing ring and clamps the ring firmly against the rounded bottom of the groove in the piston. The flange 375 is provided on its outer surface with a groove which receives a piston ring 377 the expansion of which holds the outer wall of the U-shaped packing ring against the inner surface of the cylinder 348 or assists the oil pressure in doing so. A vent 379 and clearances on the upper side of the cap and on the inner side of the flange permit oil pressure to gain access to the inner wall of the packing ring to hold that against the high inner side 369 of the groove in the piston. The edges of the U-shaped packing ring are beveled to augment the effect of the oil pressure in holding the free edges of the ring respectively against the cylinder wall and the inner wall 369 of the piston groove.

Figure 2:
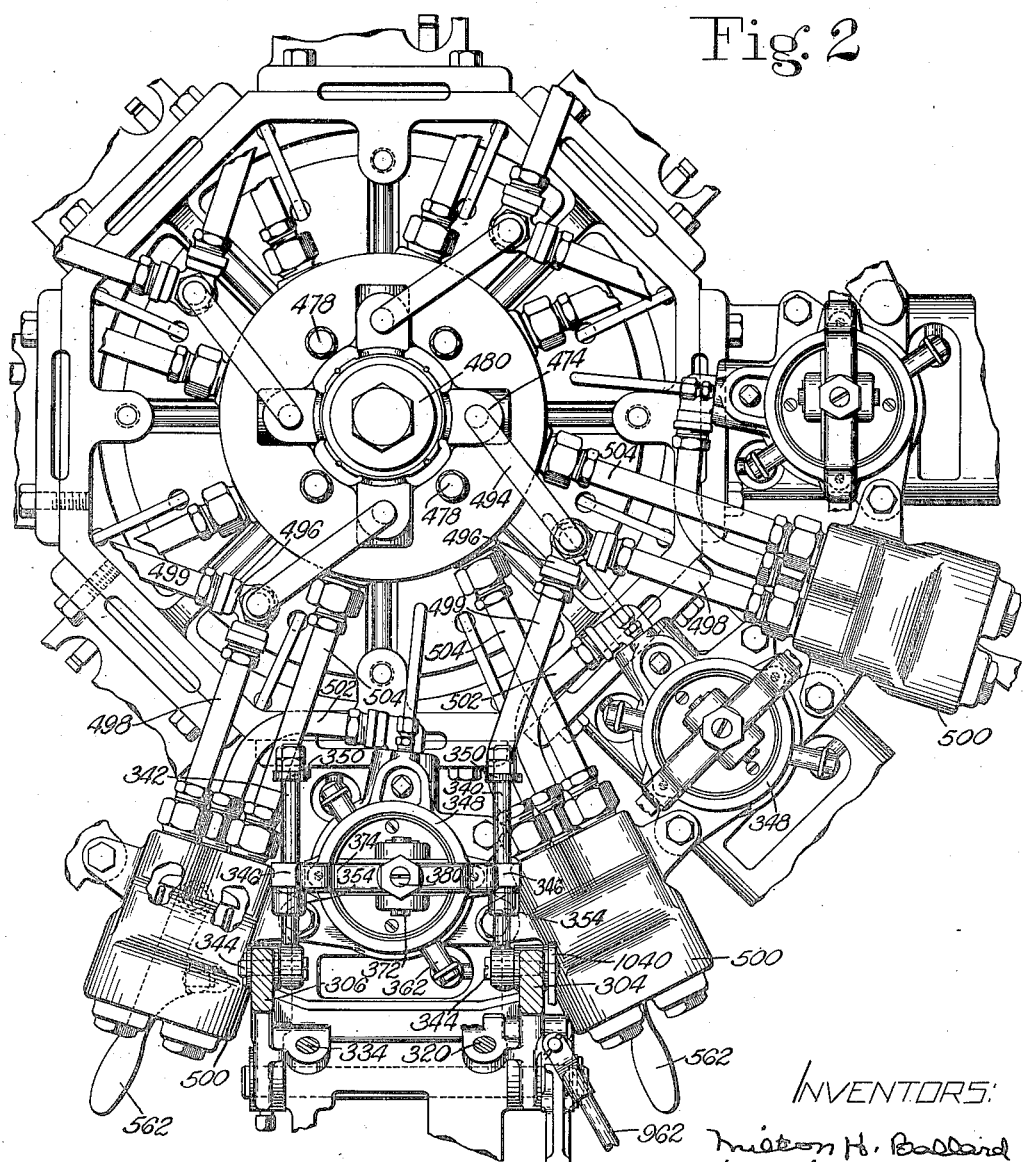
Fig. 2 is a fragmentary plan view of the machine, certain duplicated parts being omitted for simplicity of illustration.
Figure 32:
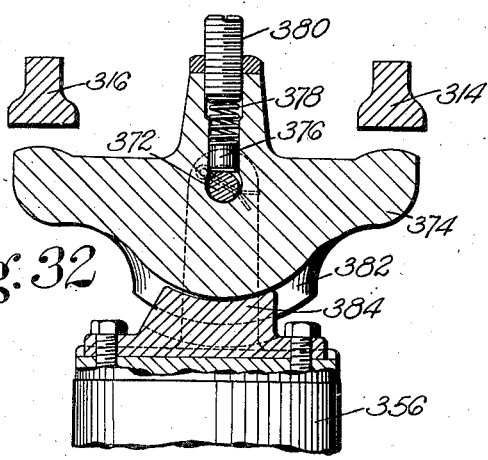
Fig. 32 is a sectional detail of parts shown in Fig. 11 taken at right angles to their positions in that figure.

On the upper end of the piston 356 are secured two ears 370 between which is mounted on a pin 372 a pressure distributing device, shown as a distributing lever 374 the opposite ends of which engage respectively the rear ends of the levers 314, 316 when the standards 304, 306 are in their upright or forward position and the piston is raised. The hole in the lever 374 (Fig. 32) through which the pin 372 passes, is slightly enlarged to permit vertical play of the lever with respect to the pin and on the upper side of the lever 374 is a projection in which is mounted a plunger 376 which engages the pin 372 and is held pressed against the pin by a spring 378, the upper end of which engages an adjustable screw 380 provided with a set nut. The spring 378 normally holds the lever 374 elevated with respect to the pin 372. On the lower portion of the lever 374 is a segment having therein a wedge-shaped groove 382 formed about the pin 372 as a center. On the top of the piston between the ears 370 and in position to cooperate with the groove 382 is a wedge-shaped lug 384 which normally just clears the side faces of the groove 382, thus permitting the lever 374 to rock freely on its pin 372. When, in the operation of the machine, there is resistance to downward movement of the outer ends of the levers 314, 316, however, the rear ends of the levers will stop and upward movement of the piston will cause the pin 372 to press the plunger 376 upwardly against the spring 378 enough to permit the wedge 384 to engage the groove 382. Thus the lever 374 will be locked to the piston and the levers 314, 316 will therefore be moved equally by further movement of the piston 356. The arms of the distributing lever 374 are unequal, the longer arm being toward the left as seen in Fig. 2. The reason for this construction will be later explained.

On the outer ends of the members 324, 332 are mounted respectively shoe engaging devices 390, 392 (Figs. 11 and 12). The device 390, which is adapted to engage the top of the cone of the last, comprises a block having on its upper part a T-head 394 which engages a T-slot formed in the lower side of the member 324 and extending longitudinally of the pad box 62. The T-head 394 is thus adjustable lengthwise of the pad. The T-head is held frictionally in adjusted position by a spring plug 396 and is removably held in place by a screw 398 engaging a slot in the side of the T-head. The device 392 on the member 332 (Fig. 12) comprises a padded member for engaging the forepart of the shoe which is mounted by means of a T-head 400 for adjustment transversely of the shoe in the direction of the tip line in a block 402 on the lower end of a post 404 which, at its upper end, is provided with a T-head mounted for movement longitudinally of the shoe in a T-slot formed in the lower face of the member 332. To adjust the toe engaging member longitudinally of the shoe, a lever 408 (Fig. 11) is pivoted between its ends at 410 to the member 332 and has its outer end formed as a ball to engage a transverse hole in the post 404 and has its rear end connected by a link 412 (Fig. 12) to a depending arm 414 on a rock shaft 416 mounted for rotation in a lug 418 formed on the front face of the upright 304. The rock shaft 416 has an upwardly projecting handle 420 by which the shaft may be rocked to move the toe rest or toe engaging device 392 longitudinally of the shoe. The handle 420 also serves as means by which the operator can swing the uprights 304, 306 and their connected mechanism forwardly to bring the shoe engaging devices 390, 392 into position over a shoe located on the pad in the box 62. Usually when the shoe engaging devices are so moved the block 390 will be at a less distance from the cone of the last than the pad 392 is from the toe of the shoe. By making the toeward arm of the lever 374 longer than the heelward arm, less movement of the piston or plunger 356 is required to bring both shoe engaging devices into contact with the shoe, the pad 392 moving quickly toward the shoe after the block has engaged the cone of the last.

To provide fluid pressure for operating the pistons 356, a gear pump 450 (Fig. 1) of usual construction is provided. For driving the pump, a gear 452 on the pump shaft meshes with the gear 104 constantly driven by the motor 110 when the machine is in operation. The fluid preferably employed is oil, a supply of which is held in a tank 454 and conducted by a pipe 456 to the receiving side 458 of the pump. From the delivery side 460 of the pump the oil is led by a pipe 462 to a distributing point 464 from which a pipe 466 leads back to the pipe 456. In the pipe 466 is a valve 468, referred to herein as a pressure-inducing valve, which is normally open so that the oil circulates idly through the pump and the portions of the piping already referred to. From the distributing point 464 a pipe 470 leads to a check valve 471 (Fig. 22) and passes through the base of the column 52 and then upwardly through the center of the column to the top of the column (Fig. 3) where it is threaded into a head 472 secured by screws 473 to the top of the column. A cap piece 474 is mounted on the head 472 for rotation with the turret 56, the upper portion 476 of which is enlarged to correspond to the size of the cap piece and on which the cap piece tightly fits. The cap piece is held down on the turret by screws 478 (Fig. 2) passing through the head 472 and threaded into the top of the turret head 476.

The upper portion of the head 472 which extends upwardly through the center of the cap piece 474 is reduced to form a cylindrical space between the head and the cap piece in which are two leather washers 482, U-shaped in cross-section, arranged with their grooves toward each other. Between the washers and fitting into their grooves is a compression spring 484 which tends to separate the washers and to hold the upper one against a ring 486 which is held down by a screw 487 having a large head. Through the head 472 in the vicinity of the spring 484 are holes 488 formed at right angles to each other and communicating with the pipe 470. Thus, oil delivered by the pipe 470 can pass into the chamber 490 partly occupied by the spring 484 between the two washers 482. The head 474 is provided with radial bores 492 which communicate with the chamber 490 and also with a number (four being shown) of U-shaped pipes 494 each of which leads to a three-way fitting 496 one of the openings of which is connected by a pipe 498 to a valve casing 500, the valve of which controls admission of fluid through a pipe 502 to one of the cylinders 348. The other opening of the fitting 496 is similarly connected through a pipe 499 to an adjacent valve casing 500. The pipe 502 is connected to the port 360, as shown in Fig. 11. A valve in the casing 500 controls the exhaust of oil from the cylinder, the oil passing back through the pipe 502 to the casing 500 and thence through a pipe 504 (Fig. 3) to the enlarged portion 476 of the turret which is formed with passages to lead oil back to the center of the column 54, the oil falling through the bottom of the column and being conducted by a pipe 516 to the tank 454.

In the turret head 476 just inside the ends of the exhaust pipes 504 there is an upstanding flange 477. After filling the space between the wall of the head and the flange 477 the oil flows over the top of the flange to a passage 479 surrounding the column 54 and communicating with the interior thereof through a port 481. The ends of the exhaust pipes by this construction are always covered with oil and ingress of air to the three-position valves is thus prevented.

Figure 8:
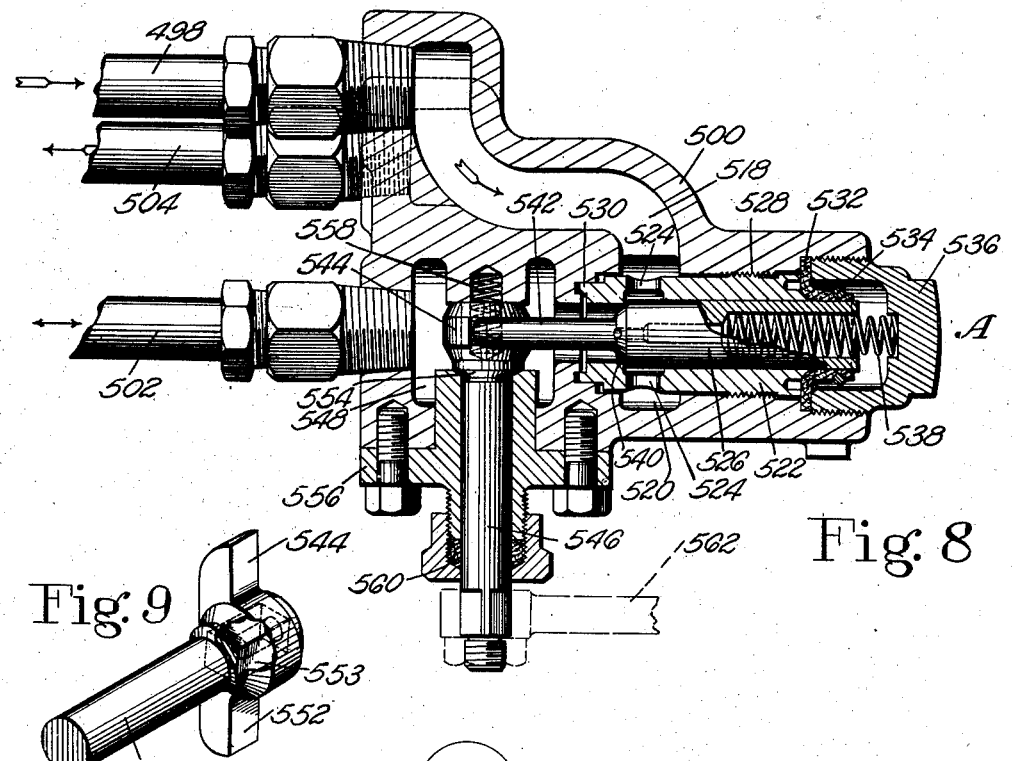
Fig. 8 is a sectional view of one of the three-position valves with which the machine is equipped.
Figure 9:
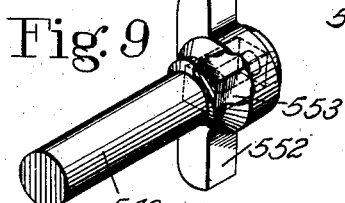
Fig. 9 is a detail in perspective of the parts shown in Fig. 8.
Figure 10:
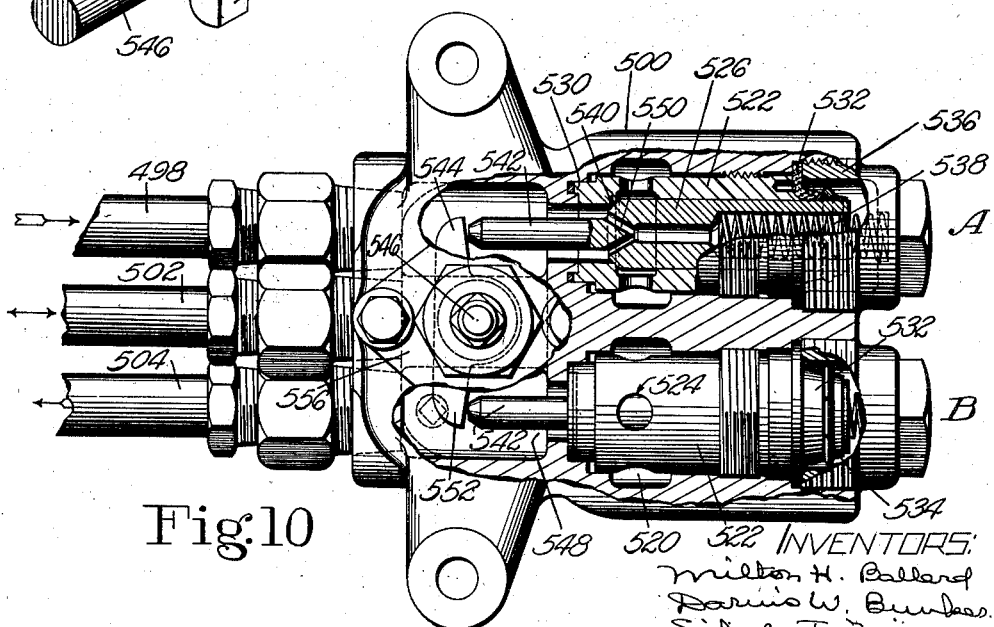
Fig. 10 is a view, partly in section, of the valve mechanism shown in Fig. 8 as seen from below.

The construction of the valves in one of the casings 500 is shown in Figs. 8, 9, and 10, Fig. 10 being a view taken from the lower side of the casing. The inlet or supply valve is indicated at A and the outlet or exhaust valve is indicated at B, the two valves being of similar construction and their like parts being designated by the same numbers. The supply pipe 498 leads through a passage 518 to a chamber 520 surrounding a sleeve 522 which has ports 524 leading from the chamber 520 to its interior in which there is fitted a cylindrical valve 526. The sleeve 522 is threaded at 528 to the casing 500 and at its inner end has a flange 530 which is sealed to the casing by a packing ring in a corresponding groove in the casing. At the outer end of the sleeve 522 is a washer 532 having an annular portion which seats against the end of the sleeve 522 and against a rabbet formed by a counterbore in the casing 500. The washer 532 has also a substantially cylindrical portion which is held by a spring ring 534 in engagement with the outer end portion of the valve 526. A cup-shaped screw plug 536 is threaded into the counterbore of the casing against the annular portion of the washer 532, thus forming a fluid-tight seal. The valve 526 is bored at its outer end to receive a compression spring 538 the outer end of which presses against the plug 536, the spring tending, of course, to hold the valve against a seat 540 formed on the inner portion of the sleeve 522. The inner portion of the valve 526 is reduced to form a stem 542 which lies in the path of an arm 544 on a rock shaft 546, so that when the shaft is rocked in a clockwise direction as shown in Fig. 10, the arm 544 will push the valve 526 outwardly against the spring 538 and fluid will be permitted to flow from the chamber 520 through the ports 524 to a chamber 548 which is in communication with the pipe 502 leading to the piston. To prevent pressure in the chamber 548 from interfering with the reseating of the valve 526, bleeding passages 550 are provided in the valve leading from the base of the stem 542 to the bore in which the spring 538 is seated. Thus, pressure in the chamber 548 is made to bear upon the two ends of the valve 526, and the spring 538 will act to close the valve when permitted to do so. The back pressure from the cylinder is allowed by the passages 550 to act against the cylindrical portion of the washer 532 and hold it tight against the valve 526. Arranged side by side with the inlet valve A is the exhaust valve B, shown as of the same construction, which controls the flow of fluid from the chamber 548 to the exhaust pipe 504. The stem 542 of the valve B is in position to be engaged by an arm 552 on the rock shaft 546. From Fig. 10 it will be seen that in one position of the rock shaft the arms 552, 544 will be out of contact with the stems 542 and both valves will be closed, this being the neutral position. When the rock shaft is turned counterclockwise as viewed in Fig. 10, the arm 552 will press on the stem 542 of the valve B and open it, allowing fluid to flow from the pipe 502 through the valve B to the exhaust pipe 504.

The rock shaft 546, which carries the arms 544 and 552, abuts at its upper end (Fig. 8) the casing 500 and is provided with a seat 554 which engages a corresponding seat formed on a cap piece 556 which forms a bearing for the rock shaft and is secured by cap-screws to the casing 500. The rock shaft is held seated against the cap piece by a compression spring 558 seated in recesses formed respectively in the casing 500 and in the rock shaft. Accidental escape of fluid by the seat 554 is prevented by a stuffing box 560 on the outer portion of the cap piece 556. For convenience in assembling the portion of the rock shaft 546 having the arms 544, 552 is made as a separate piece and is provided with a square socket to fit on a squared portion 553 of the shaft 546, as shown in Fig. 9. The rock shaft 546 is provided at its lower end with an operating handle 562 shown in dotted lines in Fig. 8. It is to be understood, as indicated in Fig. 2, that there is a valve casing 500 and a three-position valve-operating handle 562, as above described, for each of the fluid-operated pistons and, of course, a piston for each pad.

At one of the stations of the turret are provided various devices to be employed by an operator for controlling the operation of the machine, this station being referred to as the operating station and being located at the left of Fig. 1. These controlling devices will now be described with reference particularly to Fig. 22, which is a front elevation of the machine at the operating station, and to Figs. 19, 23, 24, and 25. Each handle 562 is suitably connected by an adjustable link 564 to an upright arm 566 (Fig. 23) of a three-armed valve-operating member pivoted on a shaft 568 journaled in the transverse webs 300, 302 on each of the turret brackets 60, the other arms of the member, which are nearly horizontal, being designated by 570, 572. The arm 570 carries a roll 574 which, at the operating station, lies over a vertically movable member 576. The member 576 is rigidly connected to a vertical treadle rod 578 which, at its lower end, is pivoted at 580 to a treadle bar 582 (Fig. 19) carrying a treadle 583 and fulcrumed at 584, the treadle being upheld against a stop screw 585 by a spring 586 connected at its lower end to a lug 588 on the treadle bar and at its upper end to a hook 590 (Fig. 22) on a fixed bracket 592. The fulcrum 584 of the treadle bar 582 (Fig. 19) is a stud shaft fixed in an ear 585 on a plate 587 fixed by bolts 589 to the base 51 of the machine, said plate having an arm 601 overlying the bar 582 in which the stop screw 585 is supported. One arm 594 of a lever fulcrumed at 596 (Fig. 23) to a fixed support 598 is pivoted at 600 to the member 576. The other arm 602 of the lever is slotted at 604 to receive a screw 606 which passes through the slot and is threaded into a triangular member 608 pivoted at 596 on the same shaft as the lever and carrying a roll 610 which lies beneath the arm 572 of the valve-operating member. The screw 606 and slot 604 provide for adjustment of the roll 610 relatively to the member 576 so that when the valve-operating member is in neutral position the member 576 will clear the roll 574 and the roll 610 will clear the arm 572. When the treadle 583 is depressed, the member 576 will be moved downwardly away from the roll 574 and at the same time the lever 594, 602 will be operated to raise the roll 610 and lift the arm 572 of the valve-operating member, thus turning the arm 566 clockwise, pulling on the link 564 and moving the valve handle 562 to inlet position to admit fluid to the piston which is at the operating station. In conjunction with the admission of fluid to the piston at the operating station it is desirable to release the pressure from the pad which is next to be brought to the operating station. Accordingly, as best shown in Figs. 23 and 25, a lever arm 612 is provided the left-hand end of which lies under the roll 574 of the valve-operating mechanism next to the left of the operating station. The lever arm 612 is pivoted at 614 between stationary cam members 616, 618, which are supported at one end by the fixed support 598 and at the other end on a similar fixed support 620. On the lever arm 612 is a curved depending arm 622 which carries a roll 624. The roll 624 engages a curved slot 626 in the arm 602, the slot being so shaped that during the described operation of the lever 594, 602 the arm 612 will be raised to lift the roll 574 on the valve operating member next to the operating station and thus move the connected three-position valve to exhaust position. Thus, by the same treadle the valve at the operating station is moved to inlet position and simultaneously the valve at the station next to the operating station is moved to exhaust position.

It is desirable, by the same treadle movements, to cause pressure to be applied to the shoe at the operating station in conjunction with movement of the three-position valve to inlet position at that station. Hence, the treadle rod 578 (Fig. 24) is provided with a collar 628 beneath which is a compression spring 630. A lever pivoted at 632 on a fixed support has one arm 634 bifurcated to embrace the treadle rod 578 beneath the spring 630. The other arm 636 of the lever is held depressed by a tension spring 638 and is connected by a link 640 to an operating arm 642 of the pressure-inducing valve 468 previously referred to. The operating arm 642 is lifted by depression of the treadle to close the pipe 466 which leads from the distributing point 464 back to the pipe 456 connected with the intake side of the pump 450 through which oil is being circulated by the pump, thus causing oil pressure to be delivered through the central pipe of the turret and through the open three-position valve at the operating station to the piston at that station, this three-position valve having been opened by depression of the treadle as described. The arrangement is preferably such that the treadle may be depressed sufficiently to cause the two valve-operating members 566 to be reversely moved, as shown in Fig. 23, before the valve 468 is completely closed. This may conveniently be effected by making the spring 630 weaker than the spring 638.

The mechanism for relatively locating the forepart of a shoe and sole upon a pad 650 in the pad box 62 will now be described. Surrounding the forepart of the pad 650 (Figs. 12 and 13) is a U-shaped frame 652 upon which the shoe and sole locating mechanism is carried. A pair of feelers 654, 655 is provided to engage the opposite sides of the sole in the vicinity of the ends of the ball line or at opposite sides of the widest portion of the sole. The feeler 654 is on the end of an arm 656 which is pivoted by a horizontal pin 658 to a pair of ears on a member 660 which is pivoted on an upright pin 662, which pin is substantially perpendicular to the general plane in which the U-shaped member 652 lies, that is, to the general plane of the forepart of the pad. It will be seen that the feeler 654 can move substantially perpendicularly to the surface of the pad 650 about the pin 658, so that the feeler will rest by gravity upon the surface of the pad and can move laterally of the pad about the pin 662 on an arc which is, generally speaking, perpendicular to the longitudinal median line of the shoe sole represented at C in Fig. 13. At the opposite side of the pad the feeler 655 is similarly carried by an arm 657 which is pivoted for movement perpendicularly to the pad on a horizontal pin 659 and for movement transversely of the pad on an upright pin 663. The feeler 654 is urged to move laterally of the pad toward the sole C about the center 662 by a compression spring 664 mounted on a rod 666 fixed at one end in an ear 668 on the frame 652 and at its other passing freely through an ear 670 formed on the member 660, the ends of the spring 664 abutting respectively the ears 668 and 670. The feeler 655 is similarly urged toward the shoe by a compression spring 665 similarly mounted between ears 669 and 671 formed respectively on the frame 652 and a member 661 similar to the member 660 and movable about the pin 663. For engaging the sole C in the vicinity of the ends of the tip line, feelers 672, 673 are provided. The feeler 673 is carried by an arm 674 which is pivoted by a horizontal pin 676 to an ear 678 on a member 680 pivoted on the pin 662, which, of course, is on the opposite side of the shoe from the pin 653 about which the feeler 655 moves; that is, the feeler 673 moves in an arc the general direction of which is inclined to the longitudinal median line of the sole at approximately 45 degrees, with the result that as the feelers 655, 673 are moved outwardly away from the median line of the sole the distance longitudinally of the sole between the feelers increases, the feeler 673 moving toward the toe end of the pad with respect to the feeler 655 as they are both moved outwardly away from the center of the pad to accommodate a larger sole. The feeler 672 is similarly mounted on an arm 675 pivoted by a horizontal pin 677 to an ear 679 formed on a member 681 similar to the member 680 pivoted on the upright pin 663. The member 680 carries a pin 682 which is connected by a tension spring 684 to a pin 686 fixed on the frame 652, the pin 682 being far enough from the pivot 662 so that the spring urges the member 680 in a clockwise direction and swings the arm 674 toward the sole C. The member 681 is similarly urged by a spring 685 in a counterclockwise direction to swing the arm 675 toward the sole. It will be observed that the arms 674, 675 cross each other, and that each pair of feelers, for example 673, 655 which engage one side of the sole, are mounted respectively on the pins 662, 663 which are on opposite sides of the longitudinal median line of the sole.

To permit the operator to place the sole C upon the pad 650 in the position which he thinks best for the particular style, size or shape of the sole, the pairs of feelers at opposite sides of the sole are held separated or in inoperative positions against their independent springs 664, 665, 684, 685 by the following mechanism: The member 660 carrying the feeler arm 656 has on its under side a roll 688, shown in dotted lines in Fig. 13, in position to be engaged by a lug 690 upwardly projecting from a rocking member 692 mounted on a transverse pivot shaft 694, the roll 688 being located outwardly of the pin 662 so that pressure of the lug 690 on the roll produced by counterclockwise rocking movement of the rocking member 692 will cause the arm 656 to move outwardly of the shoe against its spring 664. A roll 696 projecting downwardly from the member 680 and located inwardly of its pivot 662 is similarly engaged by a lug 698 on the rocking member 692, so that rocking movement of the member in the same direction will move the member 680 against the spring 684 and cause the arm 674 to be moved away from the sole. A roll 700 projecting downwardly from the member 661 is engaged by a lug 702 on the rocking member 692 to move the feeler arm 657 away from the sole, and a roll 704 on the member 681 is engaged by a lug 706 on the rocking member 692 to move the feeler arm 675 away from the sole. Thus, by counterclockwise movement of the rocking member 692, all the feeler arms are simultaneously moved in a direction outwardly of the pad to permit introduction of the sole C. The rocking member 692 is operated in a manner to be described by a rod 708 pivoted at 710 to an upwardly extending arm 712 on the rocking member.

After a sole C has been placed on the pad and the feelers 654, 655, 672, 673 have been allowed to be moved by their respective independent springs 664, 665, 685, 684 toward the sole to engage its edge face at opposite ends of the ball line and opposite ends of the tip line, which action is of course permitted by clockwise rocking movement of the member 692, it is desired to lock the feelers in their sole engaging position. For this purpose each of the members 660, 661, 680, 681 is provided with an extension in the form of a thin plate, each plate extending beyond the center line of the pad so that the plates are arranged in overlapping relation to each other and when pressure is applied to them the arms will be locked against movement about their pivots 662, 663. As best shown in Fig. 14, an upper plate 714 is an extension on the member 661, a plate 715 is on the member 681, a plate 716 is on the member 660, and a plate 717 is on the member 680. Each of the plates is formed with an arcuate slot 718 struck from the center 662 or 663 about which the plate swings when the feeler arms are moved. The lower plate 717 rests on a surface formed on the frame member 652, and passing through all of the slots 718 is a bolt 720 on which is a washer 722 engaging the top of the plate 714 and held on the bolt by a nut and set nut. The lower portion of the bolt 720 is provided with a notch in one side which is engaged by a projection 724 of a lever 726 fulcrumed at 728 very close to the projection 724. The lever 726 is U-shaped so that the bolt 720 can be centrally located with respect to the lever, and the two arms of the U-shaped lever are connected by two pins 730, 732. On the pin 730 is a roll 734 and connected to the pin 732 is a tension spring 736 the lower end of which is secured to a bracket 738 (Fig. 12) secured to the frame 652. It will be seen that the tension spring 736 tends to move the lever 726 in a direction to apply pressure to the overlapping plates 714, 715, 716, 717, the parts being shown in such locked position in Fig. 14. To unlock the plates, the rocking member 692 is provided with a cam surface 739 to engage the roll 734, the surface being so formed that when the rocking member 692 is moved in a counterclockwise direction the roll and the lever 726 will be lifted against the spring 736 to relieve the pressure on the plates, further movement of the rocking member moving the feelers away from the shoe, as already described. Conversely, when the rocking member 692 is moved in a clockwise direction, all the feelers are allowed to be moved by their springs toward a sole on a pad until they engage the edge face of the sole, final movement of the rocking member releasing the roll 734 and permitting the spring 736 to draw down the bolt 720 and firmly clamp the plates between the washer 722 and the frame 652, thereby locking the feelers in contact with the sole and holding the sole against movement in forward or lateral directions at least.

Each of the feelers carries a shoe gage 740 mounted in superposed relation thereto, as illustrated in Fig. 15. Each of the shoe gages 740 mounted on the feelers is of the same construction except that the gages which engage the opposite ends of the ball portion of the shoe are extended heightwise of the shoe more than the gages which engage the shoe adjacent to the ends of the tip line, and since these gages are otherwise substantially identical only the one that is associated with the feeler 655 will be described in detail. The gage 740 is carried on the end of a slide 742 mounted in a guideway formed in the upper surface of the feeler member 655 and secured to the feeler arm 657 by screws 744 which pass through holes in the feeler arm, through a slot 746 in the slide, and are threaded into the feeler member 655, the construction being such that the slide 742 is movable perpendicularly to the sole engaging face of the feeler. A frusto-conical member 748 having a handle 750 is mounted in a conical recess in the feeler arm 657. The conical member 748 is urged yieldingly downwardly into the recess in the feeler arm by a spring 752 occupying a counterbored hole in the upper portion of the conical member and resting at its lower end against the conical member. The upper end of the spring is engaged by the head of a screw 754 which passes through the conical member, through the slot 746 of the slide 742, and is threaded into the feeler 655. The lower face of the conical member 748 carries an eccentric pin 756 which engages a groove 758 extending transversely of the slide 742. By turning the conical member 748 by its handle 750 against the friction of the conical member in its recess, the slide 742 may be adjusted in a direction perpendicular to the sole engaging face of the feeler 655 to locate the shoe gage 740 either inwardly of the sole beyond the feeler, in case the sole projects beyond the portion of the shoe in contact with the gage, or outwardly of the sole in case the side of the shoe above the feeler projects outwardly beyond the sole. The former condition is represented in Fig. 13 in the case of the feelers 655, 673, and 672 and the latter condition in the case of the feeler 654. The friction of the frusto-conical member in its seat is sufficient to resist any normal operating pressure against the gage 740 but can be overcome easily by the handle 750.

The mechanism for controlling the operation of the forepart feelers and gages will now be described. The above-mentioned rod 708 (Fig. 13) carries a pin 760 arranged to slide in a slot formed in a guide bar 762 fixed to the frame 652. The opposite end of the pin carries a roll 764 which engages a groove 766 in the upright arm 768 of a bell-crank lever pivoted at 568 to the turret and having a horizontal arm 770 (Figs. 22, 26, 28, and 29) with an upturned end. The arm 770 carries a roll 772 which, when the pad to which it belongs is at the operating station, rests initially on a ledge 774 (Fig. 29) extending laterally from a lever 776 one end of which is fulcrumed at 614 and the other end of which is pivoted to a treadle rod 778 which passes through an ear 780 (Fig. 19) in a treadle frame 782 and is provided with a washer 783 and a nut and set nut below the ear. The ear 780 has a stud 784 by which it is pivoted to the frame 782. The frame 782 is in the form of a hollow rectangle having at its rear end two ears 786 pivoted on the shaft 216 and at its front end two ears 788 which receive a shaft 790 on which ears 792 of a treadle 794 are secured. The shaft 216 is fixed in an upstanding portion 796 of the plate 587. The treadle 794 has an upstanding arm 798 (Fig. 30) connected by a tension spring 800 to the frame 782. Beneath the treadle 794 is a stop screw 802 which, after the treadle 794 is turned against the spring 800 through a small arc about its pivot 790, engages a downwardly projecting lug 804 on the frame 782, further depression of the treadle moving the frame 782 about its fulcrum 216 against the tension of a strong tension spring 806 secured at its lower end to a hook 808 on the frame 782 and at its upper end to a hook 810 on the bracket 592 (Fig. 28). Downward movement of the frame 782 against the spring 806 pulls downwardly on the rod 778 and lowers the ledge 774 on the lever 776 away from the roll 772, thus permitting the several independent springs 664, 665, 684, 685 to swing the feelers toward the sole on the pad. To swing the angle lever 768, 770 in a clockwise direction (Figs. 26 and 28) a tension spring 812 is provided connected between the lever and a pin on the bracket 60, an abutment screw 814 being provided on the arm 768 to engage the bracket 60 so that the roll 772 on the arm 770 cannot drop far enough to prevent its properly engaging the stationary cam member 618 when, due to the rotation of the turret, it approaches that member. The spring 206 is strong enough to overcome the spring 812 as well as all of the feeler-arm-closing springs.

A latch, best shown in Fig. 29, is provided to hold the treadle frame 782 in depressed position and permit the feelers and gages to be held in operative relation to the shoe. The lever 776 carries a latch plate 816 the top corner of which, when the lever 776 is depressed by operation of the treadle 794, is engaged by a ledge 817 on a latch plate 818 secured to a latch 819. The latch 819 is fixed to a rockshaft 820 parallel to and below the shaft 614, the shaft being journaled in a lug 821 on a stationary part of the machine and also supported by a strut 822. The latch 819 is normally urged in a counterclockwise direction by a tension spring 823 connected between a fixed lug 824 on the frame and a downward projection 825 on the latch 819.

If the operator, after depressing the treadle, finds it desirable for any reason to release it again, for example, in case the forepart positioning feelers should not properly engage the sole, a handle 826 fixed to the shaft 820 can be moved in a clockwise direction to release the latch.

When the lever 776 is locked in depressed position by the latch 819, an upward projection or nose 828 (Fig. 26) on the right-hand end of the latch projects above an inclined face 830 on the lever 776. If, when the lever is in this depressed position, the turret is rotated, a roll 832 (Figs. 11 and 25) on the shaft 568 will first engage an inclined face 834 on the lever 776, slightly depressing it to relieve the pressure on the latch, and will then engage the nose 828 and depress it, thus releasing the latch 819 and allowing the treadle spring 806 to raise the lever 776 until the inclined face 830 on the lever engages the roll 832. The roll, in passing over this face 830 of the lever 776, allows the lever to be raised by the spring 806 gradually and without shock.

It is desirable so to arrange the mechanism that the pressure-controlling treadle 583 cannot be depressed far enough to apply pressure to a shoe at the operating station unless the forepart positioning feelers have been allowed to come into operative position by depression of the treadle 794. On the other hand, it is desirable that the treadle 583 be depressible only far enough to release the pressure on the shoe which is next to come to the operating station when the treadle 794 has not been depressed, for example, when all the shoes are being removed from the machine at the end of a run.

As shown in Fig. 20, there is an upward extension 838 on the treadle frame 782 (Fig. 19) the rear face of which engages a lug 840 on the plate 587 and limits upward movement of the treadle frame by its spring 806. On the extension 838 is a face 842 underlying a lateral projection 844 of the pressure-controlled lever 582, the space between the face 842 and the projection 844 being such that the treadle 583 may be depressed far enough to release the pressure from the shoe on the pad next to come to the operating station but cannot be depressed far enough to apply pressure to the shoe at the operating station until the treadle 794 has been depressed. Depression of the treadle 794 will swing the extension 838 far enough in a counterclockwise direction to remove the face 842 from under the projection 844 so that the lever 582 can be depressed until the projection 844 engages the lug 840, that is, it can be depressed far enough to close the pressure-inducing valve 468 and cause pressure to be applied to the shoe at the operating station. Depression of the treadle frame 782 is limited by engagement of the extension 838 with a stop screw 845.

In order to lock the pressure-controlled treadle bar 582 in partially depressed position, that is, in position to relieve pressure from the shoe at the operator's left but not depressed far enough to apply pressure to the shoe at the operating station, mechanism best shown in Fig. 27 is provided part of which has been already described. Since the treadle 583 should be locked down only after the treadle 794 has been depressed and should be released when the turret is rotated, the locking means is preferably controlled by the treadle 794. On the upstanding arm 798 of the treadle 794 (Fig. 30) is a laterally projecting plate 846 which, when the treadle 794 is in its normally raised position, overlies a plate 848 secured to a nearly vertical face 850 on the treadle bar 582. When the treadle 794 is depressed, it first rocks on its pivot 790 against the spring 800, which movement swings the plate 846 forwardly out of position over the plate 848 so that the treadle 794 is depressible without interfering with the treadle bar 582 and will, of course, be locked down by the latch 819. When the operator takes his foot off the treadle 794 and depresses the treadle 583, the spring 800 will swing the plate 846 over the plate 848 after the treadle 583 has been depressed far enough to relieve pressure from the shoe at the operator's left, thus locking the treadle 583 against upward movement unless the treadle 794 is again depressed. Of course, when the latch 819 is released, for example, by rotation of the turret as described, the treadle 794 will rise to normal position and with it the treadle 583.

It is desirable to prevent tripping of the clutch to cause rotation of the turret unless the operator-controlled treadle bar 582 has been depressed at least far enough to cause the pressure upon the shoe at the operator's left to be relieved. Mechanism for this purpose is best shown in Figs. 19, 20, and 21. The clutch tripping handle 218 is, it will be remembered, removably seated in a rocking member 214 pivoted on the shaft 216. The rocking member 214 is provided with an upstanding portion 852 to which is pivoted between its ends at 854 a lever 856 (Fig. 19). The right-hand end of the lever 856 is upheld by a compression spring 858 (Fig. 21) against a stop screw 860 threaded through a lug 861 on the portion 852. The left-hand end of the lever 856 has a face 862 which lies behind the rear face of the projection 844 on the treadle bar 582 (Fig. 20) when the treadle bar is in raised position so that the member 214 cannot be rocked forward by the handle 218 to trip the clutch unless the treadle bar 582 has been depressed at least far enough to engage the face 842 on the extension 838 of the treadle frame 782. If the bar 582 has been so depressed, the face 862 on the lever 856 can pass over the top of the projection 844 and the clutch can be tripped. If the treadle bar 582 is released while the member 214 is rocked forwardly, the projection 844 will engage the end of the lever 856 and lift it against the spring 858. When the handle 218 is released and the rocking member 214 is rocked rearwardly by a tension spring 864 connected between the pin 865 (Fig. 19) on the plate 587 as far as permitted by a stop screw 868 (Fig. 21), the spring 858 will raise the right-hand end of the lever 856 and move the face 862 thereon down behind the projection 844 (Fig. 20).

In case the turret is rotated when the treadle 794 is in raised position, the roll 832 will engage the inclined face 834 on the lever 776 and forcibly depress it. If the rod 778 were positively connected at its lower end to the treadle 794 the treadle would therefore be forcibly depressed, and if something, for example the operator's foot, happened be be under the treadle, accident or breakage might result. Accordingly, as shown in Fig. 27, the treadle rod 778 has a reduced portion at its lower end which passes freely through the ear 780 and is provided below the ear with a washer 783 and with a nut and lock nut. Above the ear is a compression spring 866 which abuts at its upper end a washer 868 above which are a nut and lock nut threaded on the larger part of the rod 778. When the rod 778 is forcibly depressed, the spring 866 can yield if descent of the treadle 794 is prevented.

Figure 22:
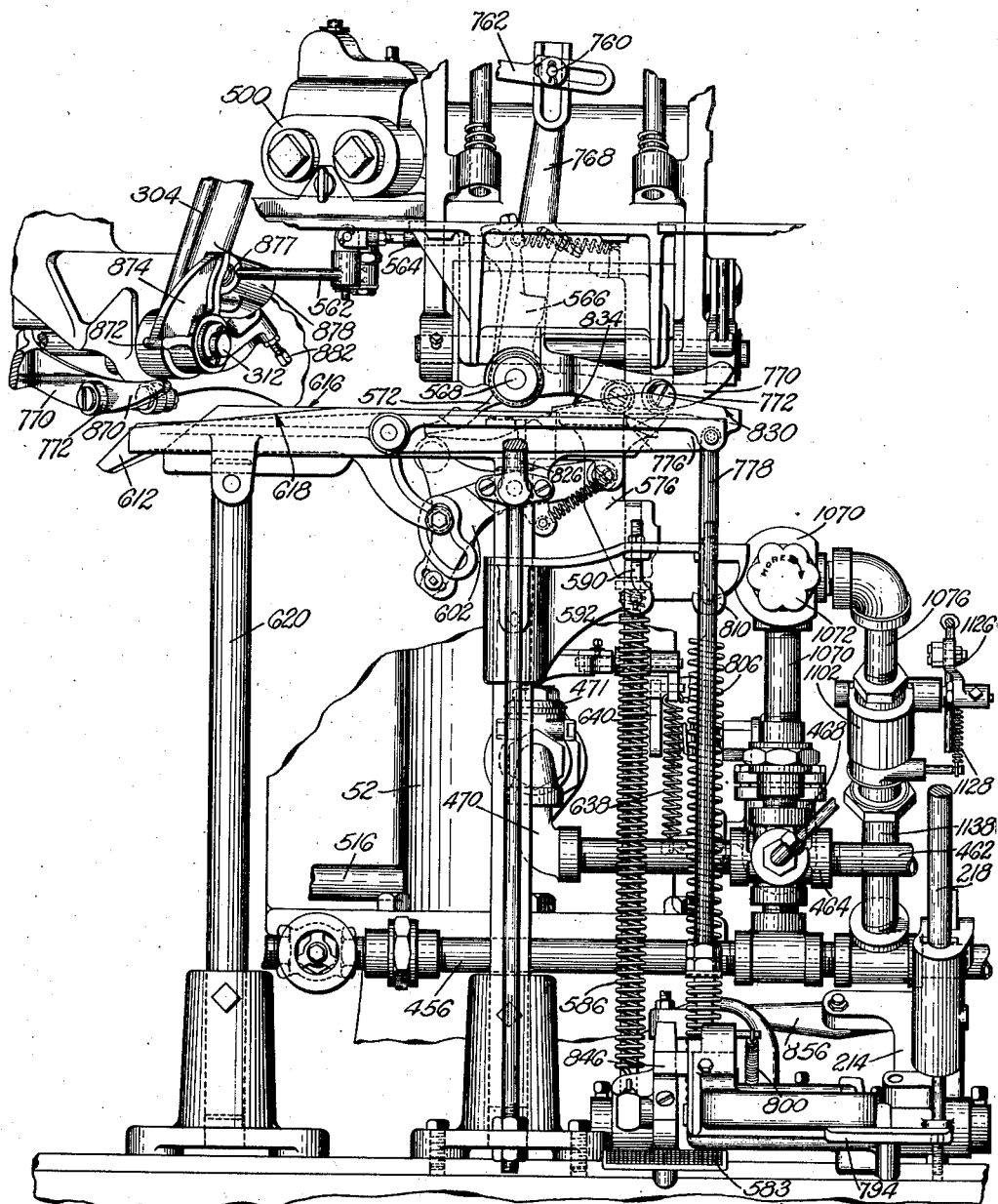
Fig. 22 is a front elevation of the lower portion of the machine.

Referring particularly to Fig. 22, it will be seen that when the turret rotates, the roll 772 on the lever arm 770 belonging to the pad next to the left of that at the operating station will engage and ride upon the stationary cam 618, the surface of which is inclined to raise the arm 770 to cause the feeler and gage mechanism connected therewith to be moved away from the shoe into an inoperative position, the roll 772 finally arriving over the ledge 774 when the turret stops (Fig. 11). It is to be understood that pressure has been relieved from the shoe on the pad at the left before the turret is rotated, and it is desirable that the shoe engaging mechanism by which pressure is applied to the shoe be automatically swung inwardly of the turret out of position over the pad at the left during the movement of that pad to the operating station. Accordingly, an upturned end 870 of the arm 770 (Figs. 11 and 22) is arranged to engage a surface 872 formed on a member 874 rotatably mounted on the shaft 312 on which the uprights 304, 306 are pivoted. Another surface 876 on the member 874 which is substantially at right angles to the surface 872 is arranged to engage a spring 877 seated in a chamber formed in a lug 878 on the upright 304. A rearwardly extending arm 880 of the member 874 carries a stop screw 882 which engages the rear face of the lug 878 and limits movement of the member 874 in response to the spring 877. When the arm 770 is lifted by the stationary cam 618, the upturned end 870 of the arm 770 engages the surface 872 and, through the spring 877, yieldingly pushes the upright 304 inwardly of the turret, thus moving the shoe engaging mechanism out of position over the shoe so that when the shoe reaches the operating station it can readily be removed, the forepart feelers and gages having been moved to an inoperative position by mechanism already described and the positioning mechanism for the rear end of the shoe having been moved away from the shoe automatically by the movement of the upright 304 inwardly of the turret in a manner to be described.

Figure 16:
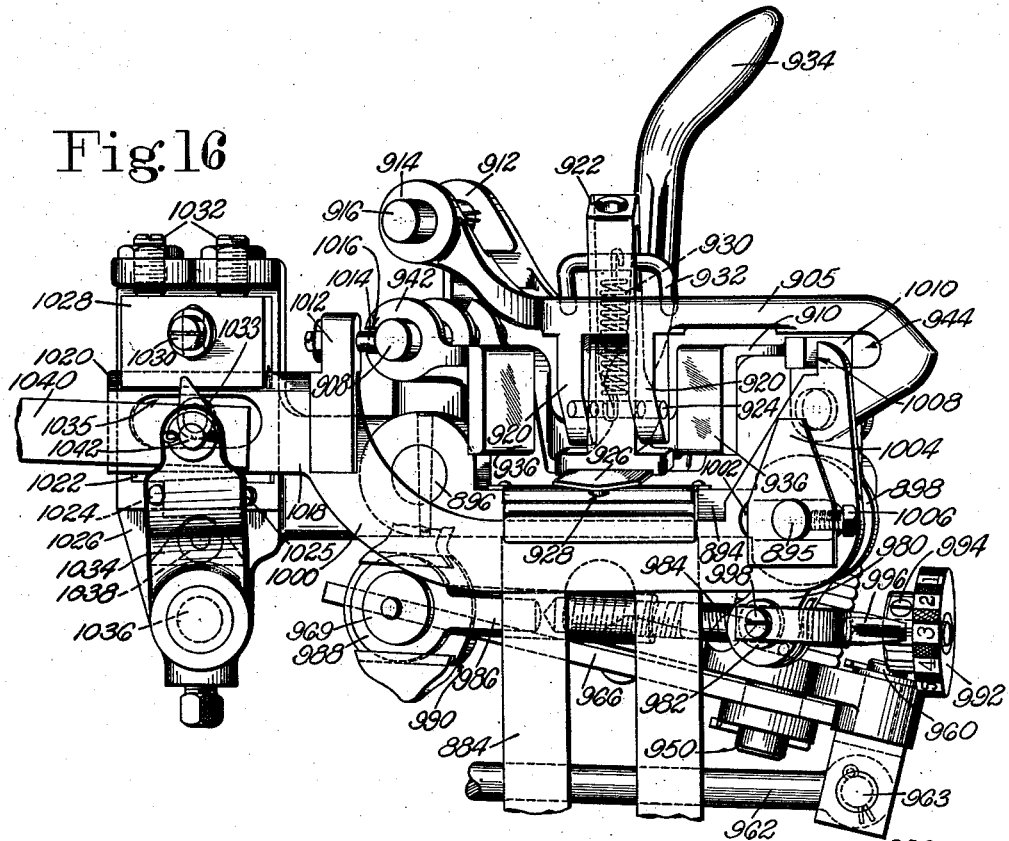
Fig. 16 is an elevation of the mechanism for relatively positioning the rear part of the shoe and sole as seen from the center of the pad.

The positioning mechanism for the rear end of the shoe and sole and the connections between the shoe positioning mechanism and the upright 304 will now be described. The sole is prepared for use in this machine by forming in the longitudinal median line of the heel-seat portion thereof a hole or slot. The position of the hole longitudinally of the sole is immaterial so far as operation of the machine is concerned and may conveniently be located so that the screw frequently employed for attaching the heel will pass through it. Each of the pad boxes 62 has a rear end wall 883 provided with a vertical guideway in which is a slide 884. The slide is held in place by a plate 886 secured to the rear end of the box by cap screws 887. The slide 884, the central portion of which is slotted out to lighten it, is upheld by compression springs 888 the upper ends of which are seated in the slide and the lower ends of which engage upstanding pins 889 seated in a projecting ledge 890 on the plate 886 (Fig. 12). The springs 888 normally hold the slide 884 in a raised position adjustably determined by the engagement of a ledge 891 on the slide 884 with the lower side of the capstan head of a stop screw 892 which is threaded into the plate 886 and is held by a set-screw 893. All the positioning mechanism for the rear part of the shoe and sole is carried by a cross-bar 894 secured to or formed integrally with the top of the slide 884. For this purpose the cross-bar 894 is provided with two rearwardly projecting studs 895, 896 (Fig. 16). On the stud 895 (Fig. 12) is a rocking sleeve 898 having an upstanding arm 900 in which is fixed a rod 902 on which a bearing lug 904 of a member 905 is pivoted and on which it can slide longitudinally of the pad box. The member 905 carries a sole engaging mechanism to be described. The stud 896 (Fig. 17) carries a rocking member 906 having an upstanding arm 907 in which a rod 908 is rotatably mounted and on which a member 910 which carries the shoe finding and locating mechanism is pivoted.

The rear side of the member 905 (Fig. 16) is upturned and provided with two longitudinally spaced ears 912, 914 slidably mounted on a rod 916. A link plate 918 (Fig. 17) the lower edge of which is seated in a slot in the rod 908 and the top edge of which is seated in a slot in the rod 916 connects the rods 908, 916. The ear 912 extends only three quarters of the way around the rod 916 to permit rocking movement of the plate 918 and the rod 916 relatively to the ear 912, while the ear 914 completely surrounds the rod 916. By this construction it will be seen that the member 905 can slide longitudinally of the pad box on the rods 902, 916 and can move transversely of the pad box by reason of the parallel linkage provided by the arm 900 pivoted on the stud 895 and the link plate 918 which connects the rod 916 to the rod 908 (Fig. 11). The member 905 (Fig. 16) has two downwardly projecting lugs 920 between which a substantially square bar 922 is pivoted by a transverse pin 924. The lower end of the bar 922 is enlarged and slotted to receive a forwardly projecting tongue 926 which is fixed thereto and has on its under side a short pin 928 which is adapted to engage the hole in the rear end of the sole. It will be seen that by rocking the bar 922 on its pivot 924 the end of the tongue carrying the pin can be raised and lowered, that is, moved toward and from the sole on the pad. To maintain the tongue in either its raised or its lowered position, a toggle spring is provided. As shown, the bar 922 is bored longitudinally from its upper end to receive a tension spring 930 and the bar is longitudinally slotted to receive a U-shaped member 932 to which the upper end of the spring 930 is secured, the lower end of the spring being secured under tension to the pin 924 at the bottom of the bore. The legs of the U-shaped member 932 rest in recesses in the top of the member 905, said recesses being in vertical alinement with the pin 924. Thus, when the bar 922 is tipped forward, the spring tends to hold the tongue depressed with the pin 928 in the hole in the sole, and when the bar 922 is tipped backward the spring tends to hold the tongue in raised position. For operating the tongue, a conveniently shaped and located handle 934 formed on or secured to the rear face of the bar 922 is provided. It will now be seen that the operator, after placing the sole on the pad, may grasp the handle 934 and move the member 905 longitudinally or laterally of the sole until the pin 928 on the tongue 926 is over the hole in the sole and then, by lifting the handle 934, may cause the pin to engage the hole. That is, the pin 928 is freely movable by the operator longitudinally, transversely and vertically to enable him to find the hole in the sole with the pin 928. After this is done, the forepart feelers 654, 7&

655, 672 and 673 will be allowed to approach the sole by operation of the treadle 794. The feelers will find the sole and will be locked in their positions of engagement with the sole to hold it in place. It will be understood that the sole, when placed upon the pad, will have activated cement upon its marginal portion and that immediately thereafter a shoe will be placed upon the sole, the forepart of the shoe being located relatively to the sole by the shoe gages 740, which, of course, are adjusted in the proper relation to their respective sole feelers by the handles 750. The operator now grasps the handle 420 and moves the shoe engaging mechanism over the shoe by rocking the uprights 304, 306 about the shaft 312. It is this movement of the upright 304 which is utilized to effect proper relative location of the rear part of the sole and the rear part of the shoe.

The mechanism for finding and holding the rear end of the shoe will now be described. The member 910, as best shown in Fig. 13, comprises a generally U-shaped frame, the opening of the U being directed toward the shoe and having oppositely inclined faces 936 arranged to engage opposite sides of the rear or counter portion of the shoe. At the opposite end the member 910 has a strengthening web 938 connecting the side portions of the U. At its rear side the frame 910 has two ears 940, 942 arranged to slide on the longitudinally extending rod 908. The ear 940 (Fig. 17) is cut away on its upper side to receive the link plate 918 and permit rocking of the plate with the rod 908. The front side of the member 910 has straight and parallel top and bottom surfaces which are received by a slot 944 of suitable lateral extent formed in the member 905 (Fig. 16). The rocking member 906 (Fig. 17) has, beside the arm 907 which engages the rod 908, another arm 946 through which the rod 908 extends. It will be seen, therefore, that the U-shaped member 910 can move freely laterally of the pad on the parallel links 907, 946 which are pivoted at their lower ends on the stud 896 and at their upper ends on the rod 908, the outer side of the member 910 sliding laterally in the slot 944. It will also be apparent that the member 910 can move freely longitudinally of the shoe on the rod 908 and in the slot 944.

Figure 18:
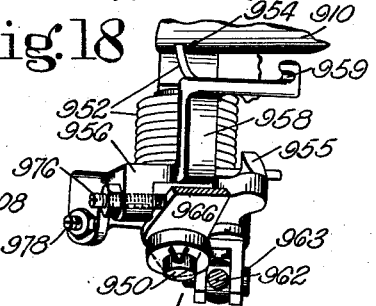
Fig. 18 is a perspective detail of parts shown in Fig. 12 as seen from the rear.

Fixed to the right-hand end of the stud 895 (Fig. 11) is a block 948 in which is fixed a downwardly and rearwardly projecting stud 950. On the stud 950 is a loose spacing sleeve 951 about which is coiled a torsion spring 952 the upper end of which is extended and upturned to engage a transverse slot 954 (Fig. 13) in the web 938 of the member 910. The lower end of the spring 952 (Fig. 18) engages a lug 955 on a member 956 pivoted on the lower end of the stud 950. The member 956 has a crooked arm 958 at the end of which is a notch 959 to engage the upper end portion of the spring 952 so that when the member 956 is turned in a clockwise direction, when viewed from the operator's position, the spring 952 will be tensioned and the member 910 carrying the shoe engaging faces 936 will be drawn away from the shoe. Pivoted in the member 956 is a stud 960 (Fig. 16) the lower end of which is bifurcated to receive the forward end of a rod 962 pivoted therein by a pin 963, the rear end of the rod 962 being connected by a universal joint 964 to the upright 304 (Fig. 11). The stud 960 is on that side of the stud 950 which is toward the shoe (Fig. 12) so that as the upright 304 is swung into vertical position to bring the shoe engaging devices over the shoe the member 956 will be turned in a counterclockwise direction, as viewed from the operator's position, and the spring 952 will react to move the member 910 toward the shoe, and, since the member 910 is freely movable laterally of the shoe, the surfaces 936 will find the shoe in the position in which it happens to be located. When, in its movement, the member 910 engages the shoe, the notch 959 in the arm 958 will move away from the spring 952 and not interfere with further movement of the member 956.

In order properly to locate the rear end of the shoe and sole relatively to each other, it is preferable to hold the shoe and to shift the rear end of the sole relatively to the rear end of the shoe into its proper position with respect to the shoe. This is effected as follows: Pivoted on the stud 950 is a flat arm 966 (Figs. 17 and 18) which has a reduced end extending through wide slots 967 in opposite sides of a hollow cylindrical portion 968 formed on an arm 970 projecting downwardly from the sleeve 906. Mounted in the cylindrical portion 968 is a plunger 972 having a cylindrical portion fitting the hollow cylinder 968 and a conical end 969. The plunger 972 is provided with a slot 974 to receive the free reduced end of the arm 966. The central portion of the slot 974 is restricted so that when the arm moves to the right (Fig. 17) it binds in the slot 974 and locks the arm and plunger together, with the result that, since the stud 950 is fixed, the sleeve 905 becomes fixed also, and consequently lateral movement of the shoe engaging faces 936 is prevented. So to move the arm 966 to lock the shoe finding member 910 in shoe engaging position, a screw 976 (Fig. 18) is threaded through a downwardly projecting lug on the member 956 in position to engage the arm 966 during the latter portion of the movement of the member 956 in response to movement of the upright 304 into vertical position and after the spring 952, which moves the member 910 toward the shoe, has been released by the arm 958. When the upright 304 is moved backwardly, a screw 978 (Fig. 12) threaded through a lug on the member 956 engages a portion 979 of the arm 966 which projects forwardly beyond the stud 950, thus moving the arm to the left and unlocking the arm from the slot 974.

Figure 17:
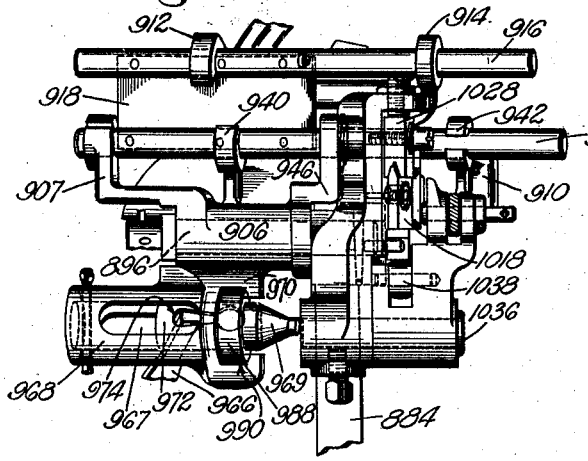
Fig. 17 is a rear elevation of parts shown in Fig. 16.

To shift the rear end of the sole into central position with respect to the shoe in case they are not already alined, the sleeve 898 is provided with a downwardly projecting, bifurcated arm 980 (Figs. 12 and 16) through the bifurcations of which passes a large pin 982. A rod 984 has a right-hand threaded portion threaded through the pin 982 between the bifurcations and a left-hand threaded portion threaded into a member 986 which has a ring-shaped end 988 guided on transversely straight grooves 990 formed in the right-hand end of the hollow cylindrical portion 968 (Fig. 17). The hole in the ring 988 is a sliding fit over the cylindrical portion of the plunger 972 and of course the ring is shifted laterally of the plunger in accordance with the lateral movement of the pin 928 which engages the sole. By forcing the conical end 969 of the cylindrical plunger 972 through the ring, the ring will be shifted to the right or left into alinement with the plunger and, if the plunger is fixed against lateral movement, will shift the sole by moving the pin 928 to the right or left. When the ring 988 offers resistance to passage of the conical end of the plunger 972 through it as it will do if its center is out of line with the center of the plunger, the arm 966 will be locked in the slot 974 and further movement of the arm 966 will move the plunger 972 through the ring 988 and cause it to aline with the plunger. Since this can occur only after the arm 966 is locked to the plunger and movement of the shoe engaging faces is prevented, the result is that the pin 928 is moved laterally and hence moves the end of the sole laterally relatively to the shoe into alinement with the shoe.

The rod 984 is provided with a thumb head 992, turning of which clockwise will move the pin 928 to the left in Fig. 16 relatively to the surfaces 936, 936 provided the cylindrical portion of the plunger 972 is in the ring 988. The normal setting is such that the pin 928 is centrally located between the surfaces 936, 936 and, if the sole will be centrally actly fits the pin 928, the sole will be centrally located with respect to the position of the shoe as determined by the surfaces 936, 936.

In preparing the sole for attachment to a shoe certain molding or shaping operations are frequently performed upon it which may distort the sole, particularly by causing the shank and rear portion to swing to one side or the other, depending upon whether the sole is a right or left, of the position it had when the sole was died out or rounded. When the forepart of such a sole is properly located with respect to the forepart of the shoe, as is done by the forepart positioning mechanism hereinbefore described, the rear part of the sole may not lie centrally under the rear part of the shoe but may be disposed to the right or left with respect to the rear end of the shoe. The purpose of the above described rear end positioning mechanism is to correct such mislocation of the shank and heel portion of the sole with respect to the shoe. It will be apparent that one part of the mechanism, namely, the pin 928, has positive engagement with the sole; another part of the mechanism carrying the surfaces 936, 936 finds and holds the shoe. Then, by insertion of the plunger 972 through the ring 988, the sole is moved by the pin into a central or correct position with respect to the bottom of the shoe, it being immaterial whether the rear end of the sole is disposed to the right or left with respect to the shoe.

Half of the pads with which the machine is equipped are preferably fitted for right shoes exclusively and the other half for left shoes, the right and left pads being alternately arranged on the turret. In the case of a right shoe, as shown in Fig. 13, the displacement of the rear end of the sole will, under the usual conditions, always be outwardly of the machine toward the operator, that is, toward the bottom of the figure, and for a left shoe the displacement will occur in the opposite direction. These conditions are taken care of by turning the thumb head 992 either to the right or left so that the position of the pin when the shoe and sole are relatively located will be a little to one side or the other of a line bisecting the angle between the surfaces 936, 936. This compensates for any looseness of the pin 928 in the hole in the sole and, since the pad is used always for a shoe for the same foot (right or left) and the displacement of the sole is generally in the same direction for all shoes for the same foot, the adjustment of the pin once made for a given sized hole will not need to be changed. Since the amount of adjustment needed is slight, on the order for example of .09 inch, and since the amount of movement per turn of the head is doubled by the right and left threads on the rod 984, a single turn of the head is sufficient. Accordingly, a set screw 994 which holds the head on the rod 984 is made long enough to serve as a stop by engagement with a detent spring 996 arranged to engage notches formed in a reduced portion of the head 992 (Fig. 16). The spring 996 is secured at 998 to the pin 982 through which the rod 984 is threaded and numbers may be provided on the thumb head 992 to assist the operator in properly adjusting the pin 928.

In order further to lock the member 910 against movement laterally with the shoe, to prevent springing apart of the surfaces 936, 936 of the U-shaped member 910 while the shoe is under pressure and to take up looseness of the ears 940, 942 on the rod 908, mechanism shown in Figs. 11, 13 and 16 is provided. A yoke member 1000 has a horizontal slot 1002 engaging the left-hand end of the stud 894 upon which it is held by a block 1004 secured by a set screw 1006. An upstanding portion of the yoke 1000 has a surface 1008 arranged to engage a straight outer face 1010 on the shoe engaging member 910. The yoke member 1000 has secured to it or integral therewith an upstanding portion 1012 through which a screw 1014 is threaded and provided with a check nut. The screw is so set that it just clears the rod 908 when the surface 1008 is resting against the face 1010, the rod and the face being of course parallel. The yoke 1000, being free to move horizontally on the stud 894, does not interfere with the longitudinal and lateral movements of the member 910 to find the shoe. The ear 942 is slotted at 1016 to permit passage of it by the screw 1014 so that full movement of the member 910 is permitted. To lock the yoke 1000 at times to hold the U-shaped member 910 rigidly in position against bodily displacement and against springing apart of its arms, the yoke 1000 is provided with an extension 1018 the upper edge of which is oppositely beveled at 1020 and the lower edge of which rests on the top face of a block 1022. The lower portion of the block 1022 is made narrow so that the block can be supported and guided for vertical movement by two pins 1024 and 1025, one at each side of the narrow portion, the pins being inserted in an extension 1026 of the cross bar 894. Over the beveled upper edge 1020 of the extension 1018 of the yoke is a block 1028 having a groove in its lower edge the sides of which are inclined to correspond with the bevels 1020. The block 1028 is held by a washer and screw 1030 passing through a vertical slot in the block and threaded into the extension 1026. Bearing on the top edge of the block 1028 are two screws 1032 threaded through overhanging lugs on the extension 1026 and having check nuts. The block 1028 is so adjusted and set vertically by the means thus provided that when the block 1022 rests on the pins 1024, 1025, the extension 1018 and its yoke 1000 are freely movable laterally of the pad box 62 and so that upward pressure of the block 1022 will force the beveled upper edge of the extension 1018 into the groove in the lower edge of the block 1028, thus locking the yoke against movement. Preferably the extension 1018 of the yoke 1000 instead of resting on the upper surface of the block 1022 is supported by an anti-friction roll 1033 which is mounted on the extension 1026 and engages the upper side of a horizontal slot 1035 formed in the extension 1018 of the yoke. To operate the block 1022 to lock the yoke 1000, a lever 1034 is pivoted at 1036 to the extension 1026 and carries a roll 1038 which, when the lever 1034 is moved in a clockwise direction as shown in Fig. 16, pushes upwardly on the block 1022 and locks the yoke 1000. The lever 1034 is operated by a link 1040 which is pivoted at 1042 to the lever and has a slot 1044 (Fig. 11) at its inner end engaging the pin 344 on the upright 304. When the upright 304 is swung outwardly nearly to its vertical position, the pin 344 engages the outer end of the slot 1044 in the link 1040 and moves the lever 1034 clockwise (Fig. 16) to lock the yoke 1000 and, when the upright is swung inwardly nearly to its limit, the pin 344 engages the opposite end of the slot 1044 and unlocks the yoke.

By reference to Fig. 13 of the drawings, it will be seen that the heel end positioning mechanism above described is mounted for movement longitudinally of the pad in a direction substantially parallel with the longitudinal median line of the rear part of the shoe and sole. The mechanism shown in Fig. 13 is intended for operation on a right shoe and hence the rods 902, 908 and 916, instead of being parallel to the sides of the pad box 62, are arranged at a slight angle thereto so that the movement of the rear end positioning devices toward the shoe will be directed rearwardly or inwardly of the machine and in substantially the direction parallel to the longitudinal median line of the rear part of a right shoe and sole placed upon the pad with its sides generally parallel to the sides of the box. It will be understood that in the case of a pad for a left shoe the inclination of the direction of movement of the heel end positioning devices will be equal and opposite. This arrangement does not require mechanism for use with a left shoe any different from that used with a right shoe but merely requires that the cross-bar 894 be arranged at different angles in a horizontal plane with respect to the vertical plane of movement of the supporting slide 884 as required by right and left shoes. When, in the case of a left shoe, the heel positioning mechanism is arranged for movement toward the center of the pad and outwardly of the machine, that is, at the opposite inclination to that shown in Fig. 13, the link 1040 which operates the locking mechanism for the slide 1000 will be connected to the right-hand side of the lever 1034 instead of in a bifurcation of the lever, as shown in Fig. 13.

Since every other one of the heel-positioning mechanisms is used for left shoes and the alternate ones for right shoes, it is desirable that the pin 928 and the shoe-finding member 910, when used, say for a right shoe, be normally located at that side of the central position where they will be near the position required for that shoe. Hence compression springs 1045, 1046 (Fig. 13) are arranged to abut at their front ends against the head 894 of the slide 884 and at their rear ends to engage respectively a lug 1047 on the sleeve 898 to which the pin 928 is connected, and a lug 1048 on the sleeve 896 to which the member 910 is connected. When either the pin 928 or the member 910 is moved to the right or left the compression springs 1045, 1046 become slightly elongated and hence tend to hold these members yieldingly in either the right or the left position where they are normally used.

Figure 36:
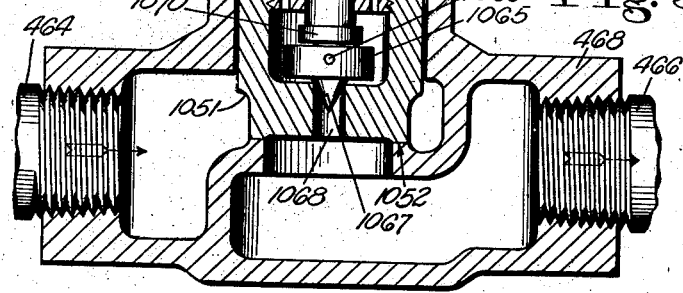
Fig. 36 is a longitudinal section of the pressure-inducing valve.

The pressure-inducing valve 468, which is closed by final movement of the treadle 583 to cause pressure to be applied to a shoe at the operating station, is shown in detail in Fig. 36, the valve being in closed position. Inside the casing of the valve 468 and loosely guided for vertical movement therein is a hollow plunger 1050 the lower portion of which is reduced to form an annular flange 1051. The lower end of the plunger rests on a valve seat 1052 when the valve is closed and interrupts the flow of fluid through the valve. When the plunger 1050 is lifted, which is its normal position, there is free flow of fluid through the valve, and the pump 450 runs idly without producing any substantial pressure in the system. Secured to the top of the casing of the valve 468 by a suitable fluid-tight joint is a dome 1054 in which is a suitable bearing for a rock shaft 1056 having an arm 1058 pivoted at 1060 to an upright rod 1062. The rod 1062 passes freely through a hole in a plug 1064 threaded in the top of the plunger 1050. The rod has a member 1065 attached by a pin 1066 to its lower end, the pin being loose in the hole in the rod 1062 through which it passes so that a conical projection 1067 on the member 1065 can readily seat itself in a hole 1068 leading through the plunger. Extending through the plug 1064 are several vent holes 1069. When the rod 1062 is lifted by a counterclockwise movement of the rock shaft 1056, the hole 1068 is first opened and then a flange 1070 on the rod 1062 engages the plug 1064 and lifts the plunger 1050.

When the valve is closed, fluid pressure builds up on the intake side of the valve, seeps by the loose plunger 1050 to the inside of the dome 1054 and presses down on top of the plunger 1050. Since pressures up to 300 pounds per square inch are employed, the plunger is held to the valve seat so firmly that it would be impracticable to lift the plunger against such pressure, and the spring 638 is, of course, inadequate for this purpose. However, by the construction described, when the pressure on the treadle 583 is released the spring 638 acts to turn the rock shaft 1056 counterclockwise and is sufficiently strong to lift the rod 1062 and unseat the conical projection 1067 from the hole 1068, the cross-sectional area of which is small so that the fluid pressure holding the rod down can be readily overcome. Opening of the hole 1068 allows the fluid on the top side of the plunger 1050 to "bleed" through the vents 1069 faster than it can pass up around the plunger, thus relieving the pressure holding the plunger to the valve seat and permitting the spring 638 to raise the plunger, thus establishing free flow of fluid through the valve 468. Moreover, when the pressure above the plunger is reduced as explained, the upward pressure on the angular flange 1051 helps to lift the plunger.

Figure 33:
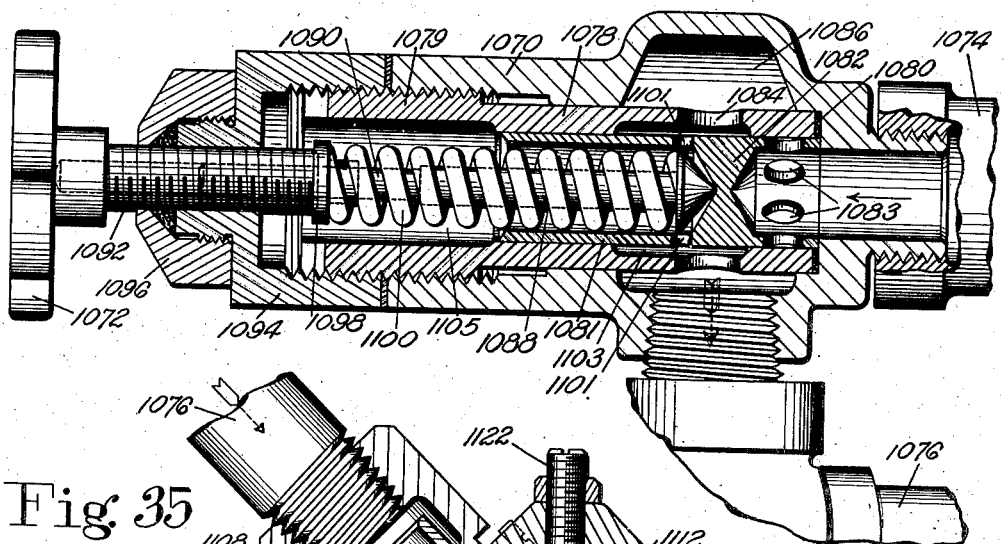
Fig. 33 is a longitudinal section of the pressure-control valve.

Means is provided for limiting and varying the pressure which can be applied to the shoe. In the illustrated machine this means comprises a pressure-control valve 1070 having the construction shown in Fig. 33, which valve is located, as shown in Figs. 1 and 22, at the front side of the machine where its controlling hand-wheel 1072 may conveniently be reached. A pipe 1074 leads from the distributing point 464 to the inlet side of the valve 1070, and a pipe 1076 leads from the outlet side of the valve to a pressure guarantee valve to be described. The valve (Fig. 33) comprises a casing into which is threaded a sleeve 1078 the threaded portion 1079 of which extends beyond the casing, while its opposite end has a fluid-tight seal at 1080 against the casing. Inside the sleeve 1078 is accurately fitted a sliding sleeve valve 1081 in which is a septum 1082. At the right-hand side of the septum the sleeve 1081 has ports 1083 which, when the sleeve is moved to the left, communicate with ports 1084 in the sleeve 1078, these ports leading to a chamber 1086 in the casing extending about the sleeve 1078 and communicating with the outlet pipe 1076. Bearing on the left-hand side of the septum is a conical headed plunger 1088, a reduced portion 1090 of which slides in a hole bored axially of a screw 1092 but not entirely through it, upon which is the hand wheel 1072. The screw 1092 is threaded through a cap 1094 which screws on to the projecting portion of the sleeve 1078. A packing gland 1096 is provided for the screw 1092. On the stem 1090 is a sleeve washer 1098 against which the screw 1092 bears, and between the washer and the head of the plunger 1088 is a strong compression spring 1100 the tension of which can be varied by turning the screw 1092 by its hand-wheel 1072 and which holds the sleeve valve 1080 toward the right against the valve casing. Pressure from the pipe 1074 presses upon the septum of the valve and when sufficient to overcome the tension of the spring 1100 slides the valve to the left, exposing the ports 1083, permitting the flow of fluid through the valve. By varying the tension on the spring 1100, the valve may be set to permit passage of fluid through it at any desired predetermined pressure. Free movement of the valve in response to fluid pressure in one direction or to the reaction of the spring 1100 in the other is afforded by providing vents 1101 in the sleeve 1081 which, through an enlargement 1103 of the bore of the sleeve 1078, maintain constant communication between the chamber 1086 and a space 1105 containing the spring 1100. Otherwise the vacuum or pressure conditions in the spring chamber 1105 would interfere with the sliding movements of the valve sleeve 1081.

Figure 35:
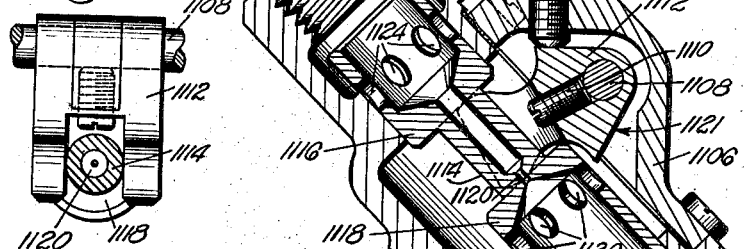
Fig. 35 is a view partly in section and partly in elevation of parts shown in Fig. 34.
Figure 34:
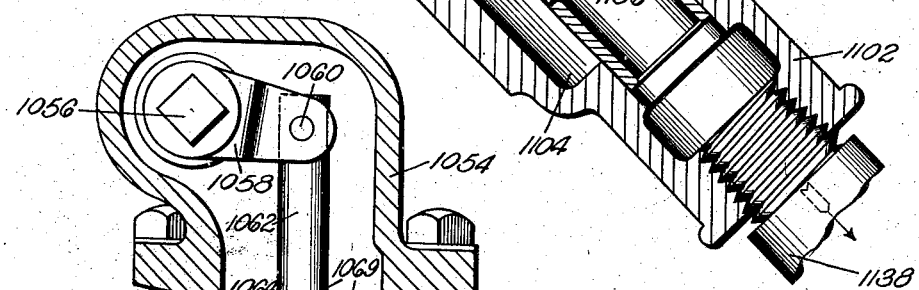
Fig. 34 is a longitudinal section of the pressure-guarantee valve.

The pipe 1076 leads from the outlet side of the pressure-control valve 1070 to a pressure-guarantee valve 1102 illustrated in Figs. 34 and 35 and located as indicated in Figs. 1 and 22. The purpose of this valve is automatically to prevent tripping of the clutch to cause rotation of the turret until the pressure for which the pressure-control valve 1070 is set has been attained. The casing 1102 of the pressure-guarantee valve has an enlarged central chamber 1104 closed at one side by a cap 1106 secured fluid tight to the casing. Journaled in the cap 1106 is a rock-shaft 1108 on which is secured by a set-screw 1110 a bifurcated arm 1112 which straddles a reduced portion 1114 of a sliding valve in the form of two hollow cylinders 1116 and 1118 open at their outer ends and connected by a passage 1120 extending through the reduced portion 1114. The bifurcations of the arm 1112 engage at their edges the ends of the cylinders, the edges being curved so that they remain close to the cylinder ends as the cylinders move to and fro and the arm 1112 rocks the shaft 1108. Movement of the cylinders in one direction, that is, downwardly and toward the right in Fig. 34, is limited by engagement of a surface 1121 on the arm 1112 with the inner face of the cap 1106 and in the opposite direction by engagement of the other side of the arm with an adjustable stop screw 1122. The upper cylinder has ports 1124 which, in the normal position of the valve, as shown, are closed and fluid coming from the pressure-control valve 1070 cannot pass except through the restricted passage 1120 which permits slow passage of liquid through it so that the cylinder 1116 may be moved to closed position. On the rock-shaft 1108 is an angle lever 1126 (Fig. 1) one arm of which is connected by a tension spring 1128 to a fixed pin and the other arm of which is pivoted to the rod 134 previously referred to as controlling tripping of the clutch. When pressure has been built up in the cylinder 348, which is at the operating station, to the point for which the pressure-control valve 1070 has been set, fluid begins to pass in volume through that valve and presses on the cylinder 1116 of the pressure-guarantee valve 1102, causing the two cylinders 1116 and 1118 to move from the position of Fig. 34 and the rock-shaft 1108 to turn counterclockwise against the tension of the spring 1128. The rod 134 (Fig. 5) is thus withdrawn to the left from engagement with the projection 136 and the clutch may therefore be tripped. When the rod 134 has been thus withdrawn, a latch 1130 pivoted at 266 drops behind a collar 1132 threaded on the rod and prevents return of the rod until a step rotation has occurred. When, during such rotation of the turret, the latch 268 is lifted as described, it engages a pin 1134 on the latch 1130 and lifts it to release the collar 1132 and permit the spring 1128 to restore the cylinders 1116 and 1118 to normal position which it can do even if the supply pipe 1076 is full since the restricted passage 1120 allows enough fluid to pass through it to permit movement of the cylinder 1116 by the spring 1128 after the ports 1124 are closed. When the cylinder 1116 has moved far enough to withdraw the rod and cause it to be latched, the ports 1124 open into the chamber 1104 and fluid can pass therefrom through continuously open ports 1136 in the cylinder 1118 to a pipe 1138 connected to the pipe 456 which leads to the supply side of the pump. A pull rod 1140 having a button conveniently accessible to the operator is connected to the upper arm of the angle lever 1126. If, for any reason, for example, when removing the shoes from the machine at the end of a run, the operator wishes to dispense with the automatic action of the pressure-guarantee valve, he can pull on the rod 1140 and then trip the clutch even if the pressure in the cylinder 348 at the operating station has not reached the limit for which the pressure-control valve is set.

The construction of one of the pad boxes 62 and of the pad with which it is fitted will now be described with reference to Figs. 12 and 37 to 40. The box has a flat front side wall 1142 (Fig. 12) and a similar rear wall 1144 (Fig. 37), which walls are held in spaced relation at the bottom by transverse bars 1146 the ends of which are reduced and enter holes 1148 in the front wall 1142 and similar holes in the rear wall. These bars are utilized to clamp the box down upon the bracket 300, cap screws 1150 passing up through the bracket and entering threaded holes in the bars 1146. Between the right-hand ends of the side walls 1142, 1144, is bolted at 1152 the end wall 883 in which is formed the guideway for the slide 884, already described. At the forepart of the box the two walls are held in spaced relation by sleeves 1156, 1157, through which and through the side walls of the box pass bolts 1158, 1159 the nuts of which clamp the side walls against the ends of the sleeves and maintain the side walls in properly spaced relation. The bottom of the box is formed by two members 1160, 1162 which at their inner ends are pivoted together by a pintle shaft 1164 the outer end of which passes through an arcuate slot 1166 (Fig. 12) in the side wall 1142 and the opposite end of which passes through a similar slot in the side wall 1144. The rear end of the member 1162 is pivoted on a transverse rod 1168 supported at its ends in the side walls. The front end of the member 1160 has legs 1170 (Figs. 1 and 37) having horizontal surfaces which rest on the transverse sleeve 1156. The legs 1170 are provided with openings 1171 surrounding the sleeve 1157 which permit limited movement of the member 1160 relatively to the sleeve. Each end of the shaft 1164, where it projects beyond the side wall, has fixed to it a gear segment 1172 which is arranged to mesh with a segment 1174 secured to the side wall, as shown in Fig. 12, it being understood that on the opposite end of the shaft 1164 is a gear segment like the segment 1172 and on the rear wall of the box a fixed segment like the segment 1174. The curve of the segments 1174 is struck from the center of the rod 1168. The shaft 1164 is provided with a handle 1176 by which the shaft may be rotated and, because of the meshing of the segments 1172 thereon with the fixed segments 1174, the shaft 1164 and the bottom member 1162 are moved about the rod 1168 as a pivot. At the same time, the rear end of the member 1160 is raised and lowered, the consequent movement of the member 1160 longitudinally of the box being provided for by the horizontal surfaces of the legs 1170. The handle member 1176 is held in various adjusted positions by a spring plunger 1178 (Fig. 13) which can be withdrawn to permit movement of the handle and is adapted to engage any one of a series of holes 1180 (Fig. 12) formed in the side wall 1142. The lower portion of the end of the forepart of the box is closed by a member 1182 secured at its lower edge by cap screws 1184 to the end of the member 1160. In the lower part of the box, resting against the end member 1182 and the bottom members 1160 and 1162, is a water bag 1186, preferably of rubber, the rear end of which has an opening which is closed by an outer plate 1188 and an inner clamping member 1190 which are clamped together with the rubber of the bag about the opening between them by means of screws 1192 which pass through the plate 1188 and are threaded into the member 1190. Centrally of the member 1190 is a filling opening 1194 closed by a plug 1196. The plate 1188 which extends substantially across the end of the bag is supported by projecting portions 1198 on the end wall 883. A portion 1200 of the end wall 883 overhangs the top of the bag at its right-hand end.

Resting directly on top of the water bag 1186 is a shoe engaging pad 1202 also of rubber. As illustrated, the forepart of this pad is of cellular construction, the cells containing sand and the shank portion has a large downwardly open cavity filled with a separate shank pad 1204 which, as shown, is a water bag shaped to fill the cavity. The opening of this bag is closed by pinching the margins of the opening between a plate 1206 and a member 1208 which is provided with a peripheral bead to engage the rubber. As best shown in Fig. 39, the plates 1206 and 1208 are clamped together by cap screws 1210. The plate 1208 is provided with a filling opening closed by a plug 1212. In the forepart of the pad, as shown in Fig. 38, are sixteen hermetically sealed rubber cells, each cell being filled as completely as possible with sand. It has been found that the sand most satisfactory for this purpose is wind-blown sand, as distinguished from water-worn sand or sharp sand, and also that sand of this character is composed of particles of silica which are spheroidal in shape, some prolate and others oblate, but practically none of them being perfect spheres and all of them having ground rather than polished surfaces. When a mass of sand of this character is pressed upon by an object, it tends, under light pressure, to assume the shape of the surface of the object which engages it and, upon further pressure, to become set or stabilized so as to support the object without substantial further change of form.

The sand is preferably screened to obtain grains of fairly uniform size, say from .02 to .04 of an inch in diameter. The described action of the sand is particularly advantageous for use in a sole pressing pad under conditions where it is desirable to maintain the portion of the sole pressed on in a substantially flat condition, as at the forepart of some shoes. The amount of initial pressure of the shoe and sole upon the pad to cause the pad surface to conform to the contour of a shoe bottom and to set up a stabilized condition in the sand is slight and insufficient to produce substantial wrapping of the sole at its margin. Once the stabilized condition is established, any required pressure may be applied to press the shoe and sole together without substantial change in the pad contour; hence a flat condition of the attached sole at the forepart is produced. While the use of the cellular sand pad construction is contemplated also at the shank portion and is advantageous under certain conditions where the wrap required at the shank portion is not extreme, it is believed preferable, under average conditions and for shoes which are to have high heels and for which the transverse curvature of the shank is abrupt, to provide, as illustrated, a water pad at the shank which will give a wrapping effect certainly adequate to meet these conditions. It is also contemplated that in place of the water bag at the shank a similar pad of solid soft rubber may be substituted, this having been found to produce satisfactory results where conditions are not too exacting. If a sand pad were employed without the internal cellular construction described, it would be found that, while the pad would conform to the shoe bottom and the sand become stabilized substantially as in the cellular construction, this condition once set up would remain and would not re-conform itself to another shoe bottom unless in the meantime the loose condition of the sand had been re-established, for example, by subjecting the pad or box to shock. The disclosed multicellular construction of the sand pad overcomes this difficulty and causes the sand to return to an unstabilized condition as soon as the sole attaching pressure is removed. During the preliminary conformation of the pad to the shoe bottom, the resilient walls of the cells are more or less distorted and, of course, remain in that condition after the sand is stabilized by the sole attaching pressure. After that pressure is removed, however, the resilient walls of the cells return to their initial condition and disturb the sand so that it is returned to its original loose or unstabilized condition. It has been found in practice that cellular pads in which the cells are approximately cubical and in which the capacity of each cell is approximately a cubic inch give satisfactory results.

The forepart of the sand pad is fitted within the U-shaped frame 652 which has already been described as carrying the forepart shoe and sole positioning mechanism. The end of the front arm of the frame 652 is provided with a pin 1214 which extends through a vertical slot in the front side wall 1142. The opposite end of the frame 652 is provided with a similar pin 1215 which extends inwardly through a similar slot in the rear side wall 1144 (Fig. 37). The inner end of the pin 1214 engages an upstanding ear of a thin plate 1218 which is riveted at 1220 to a downwardly extending flange 1222 on the frame 652 and extends downwardly inside the front wall of the box below the shaft 1164 and the bolt 1159. A similar plate 1218 is provided on the opposite side of the box, as shown in Fig. 37, the upstanding ear of which is pivoted to the pin 1215 in the rear end of the frame 652. These plates are provided with slots 1224 elongated longitudinally of the box to receive the shaft 1164 and the bolt 1159.

It will now be appreciated that the adjustment afforded by movement of the handle 1176 serves to vary the longitudinal contour of the shoe engaging face of the pad. From Fig. 37 it will be seen that movement of the shaft 1164 up and down varies the angle between the members 1160, 1162 forming the bottom of the box, and, since the structures of the pads described are flexible, the longitudinal contour of the top of the pad will be varied in accordance with the vertical position of the shaft 1164; that is, by raising this shaft the top of the pad can be flattened out to accommodate shoes having low heels, and by lowering the shaft the surface of the pad is given the required pronounced longitudinal curvature to adapt it for shoes intended to have high heels.

To confine the shank and rear portion of the pad 1202, a U-shaped member 1226 is provided which extends around the rear end of the pad and has its front ends extending under the pins 1214, 1215. The sides of the member 1226 are extended inwardly at 1228, 1229 a short distance over the top of the pad, and preferably the extension 1229, on the side of the pad which is adjacent to the inner side of the shank, is greater, as indicated in Fig. 38. The overhanging portions 1228, 1229 are preferably slotted at 1230 in the vicinity of the breast line to permit them to conform better to the contour of the pad. At the rear end of the pad the member 1226 has secured thereto an angle piece 1231 which rests against a vertical surface on the portion 1200 of the end 883 of the box. This angle piece prevents the compression of the rear portion of the pad 1202 from interfering with the vertical movement of the slide 884 when pressure is applied to the shoe. In order to hold the pad and the rear end of the member 1226 from upward movement, clips 1232 are secured to opposite sides of the rear end of the box (Fig. 12) and have their upper ends inturned to overlie the inturned portions 1228 of the member 1226.

The upper surface of the pad 1202 is preferably reinforced with a layer of canvas 1234 which may extend down the sides of the pad, especially at the shank portion, as shown in Fig. 40. Outside this canvas layer it is desirable to have a thin layer 1236 of rubber which preferably is of a harder composition than that used for the rest of the pad, the pad surface being thus rendered more durable and less liable to be scarred by the shoe. From Fig. 38 it will be seen that the forepart of the pad is provided with a raised portion 1238 which underlies the outer side of the forepart of the shoe. This raising of the surface of the pad minimizes the tendency of the shoe to rock when pressure is applied to the cone of the last through the block 390. The pad 1202 is provided around the forepart with an outwardly projecting flange 1240 which overlies the edge of the frame 652 and at the rear end with a projection 1242 which overlies a forward projection 1244 on the cross-bar 894 of the slide 884. Thus, when the end of the pad is compressed by pressure of the shoe, the slide 884 and the heel positioning mechanism carried thereby are moved downwardly with the shoe. In the rear end of the top surface of the pad is a groove 1246 which prevents the sole locating pin 928 on the tongue 926 from injuring the breast flap of the sole should the pin extend far enough through the sole to engage it. The flap in that case would be merely pushed down into the groove 1246.

On top of the pad, as best shown in Fig. 13, is a mask plate 1250 the edge of which next to the shoe is contoured to correspond approximately to the shape of the forepart of the shoe. The plate is mounted for sliding movement longitudinally of the shoe by providing grooves 1252 in the inner faces of the arms of the U-shaped member 652. To hold the plate 1250 in various adjusted positions longitudinally of the shoe, its front edge is provided with notches 1254 which are engaged by a plunger 1256 normally held by a leaf spring 1258 in engagement with the notches.

Figure 31:
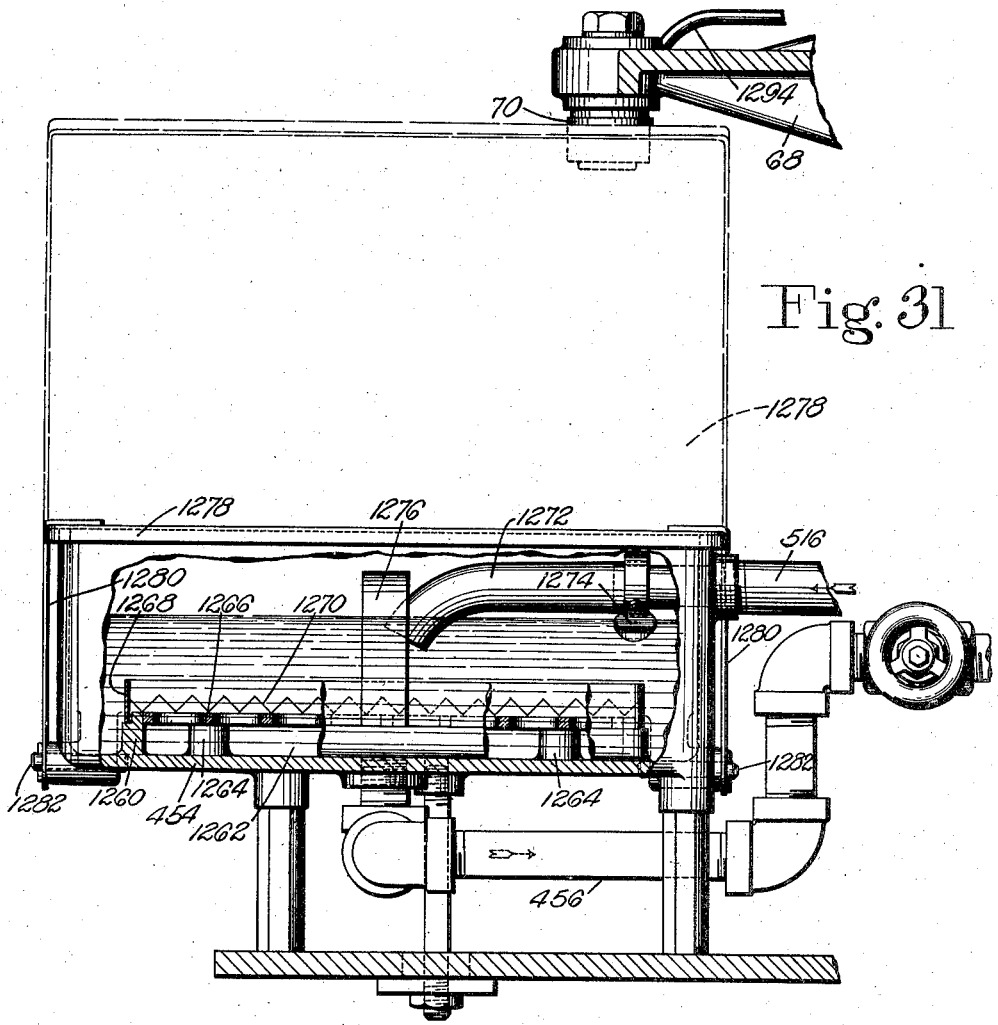
Fig. 31 is a sectional view of a tank containing the supply of pressure fluid (oil) by circulation of which pressure is applied to the shoes.

The oil tank 454 from which oil is drawn by the pump 450 through the pipe 456 and to which it is returned from the hollow column 52 through the pipe 516 is shown in detail in Fig. 31. Projecting upwardly from the bottom of the tank 454 is a flange 1260 which surrounds a space 1262 with which the pipe 456 is connected. Within the space 1262 are studs 1264 which support a grill 1266 which fits tightly inside the upper portion of the flange 1260. Near the top of the outer face of the flange 1260 is formed a rabbet in which a band 1268 fits. Secured to this band and resting upon the grill 1266 is a corrugated strainer 1270 of fine wire mesh. A downwardly curved extension 1272 of the pipe 516 secured thereto by a thumb screw 1274 delivers oil to the strainer 1270, the oil passing through the strainer and the grill into the space 1262 and thence to the pipe 456. For convenient removal, the strainer is provided with a handle 1276. The tank 454 is provided with a cover 1278 which has a downward extension 1280 at each side which is hinged to a pin 1282 projecting from the tank 454 near its bottom. When the cover is raised, as indicated in dotted lines in Fig. 31, its upper edge is in the path of the rolls 70, so that in case the cover of the tank is accidentally left in raised position it will, upon the first rotation of the turret, be engaged by one of the rolls 70 and move far enough to cause it to be closed by gravity.

The oil supplied by the pump for operating the pistons is utilized for oiling various parts of the machine. As shown in Fig. 11, the cylinder 348 is provided above the point of piston travel with a groove 1284 which receives any oil which seeps by the piston, the oil passing from the groove 1284 through a port 1286 into a pocket 1288 from which it is conducted by a pipe 1290 to a circular trough 1292 (Fig. 3) formed in an outward extension of the washer 57. Pipes 1294 contain wicks which dip at one end into the oil in the trough 1292 and at the other end communicate with the bearings of the rolls 70 to lubricate the rolls, as indicated at the left of Fig. 4. When the trough 1292 is filled to a certain level, the oil passes through a notch 1295 in its outer wall and drips from a projection 1296 located over a passage 1298 leading to the inside of the column 52. Holes 1300 are provided through the flange 59 to allow oil from the trough to reach the ball bearing 58.

A pressure gage 1302 (Fig. 1) is provided near the front of the machine which is connected by a tube 1304 with the distributing point 464. By observation of the gage the operator may ascertain what pressure is being produced in the operating cylinders. A motor control switch 1306 is also located in front of the machine for the convenience of the operator in starting and stopping the motor 110.

It will be understood that the work as prepared for the operation of the machine consists of a lasted shoe D on its last and an unattached sole C. The overlasted margin of the upper of the shoe about the forepart and shank has been roughened and cement applied thereto which has been allowed to dry. The sole has had its peripheral marginal portion about the forepart and shank roughened and pyroxylin cement applied thereto and allowed to dry, and has been provided with a hole located in the lateral center of its heel-seat portion. Either the operator or his assistant applies, by machine or otherwise, a softener or solvent (of the nature, for example, disclosed in the above-identified Wedger application) to the dry cement upon the sole, and the operator, having operated the switch 1306 to start the motor, places the sole upon the pad 650 which is at the operating station, it being assumed that the lever 1176 has been adjusted to change the longitudinal contour of the pad if necessary to suit the height of the heel of the shoe being operated upon. The operator places the sole C with its ball line substantially over the shaft 1164 about which the pad is adjusted. He then grasps the handle 936 and moves the tongue 926 longitudinally or laterally, or both, to bring the pin 928 over the hole in the heel-seat portion of the sole and moves the handle 934 forward to cause the pin to enter the hole in the sole. He then depresses the treadle 794, overcoming the spring 806 and moving the lever 776 downwardly until it is latched in depressed position by the latch 819. This permits the spring 812 to react, moving the lever arm 768 to the right (Fig. 28), thus moving the rocking member 692 (Fig. 14) in a counterclockwise direction and releasing the sole feelers 654, 655, 672, 673 (Fig. 13) which are moved by their respective springs 664, 665, 685, 684 to find the sole in the position in which it was placed by the operator, the rocking member 692 then, by its further movement, permitting the locking spring 736 to act upon the locking plates 714, 715, 716, 717, thus locking the sole feelers in engagement with the sole. Should the feelers for any reason fail properly to engage the sole, the latch 819 may be released by clockwise movement of the handle 826, whereupon the spring 806 will return the feelers to their inoperative position and raise the treadle 794 for the operation to be repeated. The shoe gages 740 carried by the feelers having been adjusted by their levers 750 for the proper sole extension, the operator now places the shoe D upon the sole, grasps the handle 420 and moves the shoe engaging devices 390, 392 over the shoe on the pad, at the same time moving the handle 420 to the right or left to position the toe engaging member 392 properly lengthwise of the shoe. By this same movement the member 910 is moved toward the shoe by the reaction of the spring 952 which has been released by counterclockwise turning movement of the member. The same movement of the member 956 operates the arm 966 first to lock the member 910 against movement laterally of the shoe and then to force the conical end 969 (Fig. 17) through the ring 990 to shift the pin 928 and the sole engaged thereby into central position with respect to the rear portion of the shoe. At the same time the yoke 1000 will be locked by outward movement of the link 1040 to hold the shoe and sole securely against lateral movement while downward movement of all the heel end positioning mechanism is permitted by movement of the slide 884 against the springs 888. The pressure applying treadle 583 is now depressed and becomes locked by the plate 846 on the treadle 794 in an intermediate position, sufficiently depressed, however, to cause the roll 574 of the three-position valve operating mechanism at the station preceding the operating station to be moved by the arm 612 to exhaust position and to cause the three-way valve at the operating station to be moved to inlet position. During this movement the lever 634 may have operated partly to close the pressure-inducing valve 468. In order completely to close the valve 468 in applying the required pressure to the shoe, further depression of the treadle 583 is necessary and this is now done by the operator, the resulting oil pressure causing the piston 356 (Fig. 11) to rise and the distributing lever 374 to engage the rear ends of the levers 314, 316 and move them counterclockwise until the members 390, 392 engage respectively the cone of the last and the toe of the shoe. When sufficient pressure has thus been applied to the shoe to seat it upon the pad and overcome the spring 378, the distributing lever 374 becomes locked to the piston 356 and thereafter the shoe is moved bodily and vertically downward against the pad by the pressure applied to the piston 356 which, in order to apply adequate sole attaching pressure to the shoe, is in the vicinity of 300 pounds to the square inch.

Assuming that the pressure-control valve 1070 has been set for such pressure, when that pressure has been attained the overflow from the pressure-control valve 1070 will operate the pressure-guarantee valve 1102 and withdraw the rod 134 which controls the tripping of the clutch. Now if the time for which the arm 280 of the timing device was set has elapsed, the handle 218 may be operated to trip the clutch and bring the next pad from which the pressure has already been relieved to the operating station, whereupon the operations described will be repeated upon a left shoe.

Having thus described our invention, what we claim as new and desire to secure by Letters Patent of the United States is:

1. In a machine for applying pressure to shoe bottoms, the combination of a turret arranged for rotation on a vertical axis, a plurality of sole pads on the turret, and shoe engaging devices mounted on the turret and each arranged to move radially of the turret into and out of position over one of the pads about an axis beneath the pad and located inwardly of the turret with respect to the pad.

2. In a machine for applying pressure to shoe bottoms, the combination of a turret arranged for rotation on a vertical axis, a plurality of upwardly facing pads on the turret each arranged with one of its longer sides toward the turret edge and its other long side toward the center of the turret, shoe engaging means for each pad, each of said means being supported on that side of the pad which is toward the center of the turret and being movable into and out of position over its pad, and means for moving each of the shoe engaging means vertically to press a shoe upon the pad.

3. In a machine for applying pressure to shoe bottoms, the combination of a turret arranged for rotation on a vertical axis, a plurality of upwardly facing sole pads on the turret, shoe engaging devices corresponding in number to the pads, each mounted on the turret and arranged to move radially of the turret into and out of position over a pad about an axis beneath the pad and located inwardly of the turret with respect to the pad, and means operable while the turret is at rest for causing relative movement of each pad and the corresponding shoe engaging device to press a shoe and sole together.

4. In a machine for applying pressure to shoe bottoms, the combination of a turret arranged for rotation on a vertical axis, a plurality of upwardly facing sole pads on the turret, shoe engaging devices corresponding in number to the pads, each mounted on the turret and arranged to move radially of the turret into and out of position over its pad about an axis beneath the pad and located inwardly of the turret with respect to the pad, and means for causing relative movement of each pad and the corresponding shoe engaging device to press a shoe and sole together.

5. In a machine for applying pressure to shoe bottoms, the combination of a turret arranged for rotation on a vertical axis, a plurality of pads on the turret arranged end to end about the periphery of the turret, shoe engaging means for each pad, each of said means being supported at that side of the pad which is toward the center of the turret for bodily movement laterally of one of the pads into and out of position over the pad, and means for applying pressure to the shoe engaging means to press shoes upon the pads.

6. In a machine for applying pressure to shoe bottoms, the combination of a turret arranged for rotation on a vertical axis, a plurality of oblong pads on the turret arranged with a long side toward the turret edge and a long side toward the center of the turret, shoe engaging means for each pad, each of said means being supported at that side of the pad which is toward the center of the turret, and fluid pressure means for applying pressure to the shoe engaging means to press shoes upon the pads.

7. In a machine for applying pressure to shoe bottoms, the combination of a turret arranged for rotation on a vertical axis, a plurality of pads on the turret arranged with a side toward the turret edge, shoe engaging means for each pad, each of said means being supported at that side of the pad which is toward the center of the turret and being movable laterally of one of the pads into and out of position over the pad, and fluid pressure means for causing relative movement of each pad and its shoe engaging means to press a shoe upon the pad.

8. In a machine for applying pressure to shoe bottoms, the combination of a turret arranged for rotation on a vertical axis, means for intermittently rotating the turret step by step, a plurality of upwardly facing pads on the turret, and means for insuring the lapse of a predetermined time between steps of rotation of the turret.

9. In a machine for applying pressure to shoe bottoms, the combination of a rotatable turret, a plurality of pads on the turret, a plurality of shoe holding devices cooperating with the pads, power-operated mechanism for rotating the turret step by step, and a timing device arranged to prevent re-starting of the turret until a predetermined time has elapsed since the last step rotation.

10. In a machine for applying pressure to shoe bottoms, the combination of a movable carrier, a plurality of pads on the carrier, a plurality of shoe holding devices, one cooperating with each of the pads, power-operated mechanism for advancing the carrier step by step, and a timing device arranged to insure the lapse of a predetermined time between successive operations of said carrier advancing mechanism.

11. In a machine for applying pressure to shoe bottoms, the combination of a movable carrier, a plurality of pads on the carrier, a plurality of shoe holding devices, one cooperating with each of the pads, power-operated mechanism for advancing the carrier step by step, a timing device arranged to insure the lapse of a predetermined time between successive operations of said carrier advancing mechanism, and means for varying the length of time which elapses between successive operations of said mechanism.

12. In a machine for applying pressure to shoe bottoms, the combination of a rotatable turret, a plurality of pads on the turret, a plurality of shoe holding devices cooperating with the pads, power-operated mechanism including a clutch for rotating the turret step by step, and a timing device arranged to insure the lapse of at least a predetermined time between successive operations of the clutch.

13. In a machine for applying pressure to shoe bottoms, the combination of a rotatable turret, a plurality of pads on the turret, a plurality of shoe holding devices cooperating with the pads, power-operated mechanism for rotating the turret step by step, and a pressure-controlled device constructed and arranged to prevent rotation of the turret until a required predetermined pressure on a shoe on one of the pads has been attained.

14. In a machine for applying pressure to shoe bottoms, the combination of a rotatable turret, a plurality of pads on the turret, a plurality of shoe engaging devices cooperating with the pads, power-operated mechanism for rotating the turret step by step, a pressure-controlled device to prevent rotation of the turret until a predetermined pressure on the shoe on one of the pads and engaged by one of said devices has been attained, and means for varying said predetermined pressure.

15. In a machine for applying pressure to shoe bottoms, the combination of a rotatable turret, a plurality of pads on the turret, a plurality of shoe engaging devices cooperating with the pads, power-operating means for relatively operating the pads and shoe engaging devices to apply pressure to shoes successively placed on the pads, power-operated mechanism for rotating the turret step by step, and pressure-controlled means to prevent operation of said power-operated mechanism to effect rotation of the turret until a predetermined pressure has been attained on the last shoe placed on a pad of the machine.

16. In a machine for applying pressure to shoe bottoms, the combination of a rotatable turret, a plurality of pads on the turret, a plurality of shoe holding devices cooperating with the pads, power-operated mechanism including a clutch for rotating the turret step by step, and a pressure-controlled device arranged to prevent setting of the clutch unless the last shoe placed on a pad and engaged by one of said holding devices has been subjected to a predetermined pressure.

17. In a machine for applying pressure to shoe bottoms, the combination of a carrier, a plurality of pads on the carrier, a plurality of shoe holding devices, one cooperating with each of the pads, power-operated mechanism for advancing the carrier step by step, and a pressure-controlled device arranged to prevent starting of said mechanism unless the last shoe placed on a pad and engaged by one of said holding devices has been subjected to a predetermined pressure.

18. In a machine for applying pressure to shoe bottoms, the combination of a carrier, a plurality of pads on the carrier, a shoe holding device cooperating with the pads, power-operated mechanism for advancing the carrier step by step, a pressure-controlled device arranged to prevent starting of said mechanism unless the shoe last placed on one of the pads has been subjected to a predetermined pressure, and means for varying the pressure.

19. In a machine for applying pressure to shoe bottoms, the combination of a plurality of pads, a carrier for presenting the pads in turn at an operating station with the side of a pad adjacent to the operator, shoe holding means comprising a toe rest and a heel rest movable into and out of position over each pad at that side of the pad which is more remote from the operator, and manually operated means for moving the shoe holding means over the shoe and for relatively adjusting the toe and heel rests.

20. In a machine for applying pressure to shoe bottoms, the combination of a plurality of pads, a carrier for presenting the pads in turn at an operating station, a plurality of shoe holding means for the pads each comprising a toe rest movable longitudinally of the shoe and a heel rest, said rests being movable into and out of position over the corresponding pad, and manually operated means for moving the shoe holding means over the shoe on its pad and for adjusting the toe rest longitudinally of the shoe.

21. In a machine for applying pressure to shoe bottoms, the combination of a plurality of pads, a carrier for the pads movable to present the pads in turn at an operating station, means for pressing shoes on the pads, said means being movable toward and from the operator at the operating station, means for relieving the pressure, and means operating during movement of the carrier to move each shoe pressing means away from the operator as it approaches the operating station.

22. In a machine for applying pressure to shoe bottoms, the combination of a plurality of pads, a carrier for the pads movable to present the pads in turn at an operating station, means for pressing shoes on the pads, said means being movable toward and from the operator at the operating station, means for relieving the pressure, and a stationary cam operating to move the shoe pressing means away from the operator as it approaches the operating station.

23. In a machine for applying pressure to shoe bottoms, the combination of a turret arranged to rotate on a vertical axis, a plurality of pads on the turret arranged with their sides extending in the direction of rotation of the turret, a plurality of shoe engaging devices movable outwardly radially of the turret into position over the respective pads, means for operating each engaging device in turn to press a shoe against the corresponding pad, and means for automatically moving the shoe engaging devices inwardly radially of the turret out of position over the shoes.

24. In a machine for applying pressure to shoe bottoms, the combination of a plurality of pads, a carrier for presenting the pads in turn at an operating station, shoe engaging means movable into and out of position over the pads, means independent of the movement of the carrier for operating each shoe engaging means to press a shoe upon the corresponding pad while at the operating station, means independent of movement of the carrier for releasing pressure of the shoe engaging means upon each pad when the pad next approaches the operating station, and means dependent upon movement of the carrier for moving the shoe engaging means out of position over the pad.

25. In a machine for applying pressure to shoe bottoms, the combination of a plurality of upwardly facing pads, a carrier for presenting the pads in turn at an operating station, a plurality of shoe holding means each movable from a position giving complete accessibility to the pad from above into a position over its respective pad, fluid-pressure-operated means under control of the operator for operating each shoe holding means to press a shoe upon the corresponding pad while at the operating station, and manually operated means for releasing the pressure of the holding means upon the shoe and pad when the pad is at the station next to the operating station.

26. In a machine for applying pressure to shoe bottoms, the combination of a plurality of pads, a carrier for presenting the pads in turn at an operating station, shoe holding means movable into and out of position over the respective pads, fluid-pressure-operated means under control of the operator for operating each shoe holding means to press a shoe upon the corresponding pad while at the operating station, manually operated means for releasing the pressure of the holding means upon the shoe and pad when the pad next approaches the operating station, and a stationary cam for moving the shoe holding means from position over the pad as it moves into the operating station.

27. In a machine for applying pressure to shoe bottoms, the combination of a plurality of pads, a carrier movable to present the pads in turn at an operating station, shoe holding means movable into and out of position over the respective pads, fluid-pressure-operated means under control of the operator for relatively moving each shoe holding means and the corresponding pad to press a shoe and sole together while at the operating station, manually operated means for releasing the pressure on the shoe when the pad next approaches the operating station, and means for moving the shoe holding means out of position over the pad after the pressure is released.

28. In a machine for applying pressure to shoe bottoms, the combination of a rotatable turret, a plurality of pads on the turret, a corresponding number of shoe engaging devices each movable into cooperative relation to its respective pad, and a single manually controlled means operating independently of rotation of the turret for causing operation of said devices in turn to press a shoe against the corresponding pad and for relieving the pressure on a shoe and pad other than the one to which pressure is being applied.

29. In a machine for applying pressure to shoe bottoms, the combination of a rotatable turret, a plurality of pads on the turret, shoe engaging devices movable into pressing position over the pads, and operator-controlled means operable while the turret is at rest for causing the shoe engaging devices each in turn to press a shoe against the corresponding pad and for relieving pressure on a shoe other than the one to which pressure is being applied.

30. In a machine for applying pressure to shoe bottoms, the combination of a rotatable turret, a plurality of pads on the turret arranged with their long axes tangent to the direction of rotation of the turret, shoe engaging devices initially not over the pads and movable into position each over one of the pads, and operator-controlled means for causing the shoe engaging devices each in turn to press a shoe against the corresponding pad and for relieving pressure upon a shoe other than the one to which pressure is being applied.

31. In a machine for applying pressure to shoe bottoms, the combination of a plurality of pads, a carrier movable to present the pads in turn at an operating station, a plurality of shoe holding devices, one for each of the pads, movable into and out of position over the respective pads, and a fluid-pressure-operated means under control of the operator for relatively operating the shoe holding means and the pads to press a shoe and sole together while each pad is at the operating station, said control means acting to release the pressure on the shoe upon each pad when the pad next approaches the operating station.

32. In a machine for applying pressure to shoe bottoms, the combination of a plurality of pads, a carrier movable to present the pads in turn at an operating station, a plurality of shoe holding devices, one for each of the pads, movable into and out of position over the respective pads, power-operated means for relatively operating each shoe holding means and its pad to press a shoe and sole together while it is at rest at the operating station, and means under the control of the operator for causing said pressure to be effected, said control means acting to release the pressure on the shoes when the respective pads reach the station next to the operating station.

33. In a machine for applying pressure to shoe bottoms, the combination of a turret arranged to rotate on a vertical axis, a plurality of pads on the turret, shoe engaging devices located above the pads and movable into and out of position over the respective pads, means for relatively operating each pad and the corresponding shoe engaging device in turn to press a shoe and sole together, means for relieving the pressure on each shoe after a rotation of the turret has been nearly completed, and a stationary cam for automatically moving each shoe engaging device out of position over its pad after its pressing operation has been completed.

34. In a machine for applying pressure to shoe bottoms, the combination of a turret arranged to rotate on a vertical axis, a plurality of pads on the turret arranged with their sides tangential to the direction of rotation of the turret, shoe engaging devices movable radially of the turret into position over the respective pads, means for operating the shoe engaging devices in turn to press shoes against the respective pads, means for relieving the pressure upon each shoe after a rotation of the turret has been nearly completed, and means for automatically moving the shoe engaging devices inwardly radially of the turret, each after its pressing operation has been completed.

35. In a machine for applying pressure to shoe bottoms, the combination of a rotatable turret, a plurality of upwardly facing pads on the turret arranged with their longest dimension extending in the direction of rotation of the turret, a plurality of shoe engaging devices each movable outwardly of the turret into position over a pad, means for operating the shoe engaging devices in turn to press a shoe against a pad and maintain pressure thereon until the pad, due to rotation of the turret, has nearly completed a rotation, and means operated independently of rotation of the turret for relieving the pressure of the shoe engaging devices.

36. In a machine for applying pressure to shoe bottoms, the combination of a turret arranged to rotate on a vertical axis, a plurality of upwardly facing pads on the turret arranged with their long dimension tangential to the direction of rotation of the turret, a plurality of shoe engaging devices movable radially of the turret into and out of position over the pads, means for operating the shoe engaging devices in turn to press shoes against the respective pads, means for relieving the pressure when a rotation of the turret is nearly completed, and means for automatically moving the shoe engaging devices inwardly radially of the turret after the pressure on the respective devices is relieved.

37. In a machine for applying pressure to shoe bottoms, the combination of a plurality of pads, a carrier for presenting the pads in turn at an operating station with the side of the pad adjacent to the operator, shoe holding means movable into and out of position over the respective pads upon that side of the pads which is remote from the operator, means independent of movement of the carrier for operating the shoe holding means each to press a shoe upon a pad while at the operating station, means for releasing the pressure of the holding means upon the pad when the pad next approaches the operating station, and means dependent on movement of the carrier for moving the shoe holding means from position over the pad.

38. In a machine for applying pressure to shoe bottoms, the combination of a turret arranged for rotation, a plurality of pads on the turret, shoe engaging devices one for each pad mounted on the turret and arranged to move into and out of position over the respective pads, means for relatively moving each pad and the corresponding shoe engaging device to apply pressure to a shoe located on the pad, means operating independently of rotation of the turret and without special attention on the part of the operator for relieving said pressure, and means operated by the rotation of the turret for moving the shoe engaging devices each out of position over its pad after the pressure is relieved.

39. In a machine for applying pressure to shoe bottoms, the combination of a turret arranged for rotation on a vertical axis, a plurality of pads on the turret, a shoe engaging device for each pad mounted on the turret and arranged to move radially of the turret into and out of position over its pad, means for relatively moving each pad and its corresponding shoe engaging device to apply pressure to a shoe located on the pad, means operating independently of rotation of the turret and without special attention on the part of the operator for relieving said pressure, and means operated by the rotation of the turret for moving each shoe engaging device out of position over its pad after the pressure is relieved.

40. In a machine for applying pressure to shoe bottoms, the combination of a turret, a plurality of pads on the turret, a plurality of shoe engaging devices one for each pad movable into and out of position over the respective pads, means for operating the shoe engaging devices in turn each to press a shoe against a pad, means for relieving pressure when a rotation of the turret is nearly completed, and means operated by rotation of the turret for moving each shoe engaging device out of position over the shoe after the pressure is relieved.

41. In a machine for applying pressure to shoe bottoms, the combination of a turret arranged to rotate on a vertical axis, a plurality of pads on the turret, a shoe engaging device for each pad movable radially of the turret into and out of position over its pad, means for operating each shoe engaging device in turn to press a shoe against a pad, means for relieving said pressure when a rotation of the turret is nearly completed, and means operated by rotation of the turret for moving each shoe engaging device inwardly radially of the turret after the pressure is relieved.

42. In a machine for applying pressure to shoe bottoms, the combination of a rotatable turret, a plurality of pads on the turret, a plurality of shoe engaging devices one for each of the pads, means for operating the shoe engaging devices in turn while the turret is at rest to press a shoe against a pad and to maintain pressure thereon until the pad, due to rotation of the turret, has nearly completed a rotation, and means operating independently of rotation of the turret for then relieving the pressure on the shoe.

43. In a machine for applying pressure to shoe bottoms, the combination of a turret arranged to rotate on a vertical axis, a plurality of pads on the turret, a plurality of shoe engaging devices one for each of the pads, said devices being each movable from an initial position in which it is not over a pad into position over the respective pad, means for operating the shoe engaging devices in turn to press a shoe against a pad, means for relieving pressure on each shoe after a full rotation of the turret has been nearly completed, and a stationary cam acting during rotation of the turret automatically to move each shoe engaging device out of position over the pad to its initial position after its pressing operation has been completed.

44. In a machine for applying pressure to shoe bottoms, the combination of a turret arranged to rotate on a vertical axis, a plurality of pads on the turret, a plurality of shoe engaging devices, one movable into and out of position over each pad, means for rotating the turret step by step to present the pads in turn at an operating station, means operable at the operating station for relatively operating the shoe engaging devices and the corresponding pads to press a shoe and sole together, means operable at the operating station for relieving pressure upon the shoe on the pad next to the operating station, and means for automatically moving each shoe engaging device out of position over its pad during its movement to the operating station.

45. In a machine for applying pressure to shoe bottoms, the combination of a turret arranged for rotation on a vertical axis, a plurality of sole pads on the turret, shoe engaging devices mounted on the turret and arranged to move radially of the turret into and out of position over the pads about centers located beneath the pads and inwardly of the turret with respect to the pads, and means for guiding the shoe engaging devices in rectilinear paths.

46. In a machine for applying pressure to shoe bottoms, the combination of a yielding pad arranged to receive a shoe and sole, levers extending transversely of the shoe and fulcrumed between their ends, a toe rest on the front end of one of the levers, a heel rest on the front end of the other lever, and means acting to raise the rear ends of the levers and press the toe and heel rests against a shoe on the pad.

47. In a machine for applying pressure to shoe bottoms, the combination of a yielding pad to receive a shoe right side up, levers extending transversely of the shoe and fulcrumed between their ends, a toe rest on the front end of one of the levers, a heel rest on the front end of the other lever, a pressure distributing lever between the rear ends of the two levers, and a fluid pressure piston acting on said distributing lever for applying upward pressure to the rear ends of the two levers simultaneously.

48. In a machine for applying pressure to shoe bottoms, the combination of a yielding pad arranged to receive a lasted shoe and sole right side up, levers extending transversely of the shoe and fulcrumed between their ends, a toe engaging pad on the front end of one of the levers, a member on the front end of the other lever to engage the top of the last, pressure distributing means between the rear ends of the two levers, means for applying upward pressure to the distributing means, and means for locking the distributing means against movement, said means acting in response to the resistance of the shoe.

49. In a machine for applying pressure to shoe bottoms, the combination of a yielding pad arranged to receive a shoe and sole right side up, levers extending transversely of the shoe and fulcrumed between their ends, a toe rest on the front end of one of the levers, a heel rest on the front end of the other lever, a piston adjacent to the rear ends of the levers, a distributing lever on said piston arranged upon movement of the piston to engage the rear ends of the levers, fluid pressure means for operating the piston, and means operating in response to resistance to movement of the levers for locking the distributing lever to the piston so that further movement of the piston will move the toe rest and heel rest equally.

50. In a machine for applying pressure to shoe bottoms, the combination of a yielding pad, means for engaging the forepart of a shoe placed upon the pad, means for engaging the top of a last in the shoe, a plunger for applying pressure to the forepart engaging means and to the last engaging means, a rocking lever on the plunger operated initially to distribute the pressure between the forepart engaging means and the last engaging means, and locking means acting after the shoe is seated upon the pad to lock the rocking lever and the plunger whereby the forepart engaging means and the last engaging means are moved equally to effect bodily movement of the shoe against the pad.

51. In a machine for applying pressure to shoe bottoms, the combination of a yielding pad to receive a shoe, a pair of levers extending transversely of the shoe, means connected to the forward ends of the levers to engage respectively the shoe and last at two widely separated points, a plunger for applying pressure to the rear ends of the levers to force the shoe against the pad, a lever carried by the plunger acting first to equalize the pressure of the pair of levers, and means acting in response to resistance of the shoe to lock the equalizing lever against movement and cause the pair of levers to be operated equally to force the shoe against the pad.

52. In a machine for applying pressure to shoe bottoms, the combination of a yielding pad to receive a shoe sole, a pair of levers extending transversely of the shoe, means connected to the forward ends of the levers to engage respectively the shoe and last at two widely separated points, a plunger movable transversely of the levers, a third lever carried by the plunger and adapted to engage each of said pair of levers, and fluid pressure means for operating the plunger.

53. In a machine for applying pressure to shoe bottoms, the combination of a yielding pad arranged to receive a shoe and sole, levers extending transversely of the shoe and fulcrumed between their ends, a toe engaging pad on the front end of one of the levers, a member on the front end of the other lever to engage the top of a last in the shoe, and fluid pressure means acting on the rear ends of the levers to press the shoe against the pad.

54. In a machine for applying pressure to shoe bottoms, the combination of a yielding pad arranged to receive a shoe and sole, levers extending transversely of the shoe and fulcrumed between their ends, a toe engaging pad on the front end of one of the levers, a member on the front end of the other lever to engage the top of a last in the shoe, and a fluid pressure piston for applying upward pressure to the rear ends of the two levers simultaneously.

55. In a machine for applying pressure to shoe bottoms, the combination of a yielding pad arranged to receive a shoe and sole, levers extending transversely of the shoe and fulcrumed between their ends, a toe engaging pad on the front end of one of the levers, a member on the front end of the other lever to engage the top of a last in the shoe, pressure distributing means between the rear ends of the two levers, and means for applying upward pressure to the distributing means.

56. In a machine for applying pressure to shoe bottoms, the combination of a yielding pad arranged to receive a shoe and sole, a pair of levers extending transversely of the shoe and fulcrumed between their ends, a toe engaging pad on the front end of one of the levers, a member on the front end of the other lever to engage the top of a last in the shoe, a piston adjacent to the rear ends of the levers, a third lever on said piston arranged upon movement of the piston to engage the rear ends of the pair of levers and rock them, and fluid pressure means for operating the piston.

57. In a machine for applying pressure to shoe bottoms, the combination of a yielding pad, means for engaging the forepart of a shoe placed upon the pad, means for engaging the top of a last in the shoe, means for applying pressure to the forepart and last engaging means, and means operating initially to distribute the pressure between the forepart and last engaging means and acting after the shoe is seated upon the pad to move the forepart engaging means and the last engaging means equally to effect bodily movement of the shoe against the pad.

58. In a machine for applying pressure to shoe bottoms, the combination of a yielding pad to receive a shoe sole, a pair of levers extending transversely of the shoe, means connected to the forward ends of the levers to engage respectively the shoe and last at two widely separated points, and means for applying pressure to the rear ends of the levers to force the shoe against the pad comprising means acting first to distribute the pressure of the levers and then to operate the levers as a unit to force the shoe bodily against the pad.

59. In a machine for applying pressure to shoe bottoms, the combination of a yielding pad to receive a shoe sole, a pair of levers extending transversely of the shoe, means connected to the forward ends of the levers to engage respectively the shoe and last at two widely separated points, a plunger movable transversely of the rear ends of the levers, and a third lever carried by the plunger and adapted to engage the rear ends of the levers of the pair.

60. In a machine for applying pressure to shoe bottoms, the combination of a yielding pad to receive a shoe sole, a pair of levers extending transversely of the shoe, means connected to the forward ends of the levers to engage respectively the shoe and last at two widely separated points, a plunger movable transversely of the rear ends of the levers, a third lever mounted on the plunger and having a locking segment, means for operating the plunger to cause the third lever to engage and operate the rear ends of the levers of the pair to cause the shoe to be pressed upon the pad, and means controlled by the resistance of the shoe to cause the locking segment of the third lever to be locked to the plunger.

61. In a machine for applying pressure to shoe bottoms, the combination of a yielding pad to receive a shoe and sole, a pair of levers extending transversely of the shoe, means connected to the forward ends of the levers to engage respectively the shoe and last at two widely separated points, a plunger movable transversely of the levers, a third lever mounted on the plunger and having a locking segment with a wedge-shaped edge, fluid pressure means for operating the plunger to cause the third lever to engage the levers of said pair to cause the shoe to be pressed upon the pad, a block having a V-groove adapted to engage the segment of the equalizing lever and lock it to the plunger, and a spring for holding the segment and the block apart until initial pressure is applied to the shoe.

62. In a machine for applying pressure to shoe bottoms, the combination of a pad, means for engaging a shoe on the pad, a piston fluid-operated in a cylinder for relatively operating the shoe engaging means and the pad to press a shoe upon the pad, a pump having an inlet pipe and an outlet pipe, said outlet pipe being connected to said cylinder, a conduit connecting the inlet and outlet pipes through which the pump may circulate fluid continuously in the same direction without producing substantial pressure in the outlet pipe, and means for interrupting the flow of fluid in the conduit to cause pressure to be applied to said piston.

63. In a machine for applying pressure to shoe bottoms, the combination of a pad, means for engaging a shoe on the pad, a piston fluid-operated in a cylinder for operating the shoe engaging means to press a shoe upon the pad, a pump having an inlet pipe and an outlet pipe, said outlet pipe being connected to said cylinder, a conduit connecting the inlet and outlet pipes through which the pump may circulate fluid continuously in the same direction, and means for interrupting the flow of fluid in the conduit to cause pressure to be applied to said piston.

64. In a machine for applying pressure to shoe bottoms, the combination of a series of pads, a series of shoe engaging devices, one for each pad, pistons fluid-operated in cylinders for causing relative movements of the shoe engaging devices and the respective pads to apply pressure to shoes on the pads, a continuously running pump having an inlet pipe and an outlet pipe, a conduit leading from said inlet to said outlet pipe in which fluid is circulated by the pump, branches from said outlet pipe leading to the respective cylinders, and means for interrupting the flow of fluid in said conduit to render the pressure then created by the pump effective for operating the pistons.

65. In a machine for applying pressure to shoe bottoms, the combination of a series of pads, a series of shoe engaging devices, one for each pad, pistons fluid-operated in cylinders for causing relative movement of the shoe engaging devices and the pads to apply pressure to shoes on the pads, a continuously running pump having an inlet pipe and an outlet pipe, a member having a passage leading from the outlet pipe to the inlet pipe through which fluid is circulated by the pump, branches from said outlet pipe leading to the respective cylinders, a valve for controlling inlet of fluid to and exhaust of fluid from each cylinder, and means for interrupting the flow of fluid in said passage to render the pump effective for operating that piston the valve to the cylinder of which is in inlet position.

66. In a machine for applying pressure to shoe bottoms, the combination of a plurality of pads, fluid-pressure-operated means associated with each pad for effecting sole attaching pressure on shoes on the respective pads, a fluid pump operating continuously and having an inlet pipe and an outlet pipe, a conduit connecting said pipes between the pump and the fluid-pressure-operated means, branches from the outlet pipe to each fluid-pressure-operated means, and means for closing said conduit to cause fluid under pressure to flow to the fluid-pressure-operated means.

67. In a machine for applying pressure to shoe bottoms, the combination of a plurality of pads, a carrier for the pads movable to present the pads in turn at an operating station, fluid-pressure-operated means for pressing shoes on the respective pads, a fluid pump operating continuously, a conduit through which fluid is circulated by the pump, branches from the conduit to the fluid-pressure-operated means, and means for closing said conduit to cause fluid under pressure to flow to one of the fluid pressure operated means.

68. In a machine for applying pressure to shoe bottoms, the combination of a plurality of pads, a carrier for the pads movable to present the pads in turn at an operating station, fluid-pressure-operated means for pressing shoes on the respective pads, a fluid pump operating continuously, a conduit through which fluid is circulated by the pump, branches from the conduit to each of the fluid-pressure-operated means, means for closing said conduit to cause fluid under pressure to flow in said branches, a plurality of three-position valves, one for each of said pressure-operated means, and means for setting the three-position valves in turn in inlet position and operating the conduit closing means.

69. In a machine for applying pressure to shoe bottoms, the combination of a rotatable turret, a plurality of pads on the turret, means for rotating the turret to present the pads in turn at an operating station, a plurality of shoe engaging devices, one for each pad, a plurality of cylinders each containing a fluid-pressure-operated piston for operating the shoe engaging devices in turn to press a shoe against a pad, a normally open circuit through which fluid is circulated continuously, branches from said circuit to the respective cylinders, valves, one in each branch, for controlling the passage of fluid to the cylinders, and operator-controlled means for opening the valves in turn and closing said open circuit.

70. In a machine for applying pressure to shoe bottoms, the combination of a rotatable turret, a plurality of pads on the turret, means for rotating the turret to present the pads in turn at an operating station, shoe engaging devices, one for each pad, a plurality of cylinders each containing a fluid-pressure-operated piston for operating the respective devices in turn to press a shoe against a pad, a normally open circuit through which fluid is circulated continuously, branches from said circuit to the cylinders, valves, one in each branch, each having an inlet, a neutral, and an exhaust position, and operator-controlled means for opening the valve of the branch leading to the cylinder of the shoe engaging device at the operating station, closing the open circuit and moving to exhaust position the valve of the next device to come to the operating station.

71. In a machine for applying pressure to shoe bottoms, the combination of a turret arranged for rotation, a plurality of pads on the turret, shoe engaging means for the respective pads, a plurality of fluid-pressure-operated means for causing shoes and the pads to be pressed together, means for circulating fluid in an open circuit without creating substantial pressure, connections from said circuit to the respective fluid-pressure-operated means, a valve associated with each fluid-pressure-operated means, and means for concurrently opening one of said valves and interrupting the flow of fluid in said circuit to cause pressure to be applied to one of said fluid-pressure-operated means.

72. In a machine for applying pressure to shoe bottoms, the combination of a series of pads, a series of shoe engaging devices, one for each pad, a plurality of cylinders each having a fluid-operated piston for moving the respective shoe engaging devices to apply pressure to shoes and soles on the pads, a continuously running pump having an inlet pipe and an outlet pipe, a conduit connecting said pipes in which fluid is circulated idly by the pump, branches from said outlet pipe leading to the respective cylinders, valves in said branches, and means for interrupting the flow of fluid in said conduit to render the pump effective to produce pressure in said branches and for operating the valves in turn to admit pressure to the pistons.

73. In a machine for applying pressure to shoe bottoms, the combination of a series of pads, a series of shoe engaging devices, one for each pad, a plurality of cylinders, each containing a fluid-operated piston for moving the shoe engaging devices to apply pressure to the shoes and soles on the respective pads, a continuously running pump having an inlet pipe and an outlet pipe, a conduit connecting said pipes in which fluid is circulated by the pump, branches from the outlet pipe leading to the cylinders, a valve for controlling the inlet of fluid to and exhaust of fluid from each cylinder, and means for interrupting the flow of fluid in said conduit to render the pump effective for operating a piston the valve to the cylinder of which is in inlet position.

74. In a machine for applying pressure to shoe bottoms, the combination of a pad, means for holding a shoe on the pad, means for relatively moving the pad and the holding means to apply pressure to a shoe and sole on the pad including a cylinder containing a fluid-operated piston, a fluid pump having inlet and outlet pipes, a conduit connecting the inlet and outlet pipes through which fluid is circulated idly, connections from said outlet pipe to the cylinder, and a valve for closing the conduit to cause fluid pressure to be applied to the piston.

75. In a machine for applying pressure to shoe bottoms, the combination of a pad, means for engaging a shoe on the pad, a cylinder containing a fluid-operated plunger for relatively operating the shoe engaging means and the pad to press a shoe and sole together, a pump, pipes forming through the pump a complete circuit in which fluid is circulated without substantial pressure by the pump, pipes connecting the pressure side of said circuit with said cylinder, and a valve for interrupting the flow of fluid in said circuit to cause pressure to be applied through the connecting pipes to said plunger.

76. In a machine for applying pressure to shoe bottoms, the combination of a plurality of pads, a carrier for the pads movable to present the pads in turn at an operating station, fluid-pressure-operated means for pressing shoes on the respective pad, a rotary fluid pump operating continuously, a conduit through which fluid is circulated by the pump, a by-pass from the outlet side of the conduit and the inlet side of the conduit, branches from the outlet side of the conduit to each of the fluid-pressure-operated means, and operator-controlled means for closing said by-pass to cause the fluid under pressure to flow to the fluid-pressure-operated means while the pads are at rest.

77. In a machine for applying pressure to shoe bottoms, the combination of a plurality of pads, a carrier for the pads movable to present the pads in turn at an operating station, fluid-pressure-operated means for pressing shoes on the respective pads, a fluid pump operating continuously, a conduit through which fluid is circulated idly by the pump, branches from said conduit to each of the fluid-pressure-operated means, means for closing said conduit to cause the fluid under pressure to flow to each of said branches, a valve for each of said pressure-operated means, and means for first opening each valve in turn and then operating the conduit closing means.

78. In a machine for applying pressure to shoe bottoms, the combination of a rotatable turret, a plurality of pads on the turret, means for rotating the turret to present the pads in turn at an operating station, shoe engaging devices for the respective pads, a plurality of cylinders each containing a fluid-pressure-operated piston for relatively operating the respective shoe engaging devices and pads in turn to press a shoe and sole together, a pump, a normally open conduit through which fluid is circulated by the pump, pipes leading from the inlet side of the conduit to the respective cylinders, valves for controlling the admission of fluid to the respective pistons, and operator-controlled means for opening the piston valves in turn and closing said conduit.

79. In a machine for applying pressure to shoe bottoms, the combination of a rotatable turret, a plurality of pads on the turret, means for rotating the turret to present the pads in turn at an operating station, a plurality of shoe engaging devices, one for each pad, a plurality of cylinders each containing a fluid-pressure-operated piston for operating the respective shoe engaging devices in turn to press shoes against the respective pads, a normally open circuit through which fluid is circulated continuously without substantial pressure, pipes leading from the outlet side of said circuit to the respective piston, a valve in each pipe having inlet, neutral and exhaust positions, and operator-controlled means for moving to exhaust position the valve of the pipe leading to the cylinder of the shoe engaging device next to come to the operating station, for opening the valve of the pipe leading to the cylinder of the shoe engaging device at the operating station, and for closing the open circuit to cause pressure to be applied to the piston at the operating station.

80. In a machine for applying pressure to shoe bottoms, the combination of a turret, a plurality of devices on the turret for pressing a shoe and sole together, a plurality of members on the turret corresponding to the number of said pressing devices, and a cam comprising a cylinder having a spiral groove on its cylindrical surface, two of said members being arranged to engage the opposite ends of the groove when the turret is at rest and rotation of the cylinder causing the turret to be rotated.

81. In a machine for applying pressure to shoe bottoms, the combination of a turret, a plurality of devices on the turret for pressing a shoe and sole together, a plurality of arms on the turret corresponding to the number of devices, and a cam comprising a cylinder having a spiral groove on its cylindrical surface, said groove passing twice around the cylinder, two of said arms being arranged to engage the opposite ends of said groove when the turret is at rest.

82. In a machine for applying pressure to shoe bottoms, the combination of a turret, a plurality of devices on the turret for pressing a shoe and sole together, a plurality of arms on the turret corresponding to the number of pads, a rotary spiral cam having a substantially constant angular velocity, and connections between said cam and the turret for imparting partial rotations to the turret, said cam being constructed and arranged to start the turret slowly, to move it rapidly during a part of its movement, and to bring it slowly to rest.

83. In a cement sole attaching machine, the combination of a pad, and forepart sole feelers independently pivoted so as to rest by gravity on the pad and movable over the surface of the pad to engage the edge face of the forepart of a sole placed thereon.

84. In a cement sole attaching machine, the combination of a pad box, a pad in the box, and feelers pivoted on the box and each movable independently of the others laterally of the box to engage the edge face of the sole located on the pad.

85. In a cement sole attaching machine, the combination of a pad box, a pad in the box, arms pivoted to the box, and sole positioning feelers on the arms and movable independently of each other over the surface of the pad to engage the edge face of a sole placed thereon.

86. In a cement sole attaching machine, the combination of a pad box, a pad in the box, arms carried by the box, and feelers on said arms and each movable laterally of the box independently of the others to engage the edge face of a sole located on the pad.

87. In a cement sole attaching machine, the combination of a pad box, a pad in the box, and sole positioning feelers pivoted to the box and movable each independently of the others over the surface of the pad to engage the edge face of the sole.

88. In a cement sole attaching machine, the combination of a pad box, a pad in the box, and feelers carried by the box and movable each independently of the others laterally of the box to engage the edge face of a sole located on the pad.

89. In a cement sole attaching machine, the combination of a box, a yielding pad in the box, feelers carried by the box and arranged for independent movement laterally of the pad to engage the edge face of a sole on the pad without disturbing the position of the sole as placed by the operator, and means for locking the feelers after their positions have been determined by engagement with the sole.

90. In a cement sole attaching machine, the combination of a pad, a shoe engaging device movable into position over the pad constructed and arranged to press a shoe on the pad, and means for relatively locating the rear end of a shoe and sole operated by movement of said shoe engaging device over the pad.

91. In a cement sole attaching machine, the combination of a pad, shoe engaging means movable into position over the pad from that side of the pad which is more remote from the operator, and shoe locating means arranged to be moved in shoe engaging position by movement of the shoe engaging means over the pad.

92. In a machine for cement sole attaching, the combination of a pad, shoe engaging means movable into and out of position over the pad, shoe finding means movable longitudinally of the pad to engage the end portion of the shoe on the pad, and connections for causing the finding means to be so moved when the engaging means is moved over the pad.

93. In a cement sole attaching machine, the combination of a pad, shoe engaging means movable into and out of position over the pad, means for locating relatively the forepart of a shoe and the forepart of a sole on the pad, and means operated by movement of the shoe engaging means over the pad for finding and holding the rear part of a shoe against lateral movement.

94. In a cement sole attaching machine, the combination of a pad to receive a shoe sole, means for locating the forepart of a shoe and sole relatively to each other upon the pad and holding them in such relative location, and means for shifting laterally the rear end of the sole into proper relation to the rear end of the shoe while maintaining the relative location of the foreparts of the shoe and sole unchanged.

95. In a cement sole attaching machine, the combination of a pad to receive a shoe sole, means for locating the forepart of a shoe and sole relatively to each other, means for finding and holding the rear end of a shoe, and means for thereafter moving the rear end of the sole laterally into alinement with the shoe.

96. In a cement sole attaching machine, the combination of a pad to receive a shoe sole, means for locating the forepart of a shoe and sole relatively to each other, means for finding and holding the rear end of a shoe, and means for thereafter moving the rear end of the sole laterally into alinement with the shoe irrespectively of the distance and direction in which the rear end of the sole may initially be displaced with respect to the shoe.

97. In a cement sole attaching machine, the combination of a pad to receive a shoe sole, feelers movable about fixed centers located at opposite sides of the longitudinal center line of the pad to engage and find the sole, and means for locking the feelers against movement.

98. In a cement sole attaching machine, the combination of a pad to receive a shoe sole, a pair of arms pivoted at fixed points at opposite sides of the longitudinal center line of the pad, feelers carried by said arms, means for moving the arms to cause the feelers to engage opposite sides of the forepart of the sole, and means for locking the arms to cause the sole to be held by the feelers.

99. In a cement sole attaching machine, the combination of a pad, means for engaging a sole placed on the pad, means for finding a shoe placed on the sole, and means for relatively shifting the sole engaging means and the finding means laterally of the shoe properly to locate the shoe and sole relatively to each other.

100. In a cement sole attaching machine, the combination of a pad, means for engaging on its longitudinal median line a sole placed on the pad, means for finding a shoe placed on the sole, and means for causing a relative shifting between the sole engaging means and the finding means laterally of the shoe to cause the shoe and sole to be properly located with respect to each other.

101. In a cement sole attaching machine, the combination of a pad, means for engaging a sole placed on the pad, means for finding a shoe placed on the sole, means for locking the finding means, and means for shifting the sole engaging means relatively to the finding means to locate the sole centrally with respect to the shoe.

102. In a cement sole attaching machine, the combination of a pad, means for engaging on its longitudinal median line a sole placed on the pad, means for finding a shoe placed on the sole, means for locking the finding means to hold the shoe in fixed position, and means for shifting the sole engaging means laterally of the shoe relatively to the finding means to locate the sole centrally with respect to the shoe.

103. In a cement sole attaching machine, the combination of a pad, means for engaging a hole in the longitudinal median line of the rear portion of a sole placed on the pad, means for finding the rear portion of a shoe placed on the sole, means for locking the finding means to hold the shoe in fixed position, and means for shifting the sole engaging means laterally of the shoe to locate the sole centrally with respect to the shoe.

104. In a cement sole attaching machine, the combination of a pad, means for engaging a hole in the longitudinal median line of the rear portion of a sole placed on the pad, means for finding the rear portion of a shoe placed on the sole, means for locking the finding means to hold the shoe in fixed position, and means for shifting the sole engaging means laterally of the shoe to locate the sole centrally with respect to the shoe irrespectively of the amount of lateral displacement of the sole relatively to the shoe.

105. In a cement sole attaching machine, the combination of a pad, a movable plate having a pin for engaging a sole placed on the pad, a slide having oppositely inclined surfaces for finding a shoe placed on the sole, a ring connected with the plate, a cone connected with the slide, and means for causing the cone to enter the ring thereby relatively shifting the pin and the slide laterally of the shoe properly to locate the shoe and sole relatively to each other.

106. In a cement sole attaching machine, the combination of a pad, a pin for engaging a hole in the longitudinal median line of a sole placed on the pad, a longitudinally and laterally movable slide having oppositely inclined surfaces for finding a shoe placed on the sole, means for locking the slide against lateral movement after it has found the shoe, a ring connected with the pin, a cone connected with the slide, and connections operating upon entry of the cone into the ring for shifting the pin into central relation with respect to the inclined surfaces of the slide.

107. In a cement sole attaching machine, the combination of a pad, a laterally, longitudinally and vertically movable pin for engaging a hole in a sole placed on the pad, a laterally and longitudinally movable slide having oppositely inclined surfaces for finding the end of a shoe placed on the sole, means for locking the slide against movement to hold the shoe in fixed position, a ring connected with the pin, a cylinder having a conical end adapted to enter the ring, a guide connected with the slide for guiding the cylinder for movement longitudinally of the shoe, and means for effecting sliding movement of the cylinder to cause its conical end to pass through the ring and thereby shift the ring and the pin laterally of the shoe to cause the sole to be centralized with respect to the shoe and held by said member.

108. In a cement sole attaching machine, the combination of a pad, a pin for engaging a hole in the longitudinal median line of the heel portion of a sole placed on the pad, means for finding the rear end of a shoe placed on the sole, means for locking the finding means to hold the shoe in fixed position, a ring mounted for movement laterally of the shoe and connected with said pin for movement therewith, a cone guided for movement longitudinally of the shoe, held from lateral movement by connections to said finding means and arranged to enter said ring when moved longitudinally of the shoe, and means for moving the cone into the ring to cause the pin to shift the sole into centralized relation to the shoe held by the finding means.

109. In a cement sole attaching machine, the combination of a pad, means for engaging a hole in the longitudinal median line of the rear portion of a sole placed on the pad, a member movable longitudinally and laterally of the sole to find the rear portion of a shoe placed on the sole, means for locking the finding means to hold the shoe in fixed position, a ring and a cone connected respectively to the pin and the member, and means for relatively moving the ring and the cone to cause them to engage each other and shift the sole engaging means laterally of the shoe to locate the sole centrally with respect to the shoe.

110. In a cement sole attaching machine, the combination of a box, a yielding pad in the box, feelers pivoted to the box at one end thereof and independently movable over the surface of the pad to engage the edge face of a sole in the position in which the sole is placed by the operator, and means for locking the feelers against movement away from the sole after their position has been determined by contact with the sole.

111. In a cement sole attaching machine, the combination of a box, a pad in the box, feelers for engaging the edge face of the forepart of a sole placed on the pad adjacent to the ends of the ball line and the ends of the tip line of the sole, separate arms carrying the different feelers, the arms carrying the tip line feelers being in crossed relation and the arm carrying a ball line feeler on one side of the shoe and the arm carrying a tip line feeler for the opposite side of the shoe having a common axis.

112. In a cement sole attaching machine, the combination of a pad to receive a shoe sole, tip line and ball line feelers movable over the pad to find the forepart of a sole placed on the pad, independent means for actuating the feelers toward the sole, and means for causing relative separation of the tip line feelers and the ball line feelers longitudinally of the shoe in proportion to the separation of the ball line feelers from each other by the sole.

113. In a cement sole attaching machine, the combination of a pad to receive a shoe sole, feelers movable over the pad to find the forepart of a sole placed thereon, a spring for each feeler to cause it to move into contact with the sole, a strong spring arranged to counteract the action of said feeler springs to hold the feelers away from the sole, and manually operated means for overcoming said strong spring to permit the feelers to act.

114. In a cement sole attaching machine, the combination of a pad to receive a shoe sole, feelers movable over the pad to find the forepart of a sole placed on the pad, means for actuating each feeler independently toward the sole, and a single means for moving all the feelers in opposition to their actuating means to retract the feelers.

115. In a cement sole attaching machine, the combination of a pad to receive a shoe sole, feelers movable over the pad to find the forepart of a sole placed on the pad, a spring for each of the feelers to move it independently toward the sole, and a single means for moving all the feelers in opposition to their springs and withdrawing them from operative position.

116. In a cement sole attaching machine, the combination of a pad to receive a shoe sole, feelers movable over the pad to find the forepart of a sole placed thereon, a spring for each feeler to cause it to move into contact with the sole, a strong spring arranged to counteract the action of said feeler springs to hold the feelers away from the sole, manually operated means for overcoming said strong spring to permit the feelers to act, and a latch for holding said strong spring in compressed condition.

117. In a cement sole attaching machine, the combination of a pad to receive a shoe sole, feelers movable over the pad to find the forepart of a sole placed thereon, a spring for each feeler to cause it to move into contact with the sole, a strong spring arranged to counteract the action of said feeler springs to hold the feelers away from the sole, manually operated means for overcoming said strong spring to permit the feelers to act, a latch for holding said strong spring in compressed condition, and means operable at the will of the operator for releasing the latch.

118. In a cement sole attaching machine, the combination of a plurality of pads arranged in an endless series for presentation in turn at an operating station, feelers on each of the pads movable thereover to find the forepart of a shoe sole, means tending normally to move the feelers into contact with the shoe sole, means for retracting the feelers to an inoperative position, a latch at the operating station for holding said retracting means inoperative to permit the fingers to act, and means operated by movement of a pad from the operating station to release the latch.

119. In a cement sole attaching machine, the combination of a plurality of pads arranged on a turret in an endless series for presentation in turn at an operating station, feelers on each of the pads movable thereover to find the forepart of a shoe sole, means tending normally to move the feelers into contact with the shoe sole, means for retracting the feelers to an inoperative position, a latch at the operating station for holding said retracting means inoperative to permit the fingers to act, and means operated automatically by rotation of the turret for releasing the latch.

120. In a cement sole attaching machine, the combination of a box, a yielding pad in the box, feeler arms mounted on the box and arranged for independent movement laterally of the pad, a feeler on each arm arranged to engage the edge face of a sole on the pad without disturbing the position of the sole as placed by the operator, and means for locking the feelers after their positions have been determined by engagement with the sole.

121. In a cement sole attaching machine, the combination of a box, a yielding pad in the box, arms pivoted adjacent to one end of the box, feelers carried by the arms, said arms being arranged for independent movement laterally of the pad to cause the feelers to engage the edge face of a sole on the pad without disturbing the position of the sole as placed by the operator, and means for locking the feelers in their sole engaging positions.

122. In a cement sole attaching machine, the combination of a box, a yielding pad in the box, arms pivoted adjacent to one end of the box, feelers carried by the arms, said arms being arranged for independent movement laterally of the pad to cause the feelers to engage the edge face of a sole on the pad without disturbing the position of the sole as placed by the operator, shoe gages adjustably mounted on the feelers, and means for locking the feelers and gages in their sole engaging positions.

123. In a cement sole attaching machine, the combination of a box, a yielding pad in the box, arms pivoted to the box adjacent to one end thereof and independently movable over the surface of the pad, feelers on said arms arranged upon movement of the arms to engage the edge face of the sole in the position in which the sole is placed by the operator, a spring for actuating each of said arms toward the sole, and means for locking the arms against movement away from the sole after their position has been determined by contact with the sole.

124. In a cement sole attaching machine, the combination of a box, a yielding pad in the box, feeler arms independently pivoted to the box adjacent to one end thereof, feelers on said arms independently movable over the surface of the pad to engage the edge face of the sole in the position in which it is placed by the operator, and means for locking the feelers against movement away from the sole.

125. In a cement sole attaching machine, the combination of a box, a yielding pad in the box, feeler arms independently pivoted to the box adjacent to one end thereof, feelers on said arms independently movable over the surface of the pad to engage the edge face of the sole in the position in which it is placed by the operator, shoe forepart positioning means carried by said feelers, and means for locking the feelers against movement away from the sole.

126. In a cement sole attaching machine, the combination of a box, a yielding pad in the box, upstanding pins on opposite sides of the longitudinal median line of the forepart of the box, a pair of feeler arms mounted on each pin, feelers on said arms, and means for independently moving each arm to cause its feeler to move over the surface of the pad and engage the edge face of the sole in the position in which it is placed on the pad by the operator.

127. In a cement sole attaching machine, the combination of a box, a pad in the box, two pairs of feeler arms pivoted to the box adjacent to the end of the forepart of the box, and a feeler on each of said arms for engaging the edge face of the forepart of a sole placed on the pad, one pair of feelers being adapted to engage the sole adjacent to the ends of the ball line and the other pair adapted to engage the sole adjacent to the ends of the tip line, the arms carrying the tip line feelers being in crossed relation and the arm carrying the ball line feeler on one side and the arm carrying the tip line feeler on the opposite side of the shoe having a common axis.

128. In a cement sole attaching machine, the combination of a pad to receive a shoe sole, two pairs of feelers, one pair engaging respectively the end of the tip line and the end of the ball line of the sole and the other pair engaging respectively the opposite end of the tip line and the opposite end of the ball line of the sole, and an arm carrying each of the feelers, the arms carrying the feelers at one side of the shoe being pivoted on opposite sides of the longitudinal median line of the pad.

129. In a cement sole attaching machine, the combination of a pad, pivot pins on opposite sides of the forepart of the pad, arms pivoted on said pins, feelers on said arms adapted to engage a sole at opposite ends of the ball line, other arms pivoted on said pins and extending in crossed relation to each other, and feelers on said other arms for engaging opposite ends of the tip line, the tip line engaging feelers having a component of movement longitudinally of the shoe in conjunction with their movement away from each other so that the distance between the tip line engaging feelers and the ball line engaging feelers longitudinally of the shoe will increase in proportion to the lateral separation of the ball line engaging feelers to engage a large sole.

130. In a cement sole attaching machine, the combination of a box, a yielding pad in the box, upstanding pins on opposite sides of the longitudinal median line of the forepart of the box, a pair of feeler arms mounted on each pin, and feelers on said arms, the feelers on the pair of feeler arms mounted on one of the pins being arranged to engage the sole respectively adjacent to the end of the ball line on one side of the shoe and adjacent to the tip line on the other side of the shoe, and the feelers carried by the pair of feeler arms mounted on the other pin being adapted to engage the opposite end of the tip line and the opposite end of the ball line respectively.

131. In a cement sole attaching machine, the combination of a box, a pad on the box, a pair of pivot pins upstanding from the box, a pair of feeler arms mounted for movement about each of the pins, and feelers on said arms for engaging the edge face of the forepart of the sole placed on the pad adjacent to the ends of the ball line and adjacent to the ends of the tip line, the arms carrying the tip line feelers being in crossed relation, and the arm carrying the ball line feeler on one side of the shoe and the arm carrying the tip line feeler on the opposite side of the shoe being mounted on the same pin.

132. In a cement sole attaching machine, the combination of a pad to receive a shoe sole, two pairs of feeler arms having vertical pivots to permit movement of the arms laterally of the pad, and feelers on each of the arms, one pair adapted to engage the sole at approximately the ends of the tip line and the other pair adapted to engage the sole approximately at the ends of the ball line, each of said arms having a horizontal pivot to permit the feelers to rest by gravity on the pad and to move heightwise therewith or with respect thereto.

133. In a cement sole attaching machine, the combination of a pad, upright pins on each side of the longitudinal median line of the forepart of the pad, two members pivoted on each of said pins, feeler arms pivoted to each of said members on horizontal pivots, feelers on two of said arms adapted to engage a sole adjacent to opposite ends of the ball line, the two other arms extending in crossed relation to each other, feelers upon said arms for engaging the sole adjacent to opposite ends of the tip line, and locking means common to said members for locking them after the feelers have engaged the sole to prevent lateral movement of the feelers.

134. In a cement sole attaching machine, the combination of a pad, upright pins on each side of the longitudinal median line of the forepart of the pad, two members pivoted on each of said pins, feeler arms pivoted to each of said members on horizontal pivots, feelers on two of said arms adapted to engage a sole adjacent to opposite ends of the ball line, the other two arms extending in crossed relation to each other, feelers upon said arms for engaging the sole adjacent to opposite ends of the tip line, locking means common to said members for locking them after the feelers have engaged the sole to prevent lateral movement of the feelers, and a rocking member for unlocking the feelers and moving the members on their pivots in a direction to withdraw the feelers from sole engaging position.

135. In a cement sole attaching machine, the combination of a pad, shoe and sole gages on the pad, means normally urging the gages into operative position, a treadle for controlling such movement of the gages, means normally holding the treadle raised and the gages in inoperative position, and a manually operated latch for holding the treadle depressed and the gages in operative position, said latch being releasable in case it is desired to restore the gages to inoperative position.

136. In a cement sole attaching machine, the combination of a rotatable turret, a plurality of pads on the turret, a plurality of shoe engaging devices cooperating with the pads, a set of shoe and sole locating mechanisms for each of the pads, means for relatively operating each of the shoe engaging devices and pads in turn to press a shoe and pad together, a first treadle for controlling the operation in turn of each set of shoe and sole locating mechanisms, means for locking the treadle in depressed position, a second treadle for controlling the application of pressure to the shoe, and means on said first treadle for locking the second treadle in depressed position, said locking means being operable only after the first treadle has been depressed.

137. In a cement sole attaching machine, the combination of a rotatable turret, a plurality of pads on the turret, a plurality of shoe engaging devices cooperating with the pads, shoe and sole locating mechanism for each of the pads, fluid pressure means for operating each of the shoe engaging devices in turn to press a shoe upon a pad, a first treadle for controlling the operation of the shoe and sole locating mechanism, means for locking the treadle in depressed position, a second treadle to control the application of fluid pressure to the fluid pressure means, means on said first treadle for locking the second treadle in depressed position, said means being operative only after the first treadle has been depressed.

138. In a cement sole attaching machine, the combination of a pad to receive a shoe sole, feelers movable over the pad to find the forepart of a sole placed thereon, a spring for each feeler to cause it to move into contact with the sole, a strong spring arranged to counteract the action of said feeler springs to hold the feelers away from the sole, manually operated means for overcoming said strong spring to permit the feelers to act, and a latch to maintain said strong spring compressed with the feelers in operative position.

139. In a cement sole attaching machine, the combination of a pad to receive a shoe sole, feelers movable over the pad to find the forepart of a sole placed thereon, a spring for each feeler to cause it to move into contact with the sole, a strong spring arranged to counteract the action of said feeler springs to hold the feelers away from the sole, manually operated means for overcoming said strong spring to permit the feelers to act, a latch to maintain said strong spring compressed with the feelers in operative position, and manually operated means for releasing the latch to permit the strong spring to retract the feelers.

140. In a cement sole attaching machine, the combination of a plurality of pads arranged in an endless series for presentation in turn at an operating station, feelers movable over each of the pads to find the forepart of a sole placed thereon, spring means for actuating the feelers into contact with the sole, a strong spring arranged to counteract the action of the feeler springs to hold the feelers away from the sole, manually operated means for overcoming said strong spring to permit the feelers to act, a latch for maintaining said spring compressed with the feelers in operative position, and means operated during movement of a pad from the operating station to release said latch.

141. In a cement sole attaching machine, the combination of a rotatable turret, a plurality of pads on the turret, shoe and sole gages on each of the pads, means normally urging the gages into operative position, a treadle for controlling such movement of the gages in turn, and a manually operable latch for disconnecting the gage operating mechanism from the treadle in case it is desired to restore the gages to inoperative position.

142. In a cement sole attaching machine, the combination of a rotatable turret, a plurality of pads on the turret, a plurality of shoe engaging devices cooperating with the pads, shoe and sole locating mechanism for each of the pads, fluid pressure means for operating each of the shoe engaging devices in turn to press a shoe upon a pad, a treadle for controlling the operation of the shoe and sole locating mechanism, a treadle to control the application of fluid pressure to the fluid pressure means, and means for locking the fluid pressure control treadle in depressed position only after the treadle for controlling the locating mechanism has been depressed.

143. In a cement sole attaching machine, the combination of a rotatable turret, a plurality of pads on the turret, a plurality of shoe engaging devices cooperating with the pads, shoe and sole gages for each of the pads, means normally urging the gages into operative position, manually controlled means for permitting such movement of the gages, and means for disconnecting the gage operating mechanism from the manually operated means in case it is desired to restore the gages to inoperative position.

144. In a cement sole attaching machine, the combination of a pad to receive a shoe sole, means for relatively locating the forepart of the sole and shoe on the pad, a pin for engaging a hole in the rear end of the sole, means for engaging and holding the rear part of the shoe in the position determined by the location of the forepart, and means for shifting the pin into central position with respect to the shoe holding means.

145. In a cement sole attaching machine, the combination of a pad to receive a shoe sole, means for relatively locating the forepart of the sole and shoe on the pad, a pin for engaging a hole in the rear end of the sole, means for engaging and holding the rear part of the shoe in the position determined by the location of the forepart, and means for shifting the pin into central position with respect to the shoe holding means irrespectively of whether the pin is initially at one side or the other of the longitudinal median line of the rear part of the shoe and irrespectively of the amount of such displacement.

146. In a cement sole attaching machine, the combination of a pad, shoe engaging means movable into and out of position over the pad, shoe finding means movable longitudinally of the pad to engage the sides of the end portion of a shoe located on the pad, means normally urging said shoe finding means toward the shoe, and means operated by movement of the shoe engaging means over the pad to permit the shoe finding means to move toward the shoe and to lock the shoe finding means in shoe engaging position, said means acting upon movement of the shoe engaging means out of operating position to unlock the shoe finding means and move it away from the shoe.

147. In a cement sole attaching machine, the combination of a pad, shoe engaging means movable into and out of position over the pad, means for locating relatively the forepart of a shoe and the forepart of a sole on the pad, means for engaging the rear part of a sole irrespective of its position on the pad, means for finding the rear part of a shoe irrespective of its position on the pad, and means operated by movement of the shoe engaging means over the pad to shift the sole engaging means and the shoe finding means relatively to each other laterally of the pad properly to locate the rear portions of the shoe and sole with respect to each other.

148. In a cement sole attaching machine, the combination of a pad, shoe engaging means movable into and out of position over the pad, means for relatively moving the shoe engaging means and the pad to apply pressure to the shoe, a shoe finding device movable longitudinally and laterally of the shoe, a sole engaging device movable longitudinally and laterally of the sole, and means operated by movement of the shoe engaging device over the pad for relatively operating the shoe finding means and the sole engaging means properly to locate the shoe and sole relatively to each other.

149. In a cement sole attaching machine, the combination of a pad to receive a shoe sole, feelers for finding and holding the forepart of a sole on the pad, gages for locating the forepart of a shoe relatively to the sole, means for engaging the rear part of the sole, means for finding and holding the rear part of the shoe in the position determined by the gages, and means for shifting the means engaging the rear part of the sole to cause the longitudinal median line of the rear part of the sole and the longitudinal median line of the rear part of the shoe to coincide.

150. In a cement sole attaching machine, the combination of a pad to receive a shoe sole, feelers for finding and holding the forepart of a sole on the pad, gages for locating the forepart of a shoe relatively to the sole, means for engaging the rear part of the sole, means for finding and holding the rear part of the shoe in the position determined by the gages, and means for automatically shifting the means engaging the rear part of the sole in a direction and to an amount sufficient to aline the rear part of the shoe and sole.

151. In a cement sole attaching machine, the combination of a pad to receive a shoe sole, a pin for engaging a hole in the rear end of the sole, said pin being freely movable laterally, longitudinally and vertically with respect to the pad to find the hole whatever the position of the sole upon the pad, feelers for finding and holding the forepart of the sole irrespectively of the position of the sole on the pad, shoe gages on the feelers for locating a shoe in proper position relatively to the forepart of the sole, means for locking the feelers and gages in shoe engaging position, means for finding and holding the rear end of the shoe, and means for shifting the pin laterally an amount sufficient to aline the rear end of the shoe and sole irrespective of the initial displacement of the sole relatively to the shoe.

152. In a cement sole attaching machine, the combination of a pad to receive a sole having a hole in the lateral center of its rear end, the sole being placed on the pad in a position determined by the operator, a pin for engaging the hole in the sole, said pin being mounted for free movement in a plane parallel to the rear part of the sole and movable heightwise of the sole to engage the hole, feelers for finding the forepart of the sole, means for locking the feelers in sole engaging position, gages on the feelers for locating the forepart of the shoe in proper position with respect to the forepart of the sole, means movable longitudinally and laterally of the shoe to find the rear end of the shoe, means for locking said means in shoe engaging position, and means for shifting the pin to the right or left to aline the rear end of the sole with respect to the rear end of the shoe.

153. In a cement sole attaching machine, the combination of a pad, a movable plate having a pin for engaging a sole placed on the pad, a slide having oppositely inclined surfaces for finding a shoe placed on the sole, a ring connected with the plate, a cone connected with the slide, means for causing the cone to enter the ring thereby relatively shifting the pin and the slide laterally of the shoe properly to locate the shoe and sole relatively to each other, and means for varying the final position of the pin laterally of the shoe with respect to the inclined surfaces of the finding means.

154. In a cement sole attaching machine, the combination of a pad, a pin for engaging a hole in the longitudinal median line of a sole placed on the pad, a longitudinally and laterally movable slide having oppositely inclined surfaces for finding a shoe placed on the sole, means for locking the slide against lateral movement after it has found the shoe, a ring connected with the pin, a cone connected with the slide, connections operating upon entry of the cone into the ring for shifting the pin into central relation with respect to the inclined surfaces of the slide, and means for adjusting the pin to cause its final position to be at one side or the other of its central relation.

155. In a cement sole attaching machine, the combination of a pad, means movable laterally of the pad to find a sole placed on the pad, means movable laterally of the pad for finding a shoe placed on the pad, and means for maintaining each finding means either at the right or left of its central position with respect to the pad.

156. In a cement sole attaching machine, the combination of a pad, means movable laterally and longitudinally of the pad for finding a sole placed on the pad, means movable laterally and longitudinally of the pad for finding a shoe placed on the sole, means for initially yieldingly holding the sole finding means at one side or the other of its central position with respect to the pad, and means for initially yieldingly holding the shoe finding means at one side or the other of its central position with respect to the pad.

157. In a machine for applying pressure to shoe bottoms, a casing, a pad in the casing, pad supporting members in the casing hinged to each other, means for sustaining the outer ends of the pad supporting members, and means for raising and lowering said supporting members at the hinge to vary the longitudinal curvature of the pad.

158. In a machine for applying pressure to shoe bottoms, the combination of a pad casing comprising side walls, pad supporting means in the casing, transverse pins at the ends of the casing for supporting the ends of the supporting means, a transverse pin extending across the casing between its ends through slots in the casing to which pin the supporting members are connected, and means for raising and lowering said pin to maintain the central portion of said supporting means at different elevations with respect to its ends.

159. A pad for cement sole attaching comprising a cellular sole engaging container filled with sand, and a supporting vessel for the container filled with fluid.

160. A pad for cement sole attaching comprising a sole engaging container filled with sand, a vessel filled with fluid for supporting said container, and means for preventing distortion of the container and vessel except in a direction toward the sole.

161. A pad for cement sole attaching comprising a box, a fluid-filled vessel occupying part of the box, and a cellular container occupying the remainder of the box, the cells of said container being filled with sand.

162. A pad for cement sole attaching having a cellular forepart filled with sand, a hollow shank portion filled with liquid, and a fluid-filled vessel underlying the entire pad.

163. A pad for cement sole attaching composed of yielding material and having a raised portion on its sole engaging face at the portion engaged by the outer side of the forepart of the sole, said portion being higher than the opposite side of the sole engaging face of the pad to minimize tendency of the sole and shoe to tilt outwardly about a longitudinal axis when pressure is applied to the shoe.

164. A pad for cement sole attaching machines comprising a rubber envelope and cells therein with walls of rubber, each cell having a cubic capacity of the order of one cubic inch, and sand substantially filling said cells.

165. In a cement sole attaching machine, in combination, a pad, shoe and sole gages for relatively locating a shoe and sole on the pad, friction means for maintaining each shoe gage and its corresponding sole gage in the proper relative position during use, and means for relatively adjusting each shoe and sole gage comprising a hand lever for overcoming said friction.

166. In a cement sole attaching machine, in combination, a pad, shoe and sole gages for relatively locating a shoe and sole on the pad, rotary friction means for normally maintaining each shoe gage in adjusted relation to the corresponding sole gage, and a hand lever on said rotary friction means for overcoming the friction when the shoe gage is to be adjusted.

167. In a cement sole attaching machine, in combination, a pad, shoe and sole gages for relatively locating a shoe and sole on the pad, a conical member seated in the sole gage, a shoe gage connected to said conical member so that it will be moved perpendicularly to the sole-engaging face of the sole gage by rotation of the said conical member, and a handle for turning the conical member.

168. In a cement sole attaching machine, the combination of a plurality of pads arranged in an endless series for presentation in turn at an operating station, means movable over the pads to engage soles placed thereon, means associated with each pad for pressing a shoe and sole together, means for advancing the pads step by step, and means for preventing operation of the pressing means until the sole engaging means has been operated.

169. In a cement sole attaching machine, the combination of a plurality of pads arranged in an endless series for presentation in turn at an operating station, means movable over the pads to engage opposite edge faces of soles placed thereon, means associated with each pad for pressing a shoe and sole together, and means for preventing operation of the pressing means until the sole engaging means have been operated.

170. In a cement sole attaching machine, the combination of a plurality of pads arranged in an endless series for presentation in turn at an operating station, means for pressing a shoe on each pad, a manual control therefor, means for advancing the pads step by step, means movable over the pads for relatively locating shoes and soles placed thereon, means for preventing operation of the pressing means until the shoe and sole locating means have been operated, and means for preventing operation of the pad advancing means until said manual control has been operated.

171. In a cement sole attaching machine, the combination of a turret, a plurality of devices on the turret each for pressing a shoe and sole together, means for rotating the turret step by step to present the pads in turn at an operating station, displaceable means normally preventing operation of the turret rotating means, operator-controlled means for locating shoes and soles relatively to each other in the pressing devices, means for applying pressure to the shoes in the pressing devices, a manual control therefor, and means operated by said manual control for moving said displaceable means to permit the turret to be rotated.

172. In a cement sole attaching machine, the combination of a turret, a plurality of devices on the turret for pressing a shoe and sole together, means for rotating the turret step by step to present the devices in turn at an operating station, operator-controlled means for locating a shoe and sole relatively to each other in the pressing device at the operating station, and means for preventing application of pressure to the shoe in that pressing device until the shoe and sole locating means has been operated.

MILTON H. BALLARD.
DARIUS W. BUNKER.
SIDNEY J. FINN.
JOHN F. HARDY.
THOMAS H. SEELY.
WILLIAM D. THOMAS.